United States Patent
Maeda et al.

(10) Patent No.: US 8,157,389 B2
(45) Date of Patent: Apr. 17, 2012

(54) SYNCHRONOUS CONTROL SYSTEM FOR LIGHT SOURCE AND SPATIAL LIGHT MODULATOR EMPLOYED IN PROJECTION APPARATUS

(75) Inventors: Yoshihiro Maeda, Hachioji (JP); Hirokazu Nishino, Akishima (JP); Akira Shirai, Hino (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 662 days.

(21) Appl. No.: 12/286,800

(22) Filed: Oct. 1, 2008

(65) Prior Publication Data
US 2009/0033808 A1    Feb. 5, 2009

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/997,516, filed on Oct. 2, 2007.

(51) Int. Cl.
G03B 21/14    (2006.01)
G03B 21/28    (2006.01)
G02B 26/00    (2006.01)
H04N 5/50    (2006.01)
H03L 7/00    (2006.01)
H01L 33/00    (2010.01)
G09G 3/34    (2006.01)

(52) U.S. Cl. ............... 353/85; 353/31; 353/98; 359/292; 348/771; 348/536; 348/735; 257/89; 345/84

(58) Field of Classification Search ............ 353/85, 353/31, 98; 359/292, 291; 348/771, 536, 348/735; 257/89; 345/84
See application file for complete search history.

(56) References Cited

U.S. PATENT DOCUMENTS

| | | | |
|---|---|---|---|
| 5,214,420 A * | 5/1993 | Thompson et al. | 345/6 |
| 540,218 A | 3/1995 | O'Grady et al. | |
| 553,725 A | 7/1996 | Yamazaki et al. | |
| 561,724 A | 4/1997 | Yamazaki et al. | |
| 566,861 A | 9/1997 | Emstoff et al. | |
| 590,332 A | 5/1999 | Emstoff et al. | |
| 6,008,929 A * | 12/1999 | Akimoto et al. | 359/264 |
| 6,747,783 B1 * | 6/2004 | Sandstrom | 359/290 |
| 6,843,568 B2 | 1/2005 | Schenk et al. | |
| 690,685 A1 | 6/2005 | Russell | |
| 697,536 A1 | 12/2005 | Flint | |
| 698,404 A1 | 1/2006 | Childers | |

(Continued)

Primary Examiner — Tony Ko
Assistant Examiner — Magda Cruz
(74) Attorney, Agent, or Firm — Bo-In Lin

(57) ABSTRACT

The present invention provides a display apparatus, comprising: an a light source for emitting illumination light for transmitting along illumination light path; a display device includes a plurality of pixels for modulating the illumination light for reflecting the illumination light along a projection light path after said illumination light is modulated by said display device; light path change actuator for changing the projection light paths; and a control circuit for controlling the light source, wherein the control circuit controls the light source in response to changes of the projection light path.

25 Claims, 32 Drawing Sheets

U.S. PATENT DOCUMENTS

| | | |
|---|---|---|
| 708,673 A1 | 8/2006 | Collins et al. |
| 717,360 A1 | 2/2007 | Marchall |
| 7,184,192 B2 | 2/2007 | Sandstrom et al. |
| 7,207,677 B2 | 4/2007 | Takeda et al. |
| 733,029 A1 | 2/2008 | Bommersbach |
| 733,629 A1 | 2/2008 | Marshall et al. |
| 2003/0214639 A1* | 11/2003 | Patel et al. ............ 353/98 |
| 2007/0030294 A1 | 2/2007 | Sawyers et al. |
| 2007/0081225 A1 | 4/2007 | Aubuchon |
| 2007/0152927 A1 | 7/2007 | Marshall |
| 2008/0068359 A1 | 3/2008 | Yoshida et al. |

* cited by examiner

SYNCHRONOUS CONTROL SYSTEM FOR LIGHT SOURCE AND SPATIAL LIGHT MODULATOR EMPLOYED IN PROJECTION APPARATUS

CROSS REFERENCE TO RELATED APPLICATIONS

This application is a Non-provisional Application claiming a Priority date of Oct. 2, 2007 based on a previously filed Provisional Application 60/997,516 and a Non-provisional patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are 10/698,620 filed on Nov. 1, 2003, 10/699,140 filed on Nov. 1, 2003 now issued into U.S. Pat. No. 6,862,127, and 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to the system configuration and method for controlling an image projection apparatus. More particularly, this invention relates to an image projection apparatus implemented with improved control processes for controlling a spatial light modulator and a light source of the projection apparatus.

2. Description of the Related Art

A projection apparatus implemented with a mirror device projects an image by reflecting the light emitted from a light source from the mirror device. Therefore, the number of the mirror elements of the mirror device determines the resolution of the projection apparatus. Since the mirror elements of the mirror device are formed on a semiconductor substrate, the resolution of the mirror device is therefore dependent on the size of substrate and the size of the mirror elements. While resolution may be improved by increasing the size of the substrate to increase the number of mirror elements formed on the substrate, a larger substrate however also enlarges the mirror device. This in turn introduces the problem of a projection apparatus becoming too large. It is therefore necessary to devise a method for improving the resolution of a projection image while maintaining the sizes of the projection apparatus and mirror device.

Accordingly, U.S. Pat. No. 7,052,142 discloses a method to improve the resolution while without increasing the number of the mirror elements of a mirror device. This method, known as wobbling technique is carried out by mechanically and minutely wobbles the mirror device to slightly change the directions of reflection, thereby making it possible to increase a pseudo number of mirror elements. The wobbling technique has the advantage of achieving the same effect in improving resolution as when the number of mirror elements is increased.

As a method for implementing the wobbling, an actuator is used to minutely wobble the mirror device, to shift each mirror in a diagonal direction. The shifting of each mirror in the diagonal direction fills in the gap between the mirrors, thereby improving the resolution of an image. U.S. Pat. No. 7,052,142 illustrates a method of wobbling a mirror device with an actuator connected to a mirror device to shift the reflecting direction of the light from a light source. However, application of this method of mirror element wobbling introduces many technical problems in a projection image. These problems include the projected images show a blur red "dynamic image" due to the mirror element wobbling. Furthermore, the movement of the mirror element during the time of reflecting and modulating the image projection light also adversely affects the gradation of the gray scales. These technical problems thus prevent the project system to achieve a sufficient level of resolution.

Meanwhile, the technical problems of wobbling involving the light source include the increased power consumption of the light source and the heating of the mirror device caused by the light source being continuously on. Decreasing power consumption by the light source is naturally preferable, and particularly in recent years, energy conservation has become even more important. Two factors contribute to heat build-up in a mirror device—heat resulting from external heat, such as light from the light source, and internal heat resulting from the operation of the mirror device itself.

An accumulation of heat within the mirror device causes the members constituting the mirror device to thermally expand. This causes a change in the positions of the mirrors placed on the surface of a substrate, a cracking of the substrate, a peeling off of the constituent component due to the difference in the coefficients of thermal expansion, et cetera, all of which hamper the function of a mirror device. In view of the above, it is very important to improve the radiation efficiency of a mirror device.

SUMMARY OF THE INVENTION

In consideration of the above-described issue of radiation efficiency and problems of applying the wobbling techniques to increase the display resolution, one aspect of the present invention is to improve the resolution of a projection image by wobbling a spatial light modulator with reduced blurring in the dynamic images due to the mirror wobbling movements. A first exemplary embodiment of the present invention provides a display apparatus, comprising an illumination light path for illuminating illumination light emitted from a light source, a display device constituted by a plurality of pixels for modulating the illumination light, a projection light path for projecting a projection light modulated by the display device, a light path change means for changing the projection light paths, and a control circuit for controlling the light source, wherein the control circuit controls the light source in response to changing the light paths of the projection light.

A second exemplary embodiment of the present invention provides the display apparatus according to the first exemplary embodiment, wherein the control circuit controls the light source during a period in which the light path change means changes light paths.

A third. exemplary embodiment of the present invention provides the display apparatus according to the first exemplary embodiment, wherein the control circuit decreases the quantity of emission light of the light source or turns it off.

A fourth exemplary embodiment of the present invention provides the display apparatus according to the first exemplary embodiment, wherein the control circuit changes the emitting colors of the light source.

A fifth exemplary embodiment of the present invention provides the display apparatus according to the first exemplary embodiment, wherein the control circuit changes the emission periods of the light source.

A sixth exemplary embodiment of the present invention provides the display apparatus according to the first exemplary embodiment, wherein the light source comprises a plurality of light sources, wherein the control circuit changes the numbers of light sources that emit light.

A seventh exemplary embodiment of the present invention provides the display apparatus according to the first exemplary embodiment, wherein the light path change means changes the projection positions of a predetermined pixel(s) of the pixels.

An eighth exemplary embodiment of the present invention provides the display apparatus according to the first exemplary embodiment, wherein the light path change means changes the projection positions of the pixel corresponding to a predetermined color.

A ninth exemplary embodiment of the present invention provides the display apparatus according to the first exemplary embodiment, wherein the light path change means changes the light paths of a predetermined column of pixels.

A tenth exemplary embodiment of the present invention provides the display apparatus according to the first exemplary embodiment, wherein the light path change means changes the light paths by a distance no more than an approximate pitch of the pixels.

An eleventh exemplary embodiment of the present invention provides the display apparatus according to the first exemplary embodiment, wherein the light path change means changes the light paths by a cycle no lower than 120 Hz.

A twelfth exemplary embodiment of the present invention provides the display apparatus according to the first exemplary embodiment, wherein the display device is a mirror element for reflecting an illumination light in a predetermined direction.

A thirteenth exemplary embodiment of the present invention provides the display apparatus according to the first exemplary embodiment, wherein the light path change means is an actuator for wobbling the display device.

A fourteenth exemplary embodiment of the present invention provides the display apparatus according to the first exemplary embodiment, wherein the light path change means comprises a mirror surface for changing the light paths of the projection light.

A fifteenth exemplary embodiment of the present invention provides the display apparatus according to the first exemplary embodiment, wherein the light path change means is a polarization element for changing the paths of the projection light.

A sixteenth exemplary embodiment of the present invention provides the display apparatus according to the first exemplary embodiment, wherein the light source is a light source capable of performing multiple pulse emissions within one frame.

A seventeenth exemplary embodiment of the present invention provides a display apparatus, comprising an illumination light path for illuminating an illumination light emitted from a light source, a display device, comprising a plurality of pixels, for modulating the illumination light in accordance with a video image signal, a projection light path for projecting a modulated projection light, a light change means for changing the projection light paths, and a light source control circuit for controlling the light source, wherein the control circuit controls the light source during a period in which the projection light paths are changed.

An eighteenth exemplary embodiment of the present invention provides the display apparatus according to the seventeenth exemplary embodiment, wherein the display device is controlled with data different from the data of the video image signal during a period in which the projection light paths are changed.

A nineteenth exemplary embodiment of the present invention provides the display apparatus according to the seventeenth exemplary embodiment, wherein the display device is controlled with data that controls it under an OFF state during a period in which the projection light paths are changed.

A twentieth exemplary embodiment of the present invention provides the display apparatus according to the seventeenth exemplary embodiment, wherein the light path change means is synchronized with the light source control circuit.

A twenty-first exemplary embodiment of the present invention provides the display apparatus according to the seventeenth exemplary embodiment, wherein the display device is a mirror device with the number of mirror elements that is a half of the pixels displayed in a video image signal.

A twenty-second exemplary embodiment of the present invention provides the display apparatus according to the seventeenth exemplary embodiment, wherein the display device is a mirror device for projecting the illumination light in an ON direction, an OFF direction, and an intermediate direction between the two directions.

A twenty-third exemplary embodiment of the present invention provides a projection apparatus comprising an illumination light emitted from a laser or light emitting diode (LED) light source, a light source control circuit for controlling the quantity of the illumination light of the light source or the emission timing of the light source, and a mirror device comprising a plurality of mirror elements, which is controlled in accordance with video image signal data and which deflects the illumination light to an ON direction and an OFF direction, wherein the light source is controlled during a period between the even field and odd field of the video image signal.

A twenty-fourth exemplary embodiment of the present invention provides a projection apparatus comprising an illumination light emitted from a laser or light emitting diode (LED) light source, a light source control circuit for controlling the quantity of the illumination light of the light source or the emission timing of the light source, a video image signal generated at 120 Hz or higher per frame, a mirror device comprising a plurality of mirror elements which is controlled in accordance with video image signal data and which deflects the illumination light to an ON direction and an OFF direction, and a screen for projecting the reflected light when the mirror element is in an ON state, wherein the light source is controlled during a period in which the plurality of mirror elements is deflected in the same direction between the frames.

A twenty-fifth exemplary embodiment of the present invention provides the display apparatus according to the twenty-fourth exemplary embodiment, wherein the colors of illumination light are changed over in a sub-frame cycle at 360 Hz or higher within the one frame.

A twenty-sixth exemplary embodiment of the present invention provides the display apparatus according to the twenty-fourth exemplary embodiment, wherein the one frame is 240 Hz or higher.

A twenty-seventh exemplary embodiment of the present invention provides a projection apparatus comprising a spatial light modulator for modulating incident light emitted from a light source and a wobbling device for changing the reflecting/transmitting position of the incident light, wherein the light source is turned off during a period in which the reflecting/transmitting positions of the incident light are changed.

A twenty-eighth exemplary embodiment of the present invention provides the projection apparatus according to the twenty-seventh exemplary embodiment, wherein the wobbling device is an actuator, which is connected to and wobbles the spatial light modulator.

A twenty-ninth exemplary embodiment of the present invention provides the projection apparatus according to the twenty-seventh exemplary embodiment, wherein the wobbling device comprises a mirror surface for changing the directions of the reflection light from the spatial light modulator.

A thirtieth exemplary embodiment of the present invention provides the projection apparatus according to the twenty-seventh exemplary embodiment, wherein the light source is a laser light source or a light emitting diode (LED).

A thirty-first exemplary embodiment of the present invention provides the projection apparatus according to the twenty-seventh exemplary embodiment, wherein the spatial light modulator comprises a plurality of mirror elements for controlling the reflecting direction of the incident light.

A thirty-second exemplary embodiment of the present invention provides the projection apparatus according to the twenty-seventh exemplary embodiment, wherein an interlaced display is carried out, wherein the respective outputs before and after performing a wobbling constitute the respective fields.

A thirty-third exemplary embodiment of the present invention provides an interlaced display by performing a wobbling and scanning an odd field and an even field, thereby projecting an image, wherein an even field is produced before performing a wobbling and an odd field is produced after performing it.

A thirty-fourth exemplary embodiment of the present invention provides an image projection method for modulating incident light emitted from a light source and projecting an image by wobbling the incident light, wherein the light source is turned off during a period in which the wobbling is performed.

A light source is synchronized with a wobbling device to switch off during a time period when the mirror element is controlled to undergo a wobbling movement, and thereby the pixels are clearly separated before and after performing the wobbling. This configuration makes it possible to improve the resolution of a projection image.

The light source is turned off during a period in which the positions of reflection or transmission of the incident light are changed by performing a wobbling, and thereby a black image is interleaved between the projection images. This configuration makes it possible to prevent blurring in dynamic images. Further, switching off the light source makes it possible to reduce the power consumption and the temperature rise in the spatial light modulator due to the irradiation of illumination light.

The direct projection of an image, without applying extraneous image processing to the interlaced signal has the advantage of reducing the load in the image processing, improve the image quality of a projection image, and prevent the showing of blurring image in a dynamic image by interleaving a black image between the odd and even fields.

BRIEF DESCRIPTION OF THE DRAWINGS

The present invention is described in detail below with reference to the following figures.

DESCRIPTION OF THE PREFERRED EMBODIMENTS

The following is a detail description of the preferred embodiment of the present invention with reference to the accompanying drawings.

Embodiment 1

Figure 1:
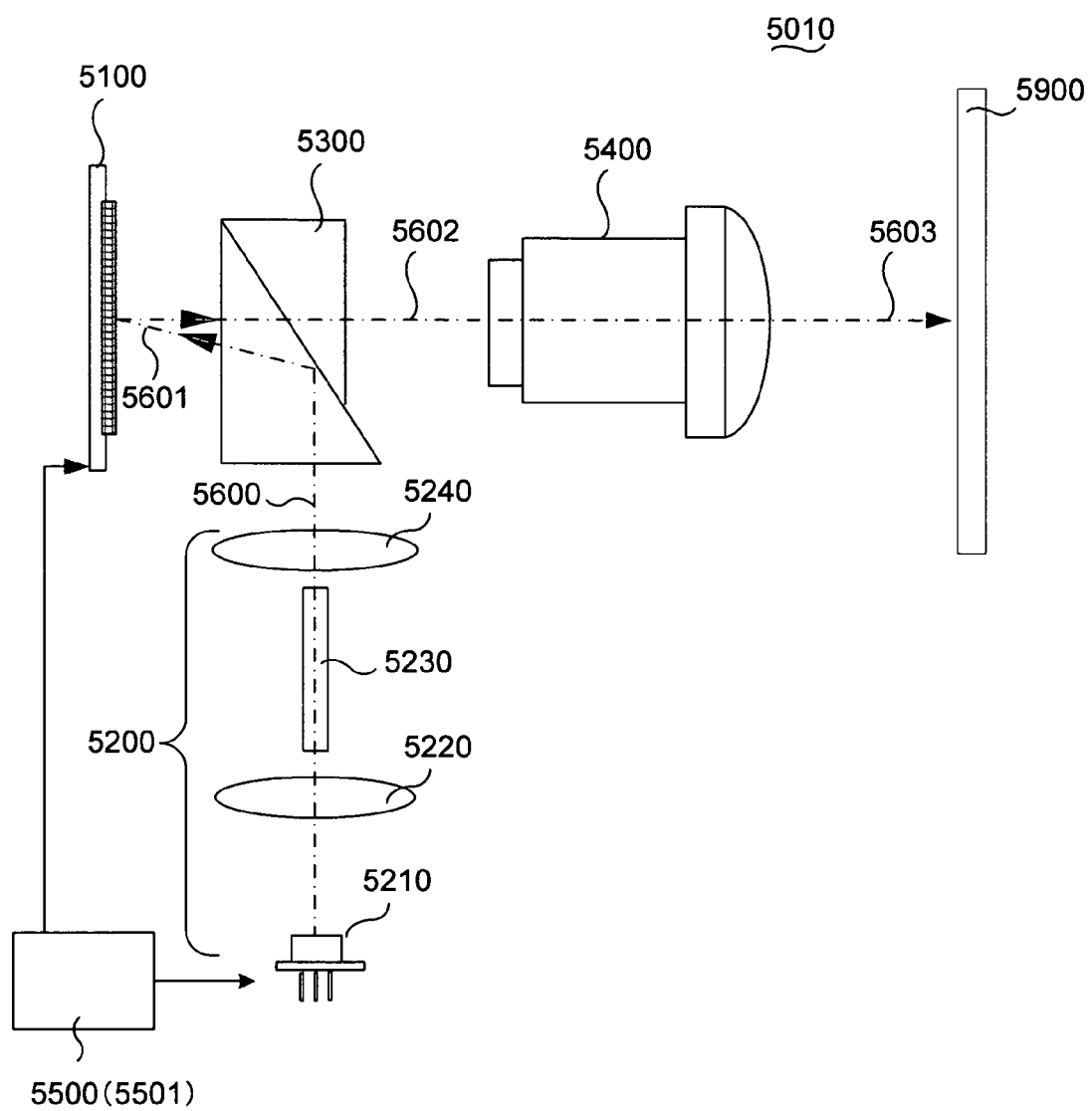
FIG. 1 is a conceptual diagram showing the configuration of a projection apparatus according to a preferred embodiment of the present invention.

FIG. 1 is a functional block diagram for showing the configuration of a single-panel projection apparatus according to a preferred embodiment of the present invention. FIG. 1 shows a projection apparatus 5010 that includes a single spatial light modulator (SLM) 5100, a control unit 5500, a Total Internal Reflection (TIR) prism 5300, a projection optical system 5400 and a light source optical system 5200. The projection apparatus 5010 is commonly known as single-panel projection apparatus 5010 because the apparatus is implemented with a single spatial light modulator 5100.

The projection optical system 5400 is implemented with the spatial light modulator 5100 and TIR prism 5300 along the optical axis of the projection optical system 5400. The light source optical system 5200 is placed with a configuration to have an optical axis matches the optical axis of the projection optical system 5400.

The TIR prism 5300 directs the illumination light 5600, projected from the light source optical system 5200 placed onto the side, towards the spatial light modulator 5100 at a prescribed inclination angle as incident light 5601 and transmits the reflection light 5602, reflected by the spatial light modulator 5100, to the projection optical system 5400. The projection optical system 5400 projects the reflection light 5602, coming in from the spatial light modulator 5100 and TIR prism 5300, onto a screen 5900 as projection light 5603.

The light source optical system 5200 includes an adjustable light source 5210 for generating the illumination light 5600, a condenser lens 5220 for focusing the illumination light 5600, a rod type condenser body 5230, and a condenser lens 5240.

The adjustable light source 5210, condenser lens 5220, rod type condenser body 5230 and condenser lens 5240 are sequentially placed in the aforementioned order in the optical axis of the illumination light 5600 emitted from the adjustable light source 5210 and incident to the side face of the TIR prism 5300.

The projection apparatus 5010 employs a single spatial light modulator 5100 for displaying a color image on the screen 5900 by displaying a sequential color display method.

Specifically, the adjustable light source 5210, comprises a red laser light source 5211, a green laser light source 5212, and a blue laser light source 5213 (not shown in drawing) and allows independent controls for the light emission states, divides one frame of display data into multiple sub-fields (in this case, three sub-fields, specifically red (R), green (G) and blue (B)) and causes each of the light sources, red 5211, green 5212, and blue 5213, to emit each respective light in time series at the time band corresponding to the sub-field of each color as described later.

Figure 2:
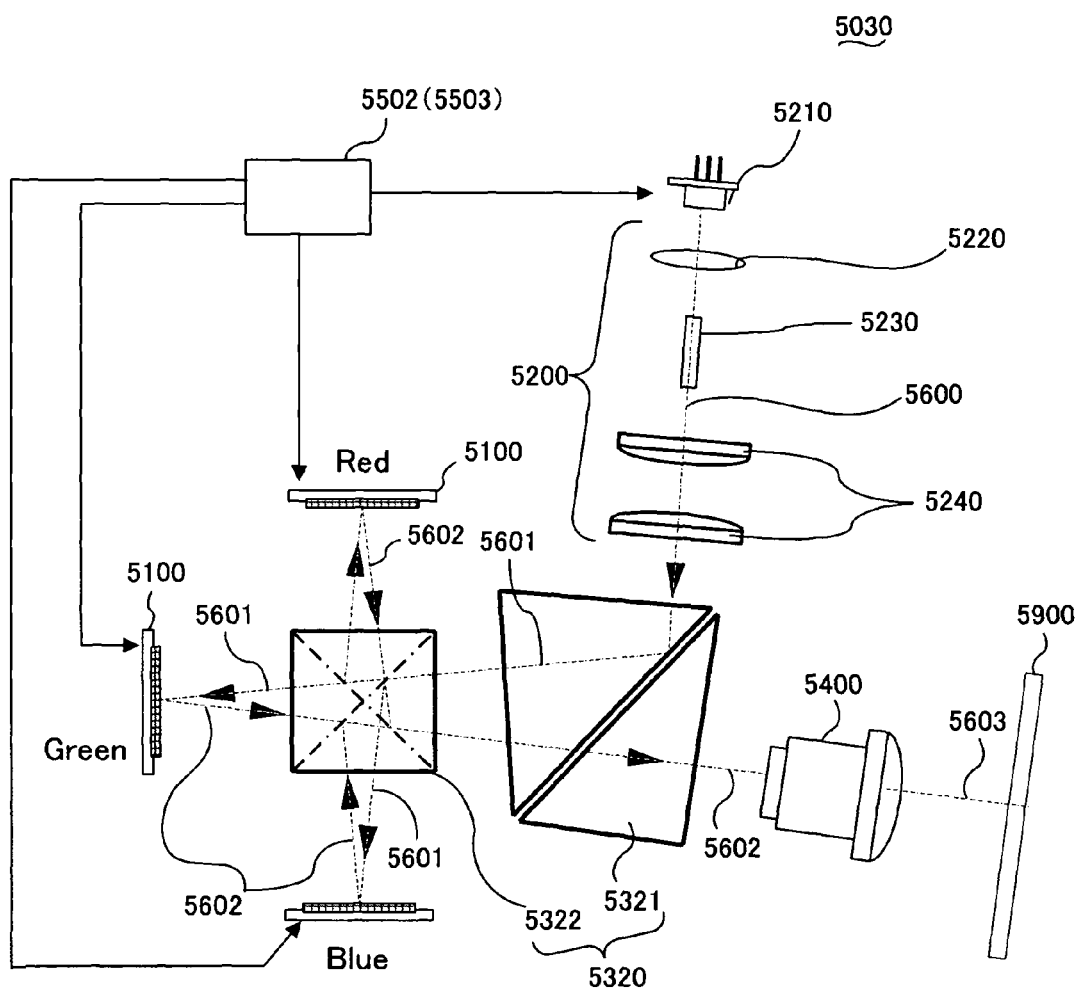
FIG. 2 is a conceptual diagram showing the configuration of an exemplary modification of a multi-panel projection apparatus according to another preferred embodiment of the present invention.

FIG. 2 is a functional block diagram for showing the configuration of a multi-panel projection apparatus according to another preferred embodiment of the present invention. This exemplary projection apparatus comprises a light separation/synthesis optical system 5320 in place of the light separation/synthesis optical system 5310 described above. The light separation/synthesis optical system 5320 comprises a TIR prism 5321 and a cross dichroic mirror 5322. The TIR prism 5321 serves the functions to direct illumination light 5600, incident from the lateral direction of the optical axis of the projection optical system 5400, towards the spatial light modulators 5100 as incident light 5601.

The cross dichroic mirror 5322 serves the function of separating red, blue and green lights from the incident light 5601, incoming from the TIR prism 5321, causing the incident lights 5601 of the three colors enter the red-use, blue-use and green-use spatial light modulators 5100, respectively, and also converging the reflection lights 5602 reflected by the respective color-use spatial light modulators 5100 and directing it towards the projection optical system 5400.

Figure 3A:
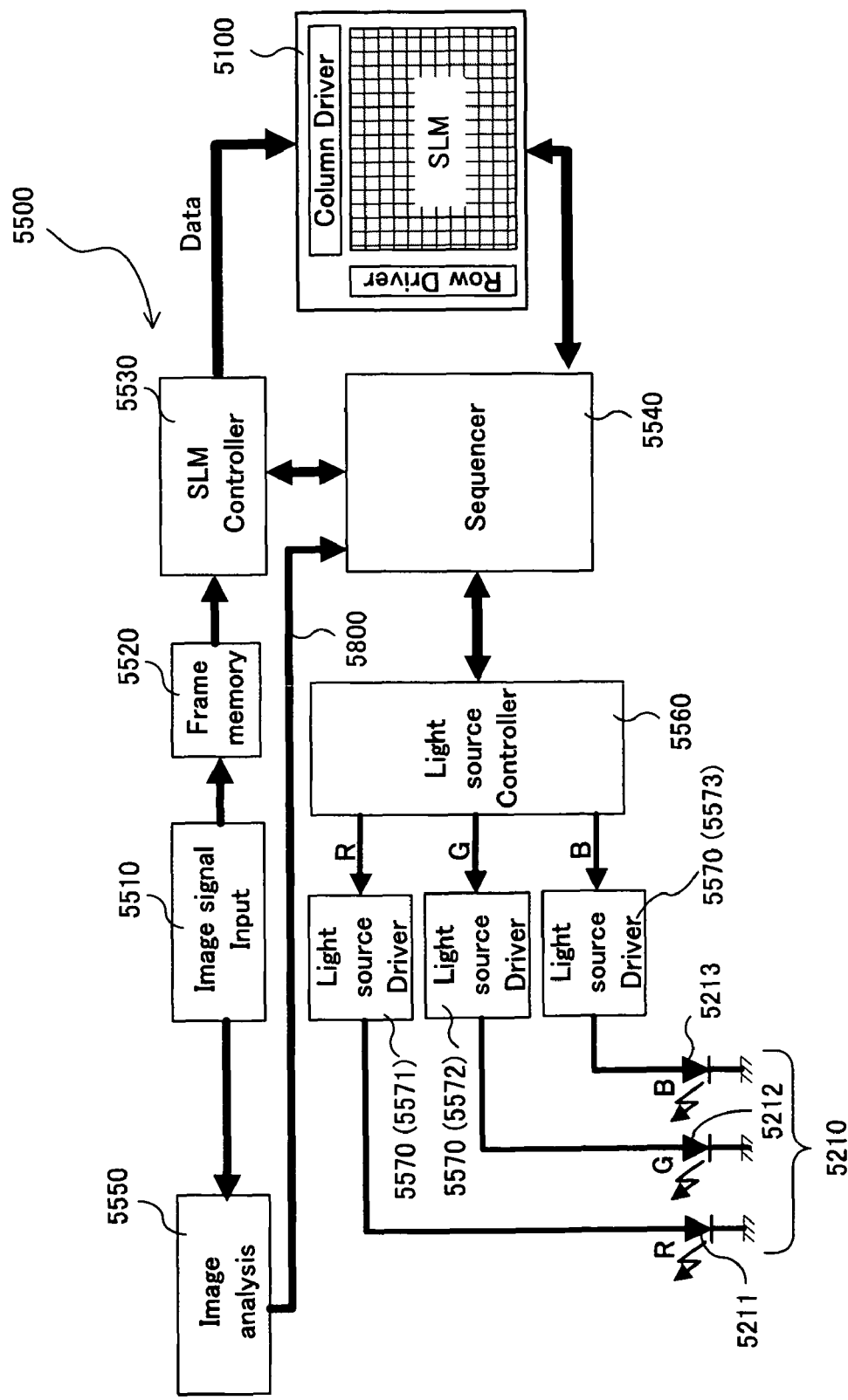
FIG. 3A is a functional block diagram showing a configuration of a control unit comprised in a single-panel projection apparatus according to a preferred embodiment of the present invention.

FIG. 3A is a functional block diagram showing an exemplary configuration of a control unit 5500 comprised in the above-described single-panel projection apparatus 5010. The control unit 5500 comprises a frame memory 5520, an SLM controller 5530, a sequencer 5540, a video image analysis unit 5550, a light source control unit 5560, and a light source drive circuit 5570.

The sequencer 5540, as that implemented in a microprocessor, controls the operation timing of the entirety of the control unit 5500 and spatial light modulator 5100. The frame memory 5520 retains the amount of one frame of input digital video data 5700 incoming from an external device (not shown in drawing), which connected to a video signal input unit 5510. The input digital video data 5700 is updated, moment-by-moment, every time the display of one frame is completed. The SLM controller 5530 processes the input digital video data 5700 received from the frame memory 5520 and separates the data received into a plurality of sub-fields 5701 through 5703, and outputs the separated data for the subfields to the spatial light modulators 5100 as binary data 5704 and non-binary data 5705 to carry out the ON/OFF control and oscillation control of the mirror 5112 of the spatial light modulator 5100.

The sequencer 5540 generates a timing signal for inputting to the spatial light modulator 5100 in sync with the generation of the binary data 5704 and non-binary data 5705 at the SLM controller 5530. The video image analysis unit 5550 outputs a video image analysis signal 5800 for generating various light source pulse patterns taking into account of the input digital video data 5700 inputted from the video signal input unit 5510.

The light source drive circuit 5570 of the light source control unit 5560 controls the operation of the adjustable light source 5210 to project the illumination light 5600, by means of a light source profile control signal that generates light source pulse patterns 5801 through 5811, on the basis of the video image analysis signal 5800 obtained from the video image analysis unit 5550 by way of the sequencer 5540.

The light source drive circuit 5570 drives the red 5211, green 5212, and blue laser light source 5213 of the adjustable light source 5210 to emit light, so as to generate the light source pulse patterns 5801 through 5811) that are inputted from the light source control unit 5560. Note that this configuration is implemented with independent light source drive circuits 5571, 5572 and 5573, respectively correspondingly to the red 5211, green 5212, and blue laser light source 5213, which emit the colors red (R), green (G) and blue (B).

Figure 3B:
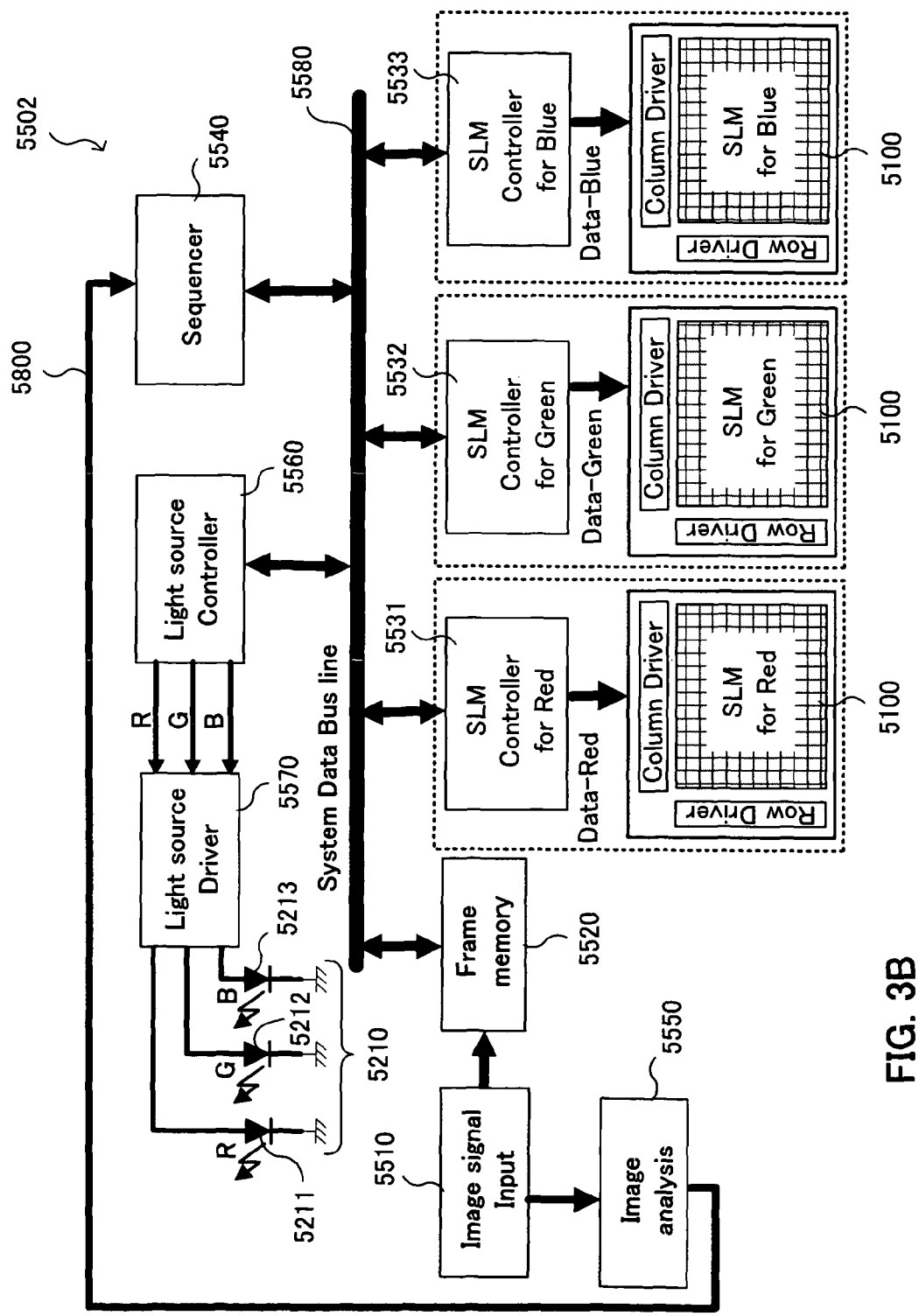
FIG. 3B is a functional block diagram showing a configuration of the control unit of a multi-panel projection apparatus according to a preferred embodiment of the present invention.

FIG. 3B is a functional block diagram for illustrating the configuration of the control unit of a multi-panel projection apparatus according to the present embodiment. The control unit 5502 comprises a plurality of SLM controllers 5531, 5532 and 5533 that control each of the multiple spatial light modulators 5100 implemented for the respective colors R, G and B. The main difference from the above described control unit 5500 is the comprisal of the controllers; otherwise they are similar.

Specifically, the SLM controllers 5531, 5532 and 5533 correspond to the respective spatial light modulators 5100 for each color implemented on the same substrates as those of the spatial light modulators 5100. This configuration has the advantage to place the individual spatial light modulators 5100 and the corresponding SLM controllers 5531, 5532 and 5533 close to each other, thereby enabling a high-speed data transfer rate.

Furthermore, n order to speed up and simplify the connection path of each connecting element, a system bus 5580 is used for interconnecting the frame memory 5520, light source control unit 5560, sequencer 5540, and SLM controllers 5531 through 5533.

Figure 3C:
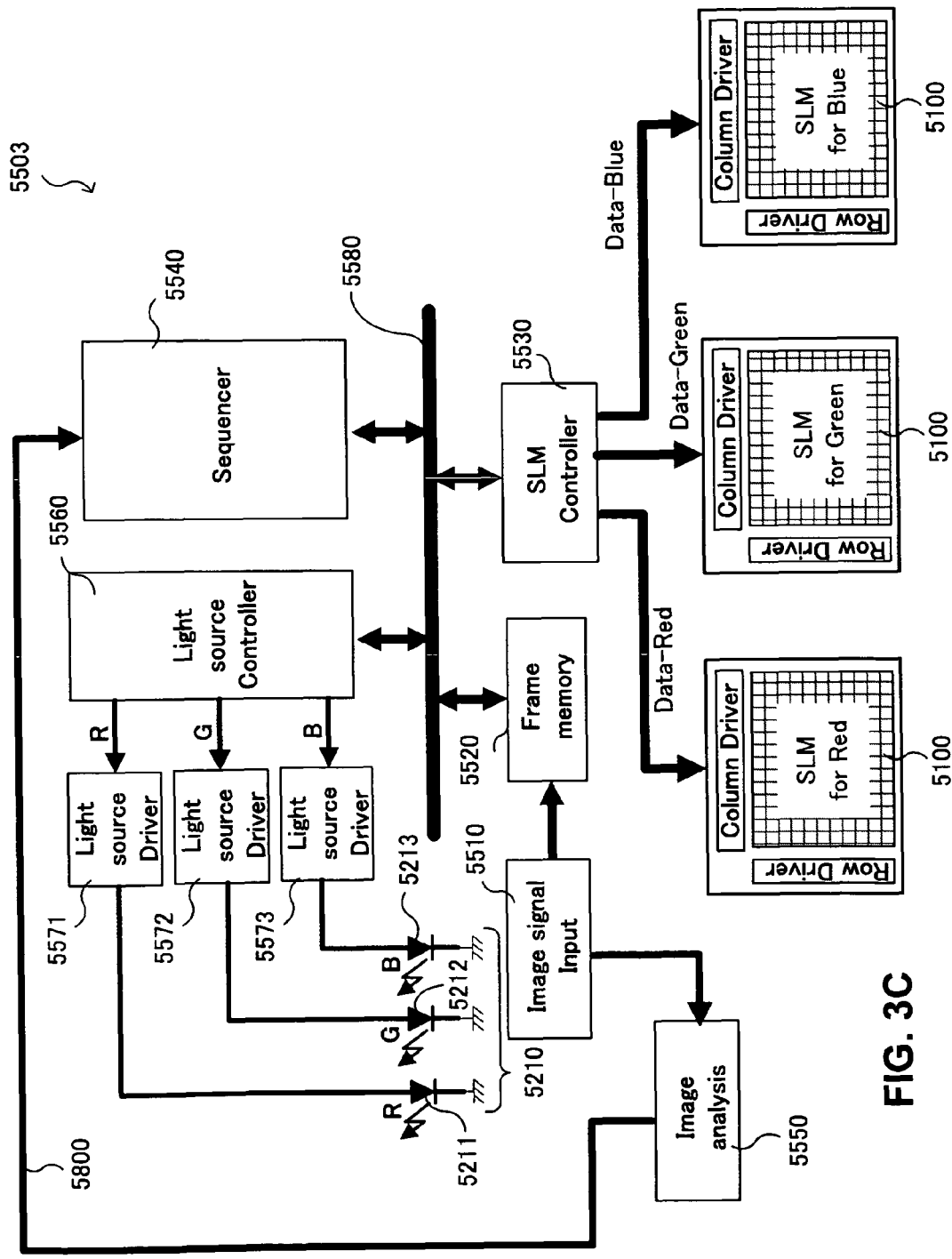
FIG. 3C is a functional block diagram showing a configuration of the control unit used for a multi-panel projection apparatus according to a preferred embodiment of the present invention.

FIG. 3C is a functional block diagram showing the configuration of a control unit used for a multi-panel projection apparatus according to the present embodiment. The control unit 5503 differs from the above described control unit 5500 in that control unit 5503 is controlled by light source drive circuits 5571, 5572 and 5573, all of which are specifically used, respectively, for the red 5211, green 5212, and blue laser light source 5213. Control unit 5503 also causes a common SLM controller 5530 to control the multiple spatial light modulators 5100 implemented for each of the colors R, G and B; otherwise, control unit 5503 is similar to control unit 5500.

This configuration has the advantages that there is a single chip SLM controller 5530 control the multiple spatial light modulators 5100; thereby the size of the apparatus is further reduced.

Figure 4A:
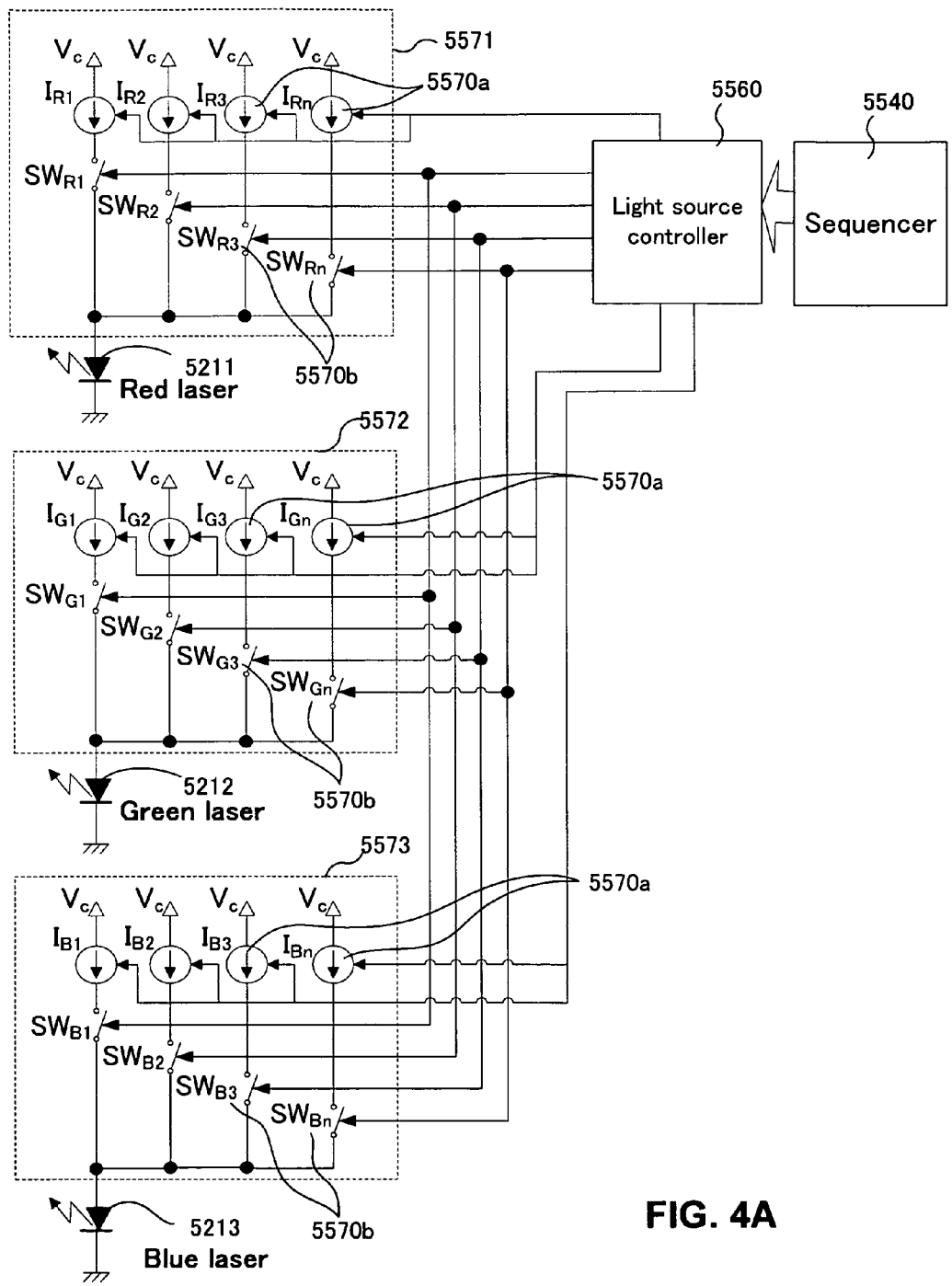
FIG. 4A is a block diagram showing a configuration of the light source control circuit of a projection apparatus according to a preferred embodiment of the present invention.

FIG. 4A is a circuit block diagram for illustrating the configuration of the light source drive circuit 5570 (i.e., the light source drive circuits 5571, 5572 and 5573) according to the present embodiment. The light source drive circuit as shown in FIG. 4A comprises a plurality of constant current circuits 5570$a$ (i.e., I (R, G. B)$_1$ through I (R, G. B)$_n$) and a plurality of switching circuits 5570$b$ (i.e., switching circuits SW (R, G, B)$_1$ through SW (R, G, B)$_n$) that correspond to the respective constant current circuits 5570$a$, in order to generate the desired light intensities of emission $P_1$ through $P_n$ for the light source optical system 5200 (i.e., the red 5211, green 5212, and blue laser light source 5213).

The switching circuit 5570$b$ switches the light source to achieve a targeted emission profile according to the light source optical system 5200 (i.e., the red 5211, green 5212, and blue laser light source 5213).

With the gray scale of the emission intensity of the light source optical system 5200 designated at N bits (where N≧n), the setup values of the output current of the constant current circuits 5570a (i.e., constant current circuits I (R, Q B)$_n$), are as follows:

$$I(R,G,B)_1 = I_{th} + LSB$$

$$I(R,G,B)_2 = LSB+1$$

$$I(R,G,B)_3 = LSB+2$$

...

...

$$I(R,G,B)_n = MSB$$

This is an example of a gray scale display on the basis of an emission intensity. A display with similar gray scale is achievable even for a light source with variable emission period (i.e., an emission pulse width) and emission interval (i.e., an emission cycle).

The relationship between the emission intensity $P_n$ of the adjustable light source and drive current for each color in this case is as follows. Note that "k" is an emission efficiency corresponding to the drive current:

$$P_1 = k^*(I_{th} + I_1)$$

$$P_2 = k^*(I_{th} + I_1 + I_2)$$

...

...

$$P_n = k^*(I_{th} + I_1 + I_2 + \ldots + I_{n-1} + I_n)$$

Figure 4B:
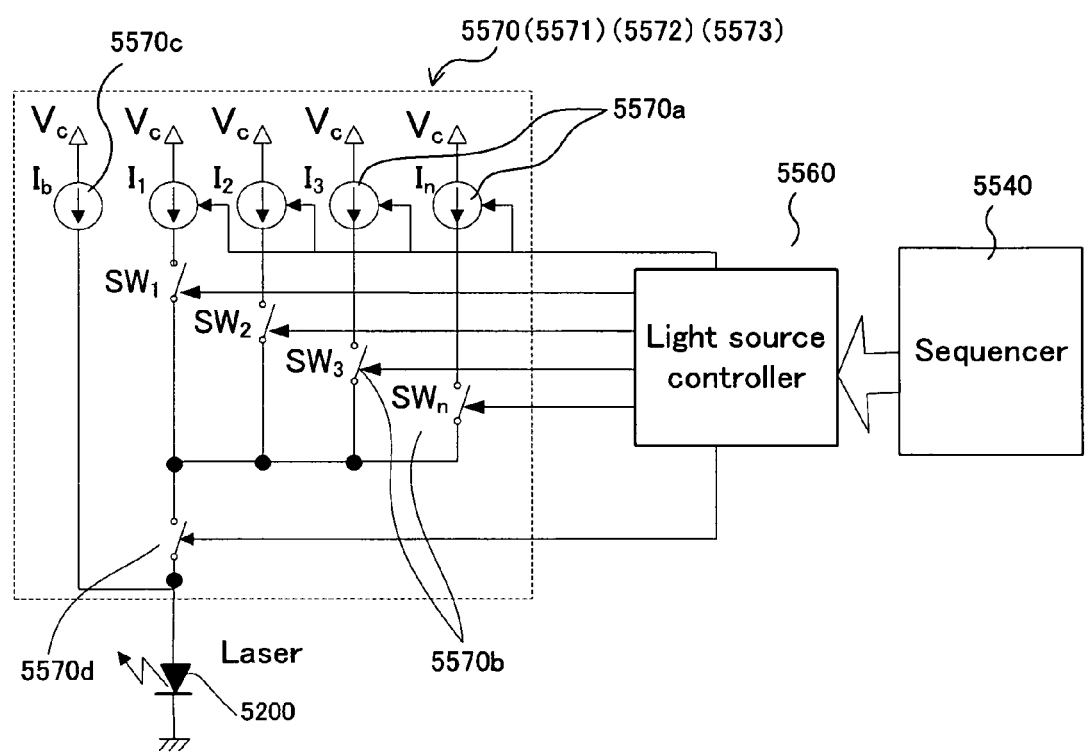
FIG. 4B is a block diagram showing an alternate configuration of the light source control circuit of a projection apparatus according to a preferred embodiment of the present invention.

FIG. 4B is a circuit block diagram for illustrating an exemplary modification of the configuration of the light source drive circuit according to the present embodiment. For simplicity, FIG. 4B denotes the constant current circuits 5570a (I (R, G, B)$_1$ through I (R, G, B)$_n$) as I$_1$ through I$_n$ and the switching circuits 5570b (SW (R, G, B)$_1$ through SW (R, G, B)$_n$) as switching circuits 5570b (SW$_1$ through SW$_n$).

As described below, the light source drive circuits 5570 according to the present embodiment are configured to control the individual constant current circuit 5570 (i.e., I (R, G, B)$_1$ in this case) to supply a current value equivalent to the threshold current I$_{th}$ of the light source optical system 5200. Alternately, the individual constant current circuit supplies a current value close to the aforementioned threshold current as a bias current I$_b$ when a semiconductor laser or a similar light source is used as the light source optical system 5200. By using a high-speed current drive; the respective switching operations of the light source drive circuits 5570 are stabilized to provide a high-speed emission.

The light source drive circuits 5570 (i.e., the light source drive circuits 5571, 5572, and 5573) as shown in FIG. 4B comprise bias current circuits 5570c, which are continuously connected to the light source optical systems 5200 (i.e., the red 5211, green 5212, and blue laser light source 5213) and used for applying a bias current I$_b$, in addition to comprising the constant current circuits 5570a.

Furthermore, the connection of the constant current circuits 5570a to the entirety of the light source optical systems 5200 is configured through a switching circuit 5570d formed subsequent to the switching circuits 5570b.

In the case of the configuration shown in FIG. 4B, the relationship between the emission intensity $P_n$ and the drive current of the adjustable light source for each wavelength is as follows, where "k" is the emission intensity in terms of drive current:

$$P_b = k^* I_b (I_b \approx I_{th})$$

$$P_1 = k^*(I_{th} + I_1)$$

$$P_2 = k^*(I_{th} + I_1 + I_2)$$

...

...

$$P_n = k^*(I_{th} + I_1 + I_2 + \ldots + I_{n-1} + I_n)$$

Specifically, the relationship between each switching operation and emission output is as follows:

$$SW_{pulse} = OFF: P_b = k^* I_b \approx 0 [mW] \text{ (where } I_b \approx I_{th}\text{)}$$

$$SW_1 : P_1 = k^*(I_b + I_1)$$

$$SW_2 : P_2 = k^*(I_b + I_1 + I_2)$$

...

...

$$SW_n : P_n = k^*(I_b + I_1 + I_2 + \ldots I_{n-1} + I_n)$$

The control circuit has the advantage of providing an emission profile with an emission intensity $P_b$ nearly zero.

The use of the switching circuits 5570d as shown in FIG. 4B has an advantage of implementing a circuit operation unaffected by a drive current switching over caused by the switching circuits 5570b (SW$_1$ through SW$_n$). Each of the switching circuits 5570b is connected to the respective constant current circuits 5570a. Furthermore, when the adjustable light source 5210 is not emitting light, the switching circuits (SW$_1$ through SW$_n$) are switched over adjustable light source adjustable light source.

While the bias current value is designated at a fixed current value in the configuration of FIG. 4B, it is another option is to connect the constant current circuit 5570a to the light source control unit 5560 with a variable and adjustable bias current.

Note that the descriptions for FIGS. 4A and 4B have been provided for the case of changing the emission profiles of the adjustable light source for each sub-frame corresponding to each gray scale bit. If the display gray scale function of the spatial light modulator 5100 is used in parallel, the number of required levels of electrical current decreases, thus reducing the number of constant current circuits 5570a and switching circuits 5570b. It is therefore possible to obtain the number of gray scales equal to, or higher than, the gray scales achievable through the modulation process of the spatial light modulator 5100.

Figure 5:
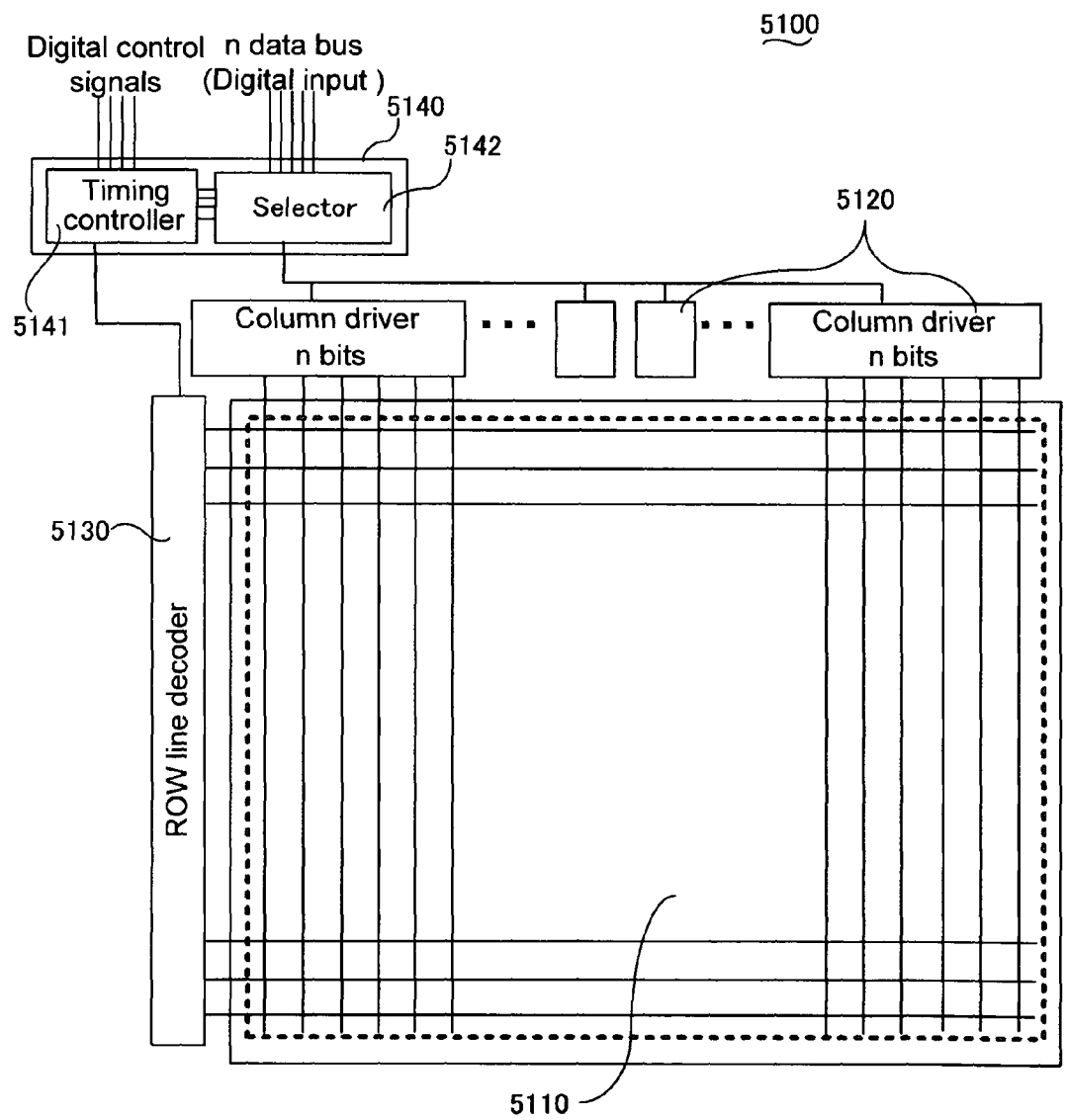
FIG. 5 is a schematic diagram exemplifying the layout of the internal configuration of a spatial light modulator according to the preferred embodiment of the present invention.
Figure 6:
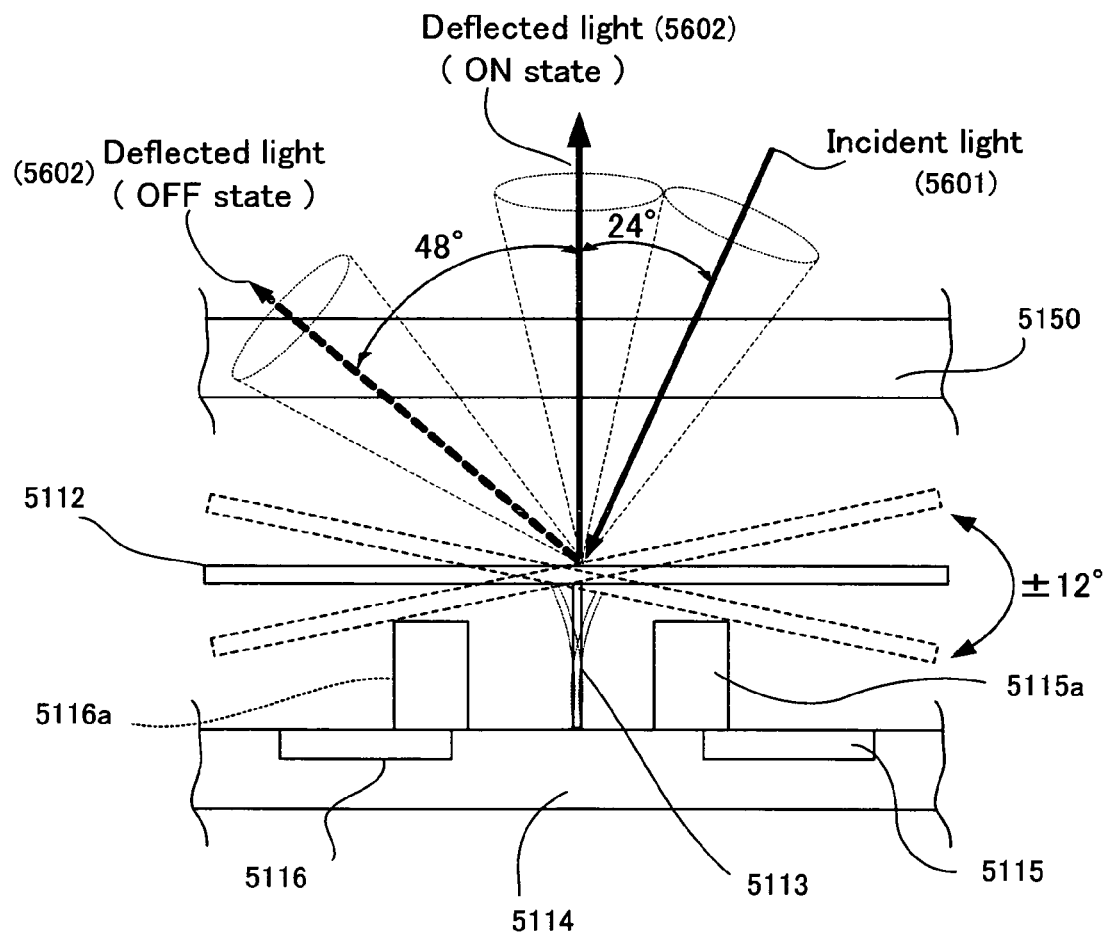
FIG. 6 is a cross-sectional view of an individual pixel unit implemented in a spatial light modulator according to the preferred embodiment of the present invention.
Figure 7:
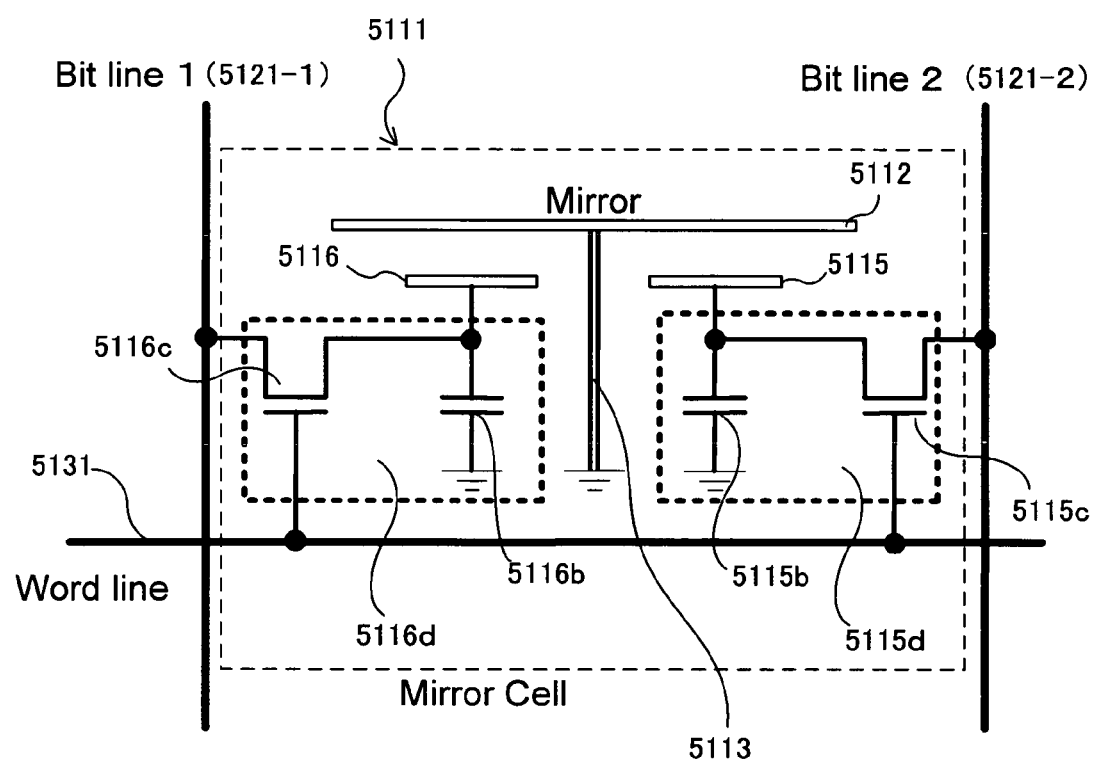
FIG. 7 is a block diagram showing the configuration of an individual pixel unit implemented in a spatial light modulator according to the preferred embodiment of the present invention.

The followings are further detail descriptions of one example configuration of a spatial light modulator 5100 according to the present embodiment. The spatial light modulator 5100, according to the present embodiment, is a deflectable mirror device that arranges a plurality of mirror elements in a two-dimensional array. FIG. 5 is a circuit schematic diagram showing the layout of the internal configuration of the spatial light modulator 5100 according to the present embodiment. FIG. 6 is a cross-sectional diagram of an individual pixel unit implemented in the spatial light modulator 5100 according to the present embodiment, and FIG. 7 is a side cross-sectional view showing an exemplary configuration of an individual pixel unit implemented in the spatial light modulator 5100 according to the present embodiment.

According to the present embodiment and as that illustrated in FIG. 5, the spatial light modulator 5100 comprises a mirror element array 5110, column (COLUMN) drivers 5120, row (ROW) line decoders 5130, and an external interface unit 5140. The external interface unit 5140 comprises a timing controller 5141 and a selector 5142. The timing controller 5141 controls the row line decoder 5130 on the basis of a timing signal from the SLM controller 5530. The selector 5142 supplies the column driver 5120 with a digital signal incoming from the SLM controller 5530.

A plurality of mirror elements of the mirror element array 5110 are arrayed at the positions where individual bit lines 5121, vertically extended from the column drivers 5120, crosses individual word lines 5131, horizontally extended from the row line decoders 5130. The individual mirror element 5111 shown in FIG. 6 comprises a freely deflectable mirror 5112 supported on a substrate 5114 by way of a hinge 5113. The mirror 5112 is covered with a cover glass 5150 for protection. The mirror further includes an OFF electrode 5116 (and an OFF stopper 5116a) and an ON electrode 5115 (and an ON stopper 5115a). The electrodes and stoppers are symmetrically positioned across the hinge 5113 on the substrate 5114.

The OFF electrode 5116 attracts the mirror 5112 with a Coulomb force by the application of a predetermined voltage and tilts the mirror 5112 to a position of contact with the OFF stopper 5116a. This causes the incident light 5601, incident to the mirror 5112, to reflect along an OFF direction, away from the optical axis of the projection optical system 5400. The ON electrode 5115 draws the mirror 5112 with a Coulomb force by the application of a predetermined voltage and tilts the mirror 5112 to a position of contact with the ON stopper 5115a. This causes the incident light 5601, incident to the mirror 5112, to reflect along the ON direction to align with the optical axis of the projection optical system 5400.

Figure 8:
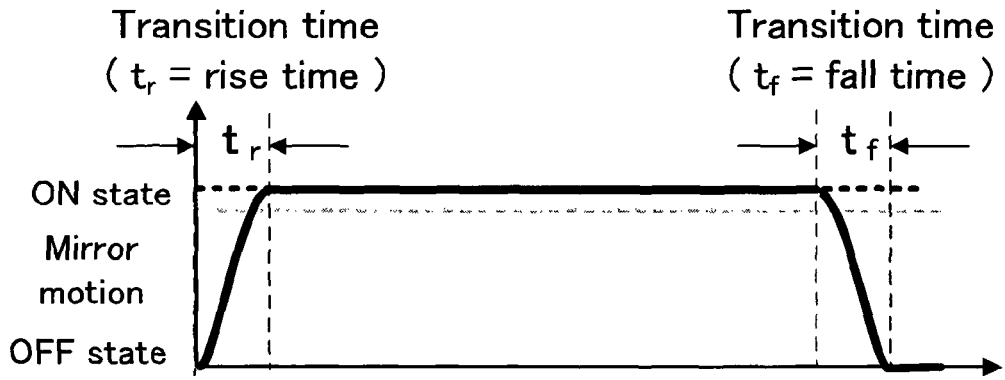
FIG. 8 is a timing diagram showing the transition response between an ON state and an OFF state of a mirror on a spatial light modulator.

FIG. 8 is a timing diagram for showing a transition response between the ON state and OFF state of the mirror 5112: In the transition from the OFF state, when the mirror is drawn by the OFF electrode 5116 and in contact with the OFF stopper 5116a, to the ON state, when the mirror is drawn by the ON electrode 5115 and in contact with the ON stopper 5115a, a rise time $t_r$ is required until the transition to a complete ON state at the beginning of the transition start, and likewise, a fall time $t_f$ is required until the transition to a complete OFF state.

Since the reflection light 5602 in the transition states of the rise time $t_r$ and the fall time $t_f$ generates an error factor in a grayscale display, the present embodiment is configured to carry out a control to suppress the emission of the adjustable light source 5210 (described later), thereby eliminating the use of the reflection light 5602 in the transition states.

Figure 9:
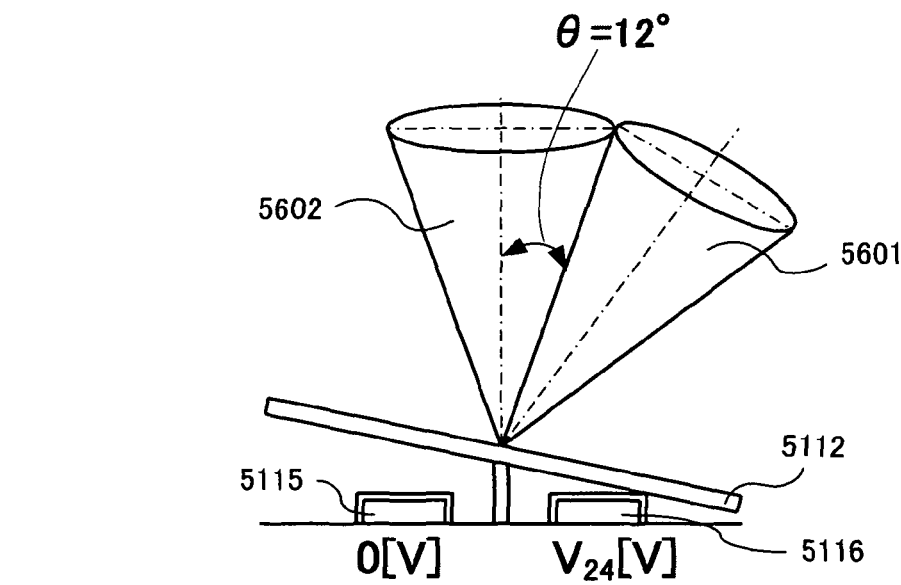
FIG. 9 is a side perspective view showing the tilt states of a mirror when using a non-directive light source, such as a high-pressure mercury lamp or a xenon lamp.
Figure 9:
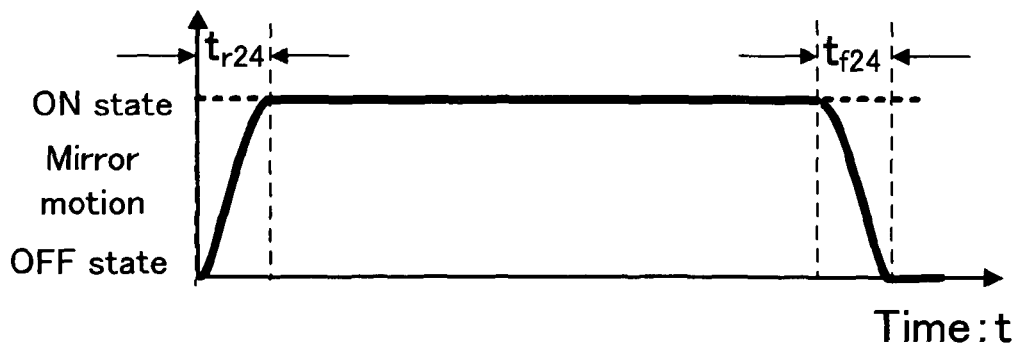

FIG. 9 is a cross sectional view illustrated together with a timing diagram for showing a tilting state of the mirror 5112 when a nondirectional light source, such as a high-pressure mercury lamp or a xenon lamp, is used.

In the case of the conventional technique, the expansions of incident light 5601 and reflection light 5602 are large, and therefore the tilt angle of the mirror 5112 must be set at about ±12 degrees (=24 degrees total) in order to increase the contrast by avoiding interference between the two lights 5601 and 5602. Consequently, both the rise time $t_{r24}$ and fall time $t_{f24}$ are extended in the ON/OFF control of the mirror 5112, and the voltage ($V_{24}$) to be applied to the ON electrode 5115 and OFF electrode 5116, to tilt the mirror 5112 by means of an electrostatic attraction, is also increased.

Figure 10:
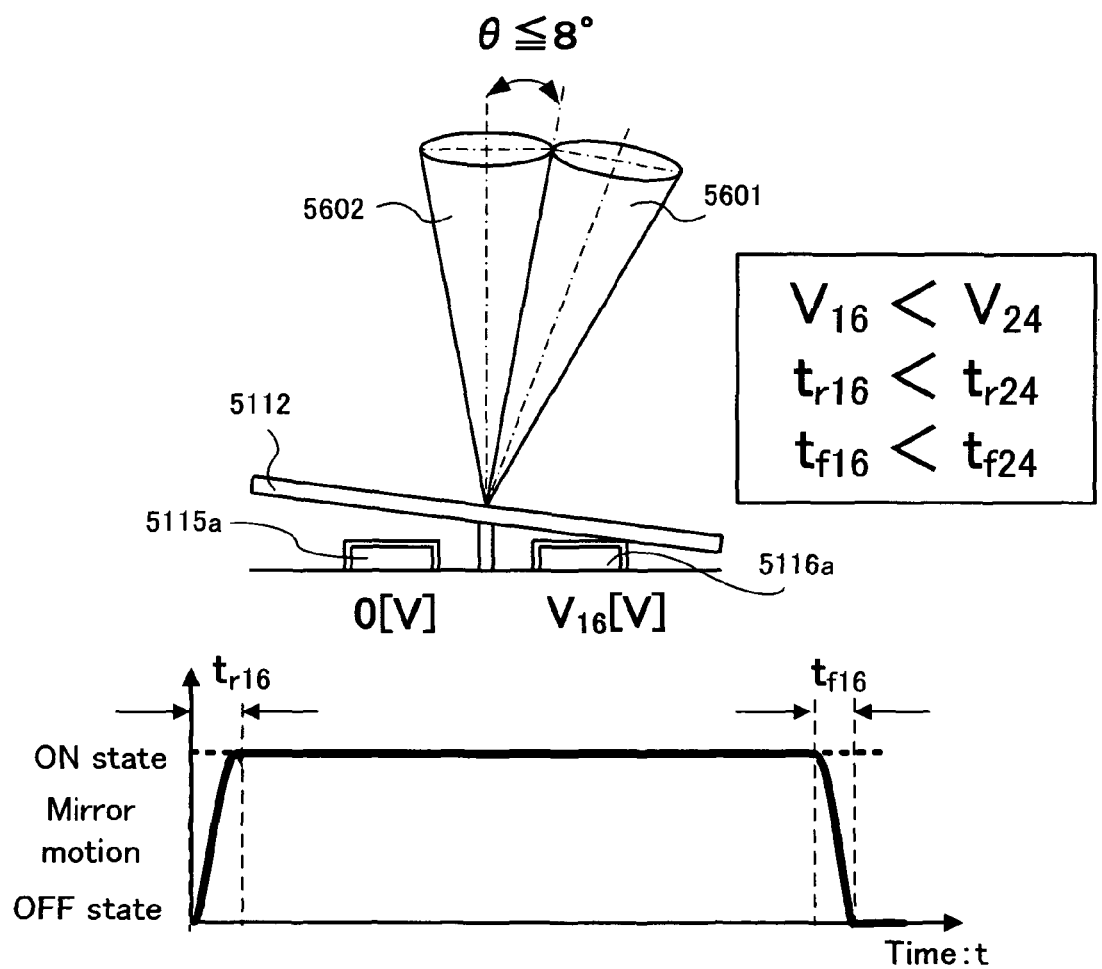
FIG. 10 is a conceptual diagram showing the ON/OFF control for a mirror of a spatial light modulator according to the preferred embodiment of the present invention.

FIG. 10 is a side cross sectional view illustrated together with a timing diagram for showing the ON/OFF control of the mirror 5112 in a spatial light modulator 5100 according to the present embodiment. The projection apparatus according to the present embodiment is implemented with an adjustable light sources 5210 that includes the red 5211, green 5212 and blue laser light source 5213. The light sources of different colors project coherent lights with high directivity, thereby making it possible to decrease the tilting angle θ of the mirror 5112 to about ±8 degrees (=16 degrees total).

As a result, the rise time $t_{r16}$ and fall time $t_{f16}$ can be reduced from the conventional rise time $t_{r24}$ and fall time $t_{f24}$. The voltage ($V_{16}$), to be applied to the ON electrode 5115 and OFF electrode 5116 for tilting the mirror 5112 by means of an electrostatic attraction, can be reduced from the conventional voltage ($V_{24}$) because the distances between the mirror 5112 and the electrodes are shortened, as described later.

As illustrated in the above described FIG. 7, an OFF capacitor 5116b is connected to the OFF electrode 5116, and the OFF capacitor 5116b is connected to a bit line 5121-1 and a word line 5131 by way of a gate transistor 5116c. Furthermore, an ON capacitor 5115b is connected to the ON electrode 5115, and the ON capacitor 5115b is connected to a bit line 5121-2 and a word line 5131 by way of a gate transistor 5115c. The signals on the word line 5131 control the turning-on and turning-off of the gate transistor 5116c. Specifically, the mirror elements 5111 on one horizontal row in line with flexibly selected word line 5131 are simultaneously selected, and the charging and discharging, the charge in the OFF capacitor 5116b and ON capacitor 5115b, are controlled by the bit lines 5121-1 and 5121-2, respectively, and thereby the ON and OFF of the mirrors 5112 of the individual mirror elements 5111 on one horizontal row are respectively controlled.

Embodiment 2

This embodiment of the present invention uses the control unit 5500 described in FIG. 3A. The light source control unit 5560 of the control unit 5500 generates a control signal to drive the light sources of the respective colors R, G and B on the basis of a light source profile control signal 5801 inputted from the sequencer 5540, while the light source drive circuit 5570 causes the light sources of the respective colors R, G and B to perform pulse emission.

Figure 11:
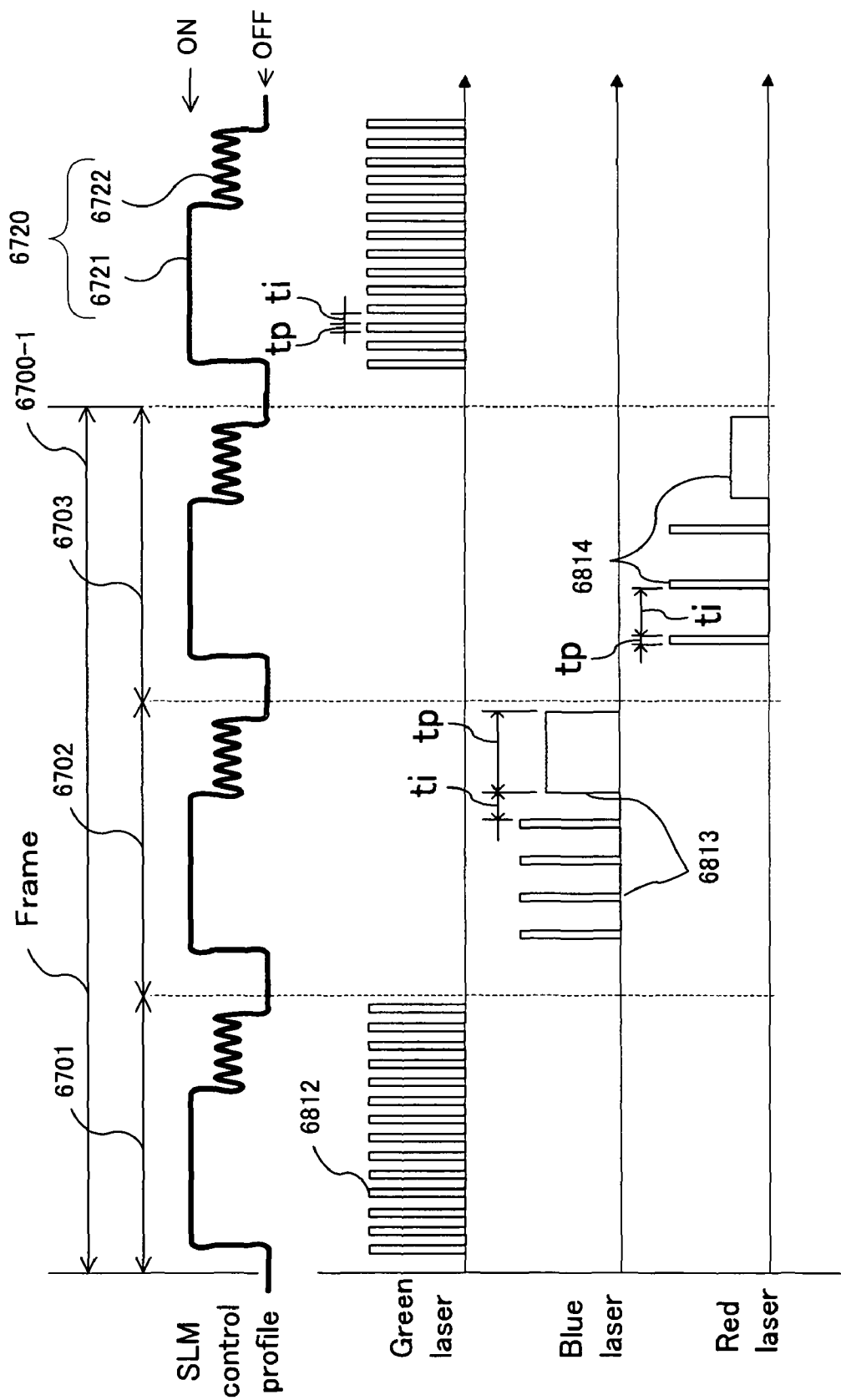
FIG. 11 is a timing diagram illustrating a control signal of a projection apparatus according to the embodiment of the present invention.

FIG. 11 is a timing diagram for showing a control for projecting a color display by means of a color sequential control using the control unit 5500, which is shown in FIG. 3A, and on a single-panel projection apparatus comprising one spatial light modulator 5100, as shown in FIG. 1. The display period of one frame (i.e., frame 6700-1) is further divided, in a time series, to the subfields 6701, 6702 and 6703 corresponding to the respective colors R, G and B. Then, the pulse emission of the green laser light source 5212 is controlled in accordance with a light source pulse pattern 6812 in the green (G) subfield 6701; the pulse emission of the red laser light source 5211 is controlled in accordance with a light source pulse pattern 6814 in the red (R) subfield 6702; and the pulse emission of the blue laser light source 5213 is controlled in accordance with a light source pulse pattern 6813. As described above, the light source drive circuit 5570 performs a control to adjust the emission light intensities for the red 5211, green 5212, and blue laser light source 5213 of the respective colors R, G and B, in accordance with the mirror control profile 6720 generated by the SLM controller 5530.

The present embodiment has the advantage of increasing the levels of the gray scales of the respective colors R, G and B in a color display on a color sequential projection apparatus.

Embodiment 3

The following is a detail description of another preferred embodiment of the present invention with reference to the accompanying drawings.

The following description provides various embodiments, with the configurations and operations of the projection apparatuses described in FIGS. 1 through 10 taken into consideration. Note that the same component and signal labels are assigned to the same constituent component or signal comprised in the above-described configurations, and an overlapping description is not provided here.

Figure 12:
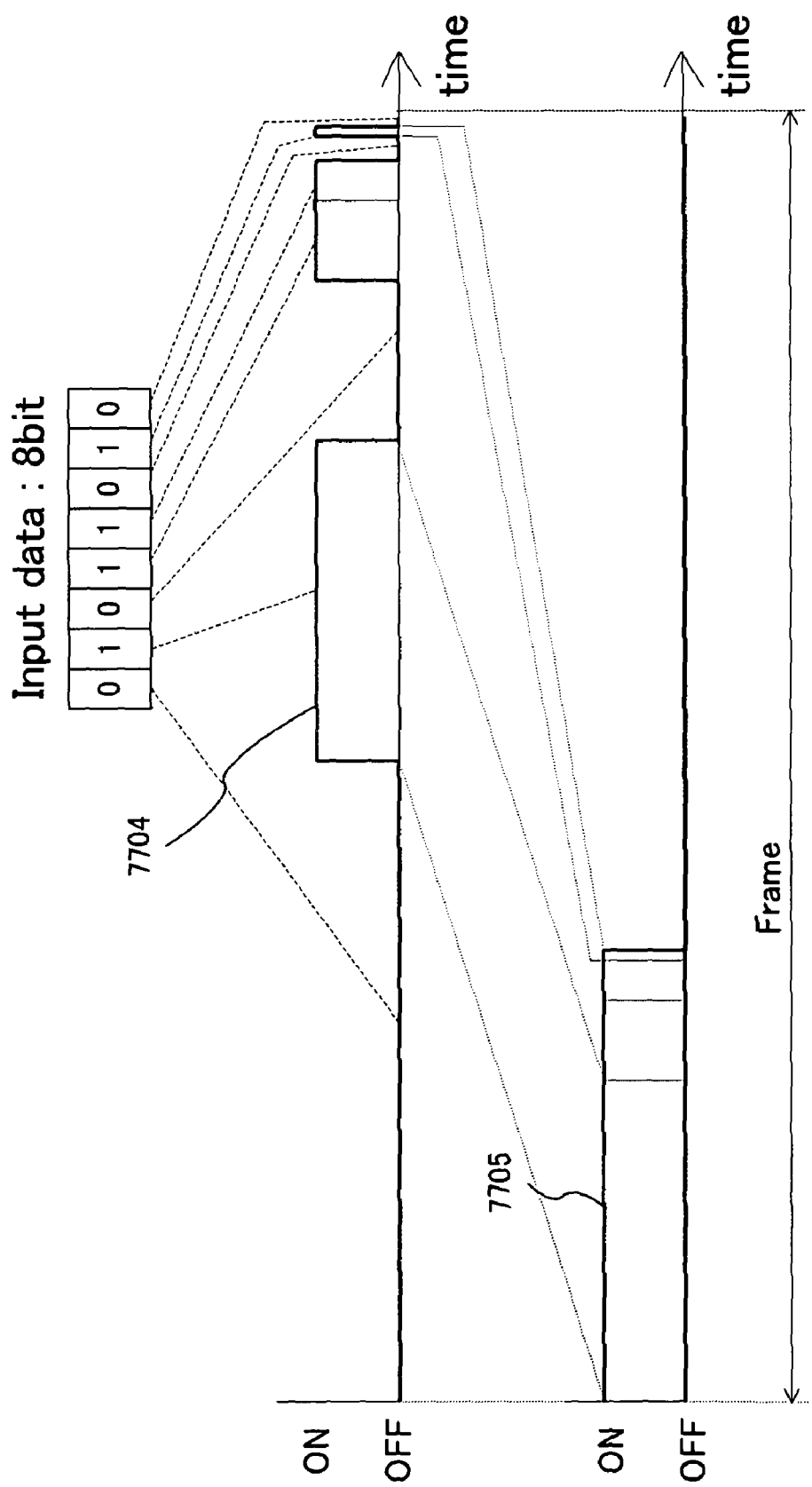
FIG. 12 is a chart describing an exemplary conversion of binary data into non-binary data performed in a projection apparatus according to the preferred embodiment of the present invention.

The SLM controller 5530 according to the present embodiment is configured to carry out an ON/OFF control of the mirror 5112 using non-binary data 7705 obtained by converting binary data 7704, as exemplified in FIG. 12. Specifically, FIG. 12 exemplifies the case of converting binary data 7704, such as a binary data of 8-bit "10101010", into non-binary data 7705 that is a bit string having an equal weighting for each digit. A control is carried out to turn ON the mirror 5112 only for the period in which the bit string continues. In FIG. 12, the non-binary data 7705 is converted and the bit string is packed forward within the display period of one frame, and the mirror 5112 is controlled to turn ON for a predetermined period in accordance with the bit string number from the beginning of a frame display period.

Figure 13:
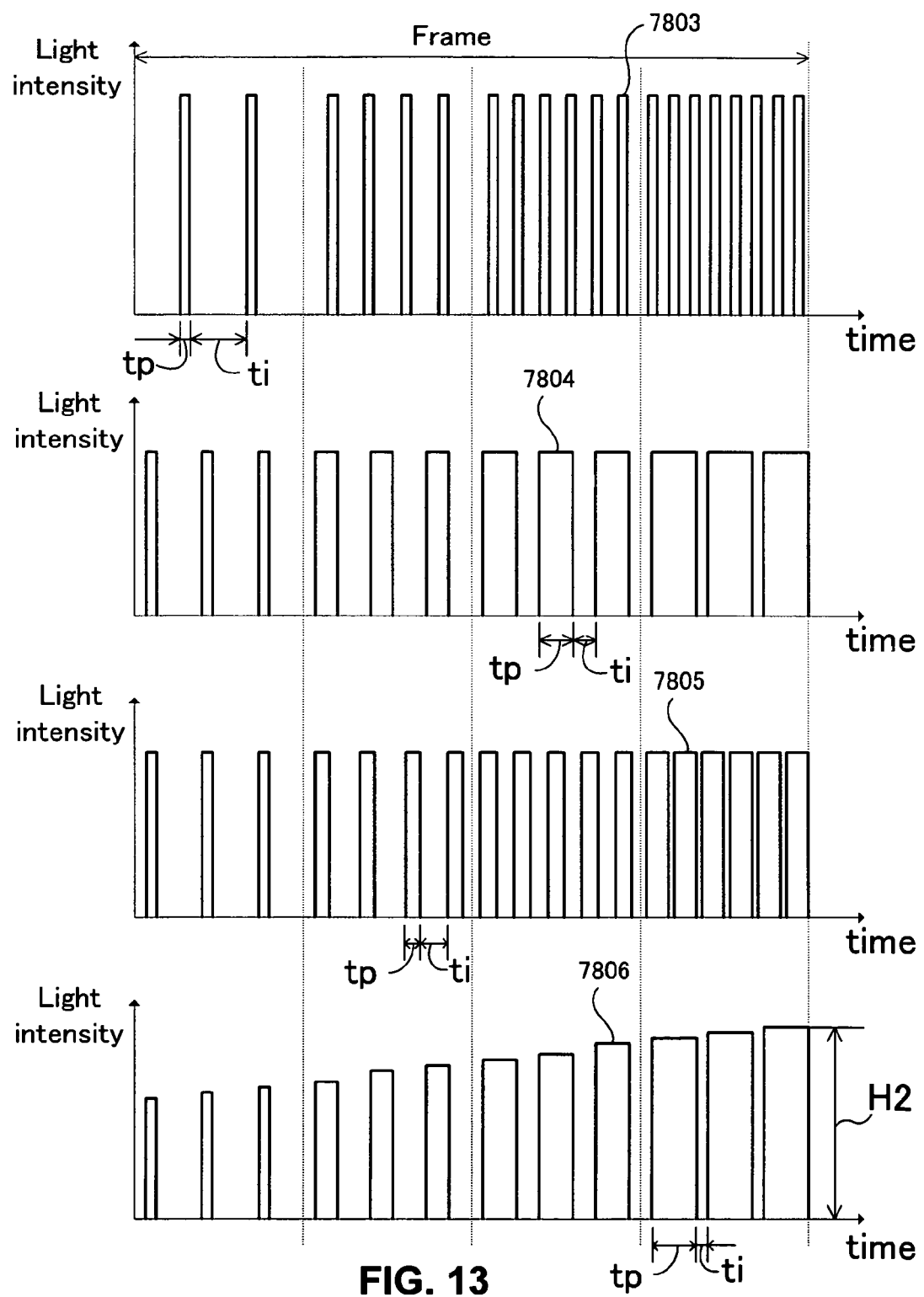
FIG. 13 is a chart exemplifying a gamma correction by means of intermittent pulse emission in a projection apparatus according to the preferred embodiment of the present invention.

FIG. 13 illustrates a control of the light source by applying the aforementioned intermittent pulse emission. A light source pulse pattern 7803 intermittently generates emission pulses having an emission pulse width tp in intervals of emission pulse interval ti and increases the number of emission pulses per unit time by gradually decreasing the emission pulse interval ti between the beginning and end of the display period of one frame, thereby attaining an effect similar to that increasing the light intensity in one frame in a stepwise fashion.

The light source pulse pattern 7804 illustrates an example of gradually increasing or decreasing the emission pulse width tp between the beginning and end of the display period of one frame.

The light source pulse pattern 7805 illustrated the case of gradually decreasing the emission pulse interval ti and also gradually increasing the emission pulse width tp between the beginning and end of the display period of one frame.

The light source pulse pattern 7806 illustrates the case of gradually increasing both the emission pulse width tp and emission intensity H2 between the beginning and end of the display period of one frame.

Embodiment 4

Next is a description of an exemplary configuration of a spatial light modulator 4000 used as the spatial light modulator 5100 in each embodiment of the present invention.

Figure 14:
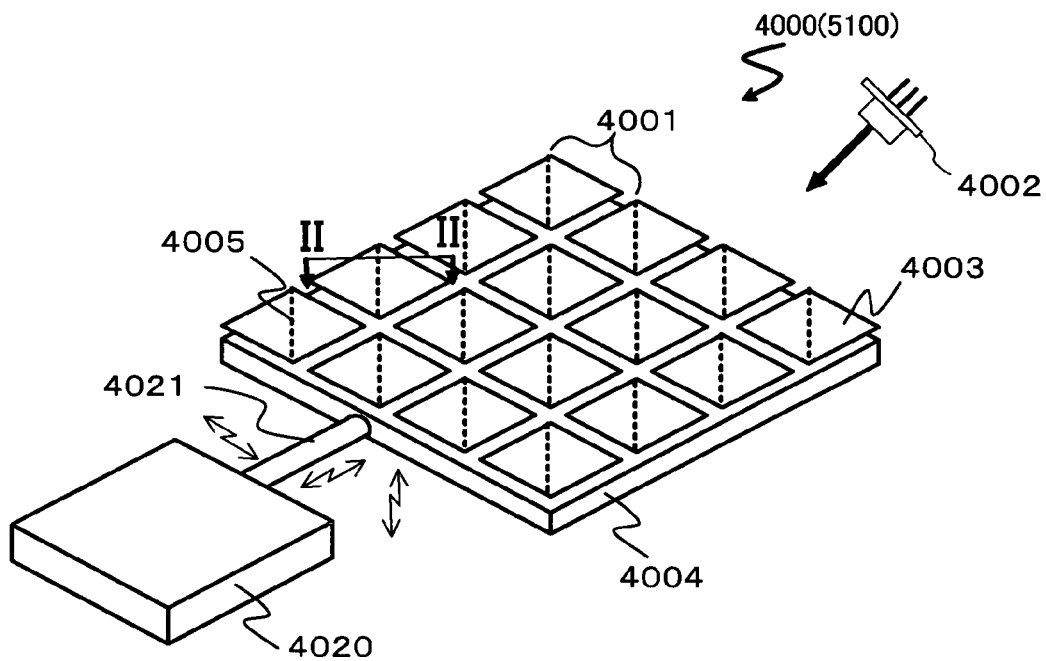
FIG. 14 is a diagonal view diagram of a spatial light modulator implemented with a plurality of mirror elements formed as two dimensional array on a device substrate, for modulating the image projection light by reflecting the light into different reflecting directions.

FIG. 14 is a diagonal view of a spatial light modulator comprising a plurality of mirror elements, each controlling the reflecting direction of an incident light by the deflection of the mirror. The spatial light modulator 4000 includes a plurality of mirror elements each comprising address electrodes (not shown), elastic hinge (not shown), and a square mirror 4003 supported by the elastic hinge arranged crosswise in two dimensions on a device substrate 4004. FIG. 14 shows multiple mirror elements 4001 are arrayed crosswise in constant intervals on the device substrate 4004. Applying a voltage to the address electrode provided on the device substrate 4004 controls the mirror 4003 of one mirror element 4001.

The pitch (i.e., the interval) between adjacent mirrors 4003 is preferably between 4 μm and 14 μm in consideration of the number of pixels required for various levels from a 2K×4K super high definition television ("hi-vision TV"), or the like, to a non-full hi-vision. Here, the pitch is the distance between the respective deflection axes of adjacent mirrors 4003. More preferably, the pitch between the respective deflection axes of adjacent mirrors 4003 is between 4 μm and 7 μm. Note that the form of the mirror 4003 and the pitch between the mirrors 4003 is not limited as such.

The drawing indicates, by a dotted line, the deflection axis 4005, about which a mirror 4003 is deflected. The light emitted from a coherent light source 4002 intersects the mirror 4003 in an orthogonal or diagonal direction in relation to the deflection axis 4005. The coherent light source 4002 may be, for example, a laser light source. As illustrated in FIG. 14, the spatial light modulator 4000 may be implemented with an actuator 4020 for performing a wobbling operation. The actuator 4020 is connected to the device substrate 4004 via a linkage member 4021 to shift the spatial light modulator 4000 for wobbling the mirrors.

The actuator 4020 shifts the spatial light modulator 4000 in a direction parallel to the flat surface of the mirror 4003 and in the direction of the thickness perpendicular to the mirror surface. The shifting of the spatial light modulator 4000 in the horizontal direction attains the wobbling operation, as described later. In order to move the projection image of the reflection light from the spatial light modulator 4000 in the horizontal direction relative to the projection surface, the spatial light modulator 4000 may be inclined in the thickness direction if required. The actuator 4020 may include a converting circuit such as a piezoelectric element for converting an electric signal into displacement, A control circuit such as the control unit 5500 (i.e., the control units 5502 and 5503) controls actuator 4020 along with the spatial light modulator 4000 to implement a wobbling operation of the spatial light modulator 4000 (i.e., the spatial light modulator 5100).

Figure 15:
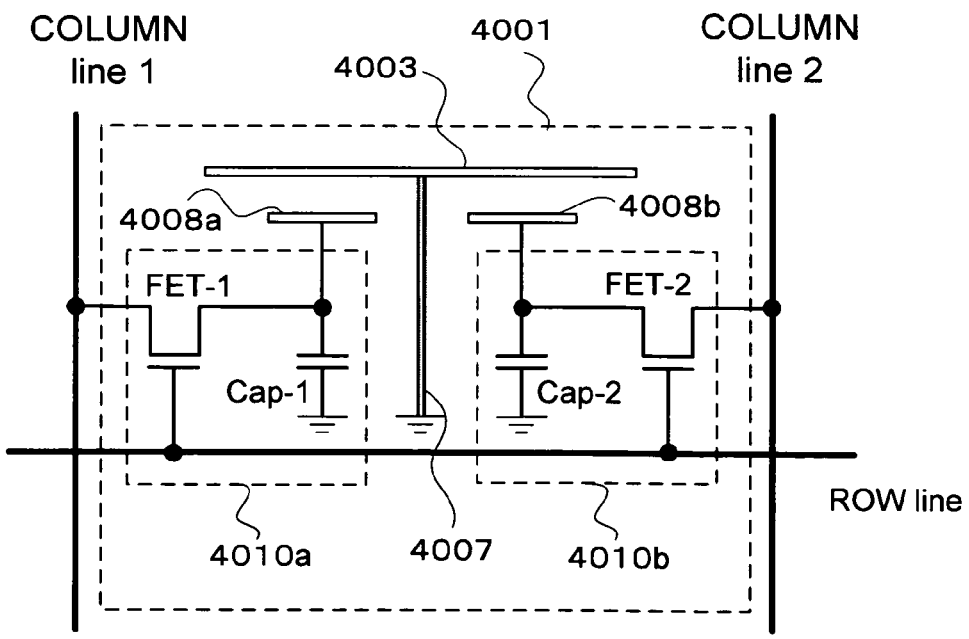
FIG. 15 is an outline diagram of a cross-section of one mirror element of the spatial light modulator, viewed as indicated by the line II-II in FIG. 14.

The following is a description of the configuration and operation of one mirror element 4001 with reference to FIG. 15, a block diagram of a cross-section for one mirror element of the spatial light modulator 4000 viewed as indicated by the line 11-11 shown in FIG. 14.

One mirror element 4001 comprises a mirror 4003, an elastic hinge 4007 retaining the mirror 4003, address electrodes 4008a and 4008b, and two memory cells, i.e., a first 4010a and a second memory cell 4010b, both of which apply a voltage to the address electrodes 4008a and 4008b in order to control the mirror 4003 to operate at a controllable deflection state.

Each of first and second memory cells 4010a and 4010b has a dynamic random access memory (DRAM) that includes field effect transistors (FETs) and a capacitance. The memory cells 4010a and 4010b may also be a static random access memory (SRAM) or similar data storage circuits. Furthermore, the individual memory cells 4010a and 4010b are connected to the respective address electrodes 4008a and 4008b, a COLUMN line 1, a COLUMN line 2 and a ROW line. An FET-1 is connected to the address electrode 4008a, COLUMN line 1, and ROW line in the first memory cell 4010a. A capacitance Cap-1 is connected between the address electrode 4008a and GND (i.e., the ground). Likewise an FET-2 is connected to the address electrode 4008b, COLUMN line 2 and ROW line in the second memory cell 4010b, and a capacitance Cap-2 is connected between the address electrode 4008b and GND.

The signals on the COLUMN line 1 and ROW line generate a predetermined voltage for applying to the address electrode 4008a to tilt the mirror 4003 towards the address electrode 4008a. Likewise, the signals on the COLUMN line 2 and ROW line generate a predetermined voltage for applying to the address electrode 4008b to tilt the mirror 4003 towards the address electrode 4008b.

Note that a drive circuit for each of the memory cells 4010a and 4010b is commonly formed in the device substrate 4004. The deflection angle of the mirror 4003 is controlled by controlling the respective memory cells 4010a and 4010b in accordance with the signal of image data to carry out the modulation and reflection of the incident light.

Figure 16A:
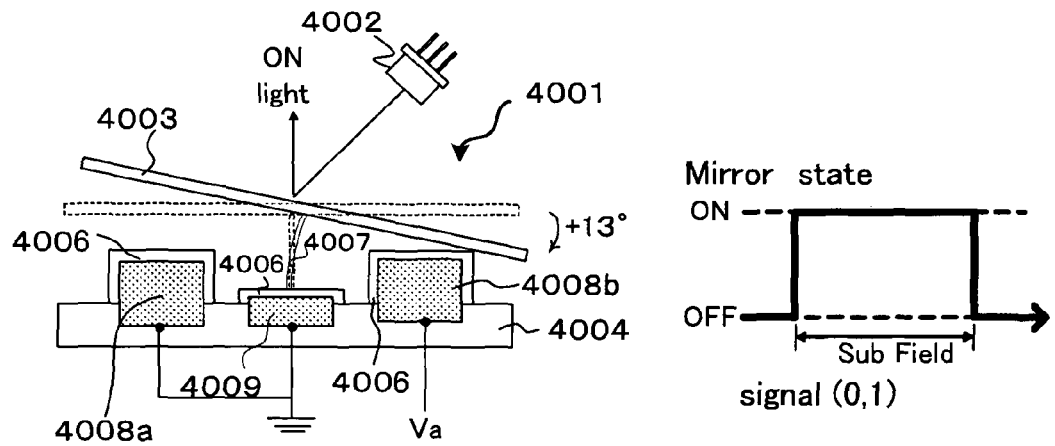
FIG. 16A is a diagram depicting the state in which an incident light is reflected towards a projection optical system by deflecting the mirror of a mirror element.
Figure 16B:
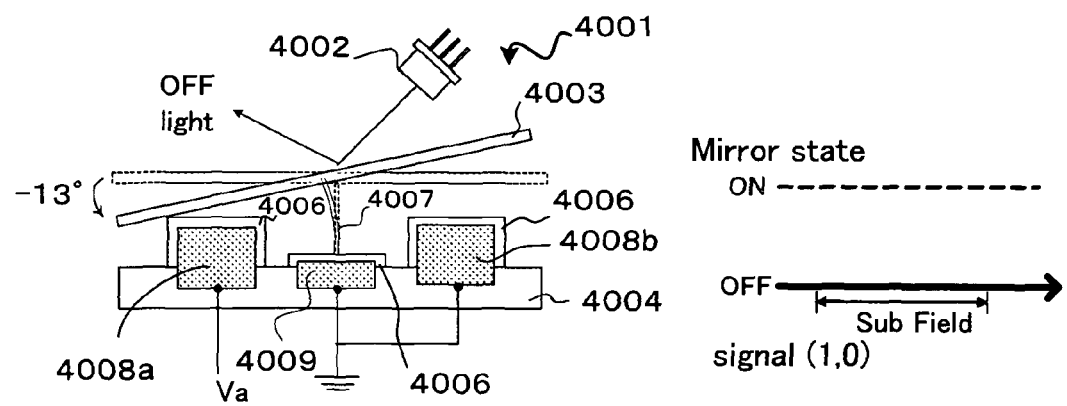
FIG. 16B is a diagram depicting the state in which an incident light is reflected away from a projection optical system by deflecting the mirror of a mirror element.
Figure 16C:
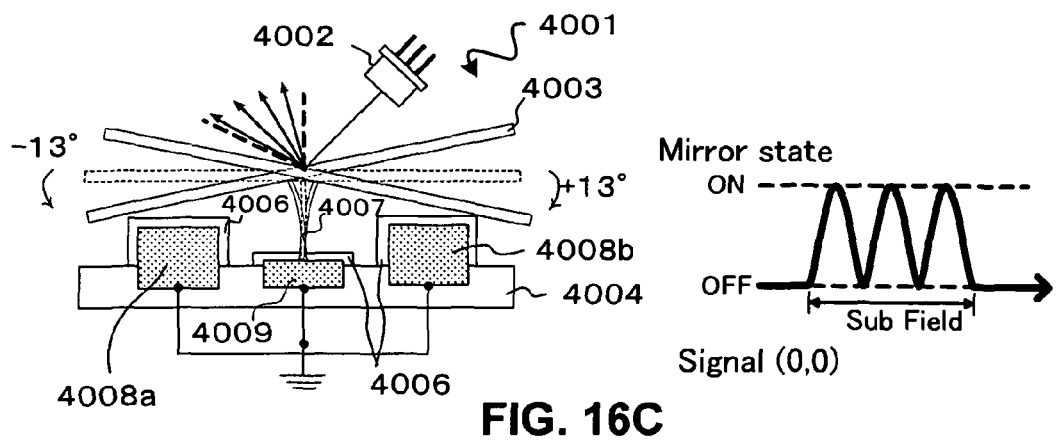
FIG. 16C is a diagram depicting the state in which incident light is reflected towards and away from a projection optical system by the repeated free-oscillation of the mirror of a mirror element.

The following is a description of the deflecting operation of the mirror 4003 of the mirror element 4001 shown in FIG. 14 with reference to FIGS. 16A through 16C.

FIG. 16A is a diagram depicting the state when a deflected mirror reflects an incident light towards a projection optical system. FIG. 5 shows the memory cells 4010a and 4010b (not shown here) storing the signal (0,1) which applies a voltage of "0" volts to the address electrode 4008a of FIG. 16A and applies a voltage of Va volts to the address electrode 4008b. As a result, the mirror 4003 is deflected from a deflection angle of "0" degrees, i.e., the horizontal state, to that of +13 degrees drawn by a Coulomb force in the direction of the address electrode 4008b to which the voltage of Va volts is applied. This causes the mirror 4003 to reflect the incident light towards the projection optical system (known as the ON light state).

Specifically, the present patent application defines the deflection angles of the mirror 4003 as "+" (positive) for clockwise (CW) direction and "−" (negative) for counter-clockwise (CCW) direction, with "0" degrees as the initial state of the mirror 4003. Further, an insulation layer 4006 is provided on the device substrate 4004, and a hinge electrode 4009, connected to the elastic hinge 4007, is grounded through the insulation layer 4006.

FIG. 16B is a diagram depicting the state of the mirror of a mirror element for reflecting the incident light away from a projection optical system. With a signal (1, 0) stored in the memory cells 4010a and 4010b (not shown here), illustrated in detail in FIG. 15, a voltage of Va volts is applied to the address electrode 4008a, and "0" volts is applied to the address electrode 4008b. As a result, the mirror 4003 is deflected from a deflection angle of "0" degrees, i.e., the horizontal state, to that of −13 degrees in the direction of the address electrode 4008a, to which the voltage of Va volts is applied. This causes the incident light to be reflected by the mirror 4003 in a direction away from that of the light path towards the projection optical system (known as the OFF light state).

FIG. 16C is a diagram depicting the state in incident light is reflected towards and away from a projection optical system by the repeated free-oscillation of the mirror of a mirror element.

In FIG. 16C, a signal (0, 0) stored in the memory cells 4010a and 4010b (not shown) applies a voltage of "0" volts to the address electrodes 4008a and 4008b. As a result of zero voltage applied to the electrodes, the Coulomb force between the mirror 4003 and the address electrode 4008a or 4008b is withdrawn so that the mirror 4003 is operated in a free oscillation within the range of the deflection angles ±13 degrees, in accordance with the property of the elastic hinge 4007 (known as the free oscillation state). During the free oscillation, the incident light is reflected towards the projection optical system only when the mirror 4003 is within the range of a specific deflection. The mirror 4003 repeats the free oscillations, changing over frequently between the ON light state and OFF light state. Controlling the number of changeovers makes it possible to finely adjust the intensity of light reflected towards the projection optical system.

The total intensity of light reflected during free oscillation towards the projection optical system is certainly lower than the intensity produced when the mirror 4003 is continuously in the ON light state and higher than the intensity produced when it is continuously in the OFF light state. Specifically, it is possible to produce an intermediate intensity between the intensities of the ON and OFF light state. Therefore, by finely adjusting the intensity of light as described above, a higher gradation image can be projected than with the conventional technique.

Although not shown in the drawing, an alternative configuration may be implemented by reflecting an incident light in the initial state of a mirror 4003 with only a portion of light is directed to enter into the projection optical system. A reflection light enter the projection optical system in the projection apparatus implemented with such configuration has a higher intensity than when the mirror 4003 is continuously in the OFF light state and with a lower intensity than when the mirror 4003 is continuously in the ON light state, thus controlling the mirror 4003 to operate in an intermediate light state.

A mirror device with an oscillation state and an intermediate light state is more preferable as a device for displaying the next generation image with higher levels of gray scales than the conventional mirror device controllable to operate in only two states (i.e., the ON and OFF light states).

Figure 17A:
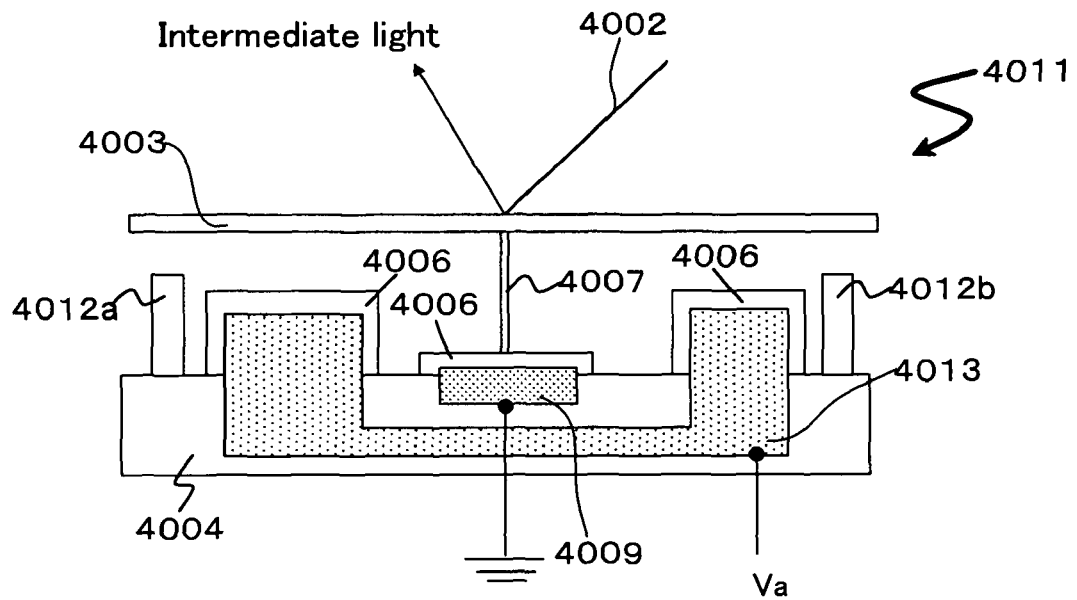
FIG. 17A shows a cross-section of a mirror element configured with only one address electrode and one drive circuit as another embodiment of a mirror element.

FIG. 17A shows a cross-section of a mirror element implemented with only one address electrode and one drive circuit as another embodiment of a mirror element. The mirror element 4011 shown in FIG. 17A includes an insulation layer 4006 on a device substrate 4004 for supporting and forming one drive circuit for deflecting a mirror 4003. Further, an elastic hinge 4007 is provided on the insulation layer 4006. The elastic hinge 4007 supports the mirror 4003, and the one address electrode 4013, which's connected to the drive circuit, formed under the mirror 4003. A hinge electrode 4009 connected to the elastic hinge 4007 is grounded through the insulation layer 4006. The address electrode 4013 formed on the left side and right side of the deflection axis of the elastic hinge 4007 or the mirror 4003 and extended above the device substrate 4004 have different areas. FIG. 17A shows the area size of the exposed part of the address electrode 4013 on the left side of the elastic hinge 4007 larger than the area size on the right side.

Specifically, the mirror 4003 is deflected by the electrical control of one address electrode 4013 and drive circuit. Further, the deflected mirror 4003 is retained at a specific deflection angle by contact with stopper 4012a or 4012b, both of which are placed in the vicinity of the exposed parts on the left and right sides of the address electrode 4013.

Incidentally, the present patent application discloses the address electrode 4013 in FIG. 17A, which extends above the device substrate 4004, as the "electrode part". Specifically, the left part is termed the "first electrode" and the right part is termed the "second electrode", with the deflection axis of the elastic hinge 4007 or mirror 4003 referred to as the border.

By configuring the address electrode 4013 to be asymmetrical with the area of the left side different from that of the right side in relation to the deflection axis of the elastic hinge 4007 or mirror 4003, a voltage applied to the electrode 4013 will generate a difference in Coulomb force between (a) and (b), where (a): a Coulomb force generated between the first electrode part and mirror 4003, and (b): a Coulomb force generated between the second electrode part and mirror 4003. Thus, the mirror 4003 can be deflected by differentiating the Coulomb force between the left and right sides of the deflection axis of the elastic hinge 4007 or mirror 4003.

Figure 17B:
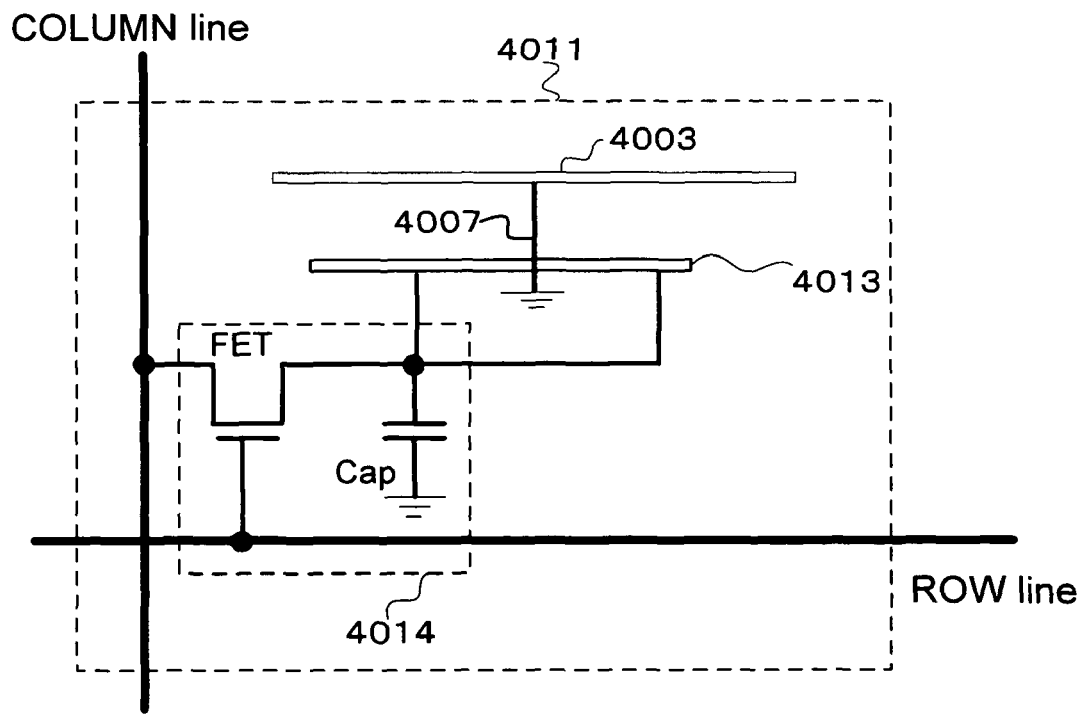
FIG. 17B is an outline diagram of a cross-section of the mirror element shown in FIG. 17A.

FIG. 17B is a functional diagram for showing a cross-section of the mirror element 4011 shown in FIG. 17A. When a mirror device is implemented with only one address electrode 4013, the mirror 4003 is controlled with only one memory cell. FIG. 17B shows a configuration wherein two memory cells 4010a and 4010b as the two address electrodes 4008a and 4008b as shown in FIG. 15, are reduced to one memory cell 4014. The amount of wiring required for controlling the deflection of the mirror 4003 is also reduced.

Other possible configurations are similar to the configuration described in FIG. 15, and therefore descriptions are not provided here.

The following is a detail description of a single address electrode 4013 controlling the deflection of a mirror by referring to FIGS. 18A, 18B and 18C, and FIG. 19.

Figure 18A:
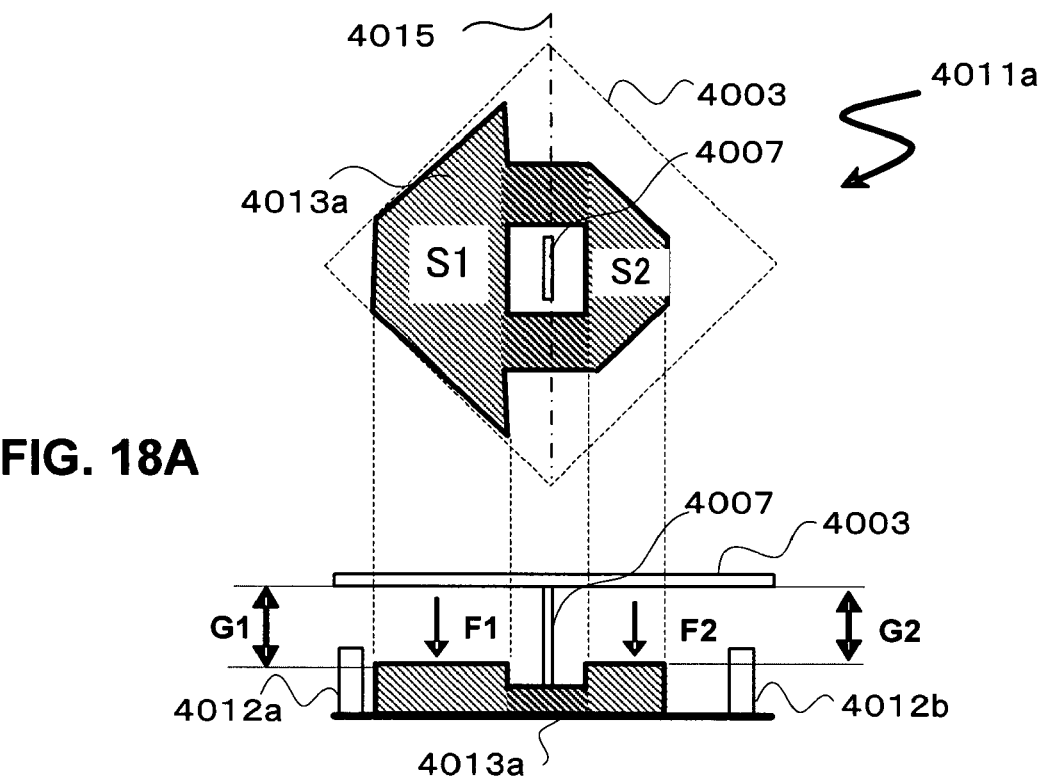
FIG. 18A shows a top view diagram, and a cross-sectional diagram, both of a mirror element structured such that the area size S1 of a first electrode part of one address electrode is greater than the area size S2 of a second electrode such that S1>S2, and such that the connection part between the first and second electrode parts is in the same structural layer as the layer in which the first and second electrode parts are placed.
Figure 18B:
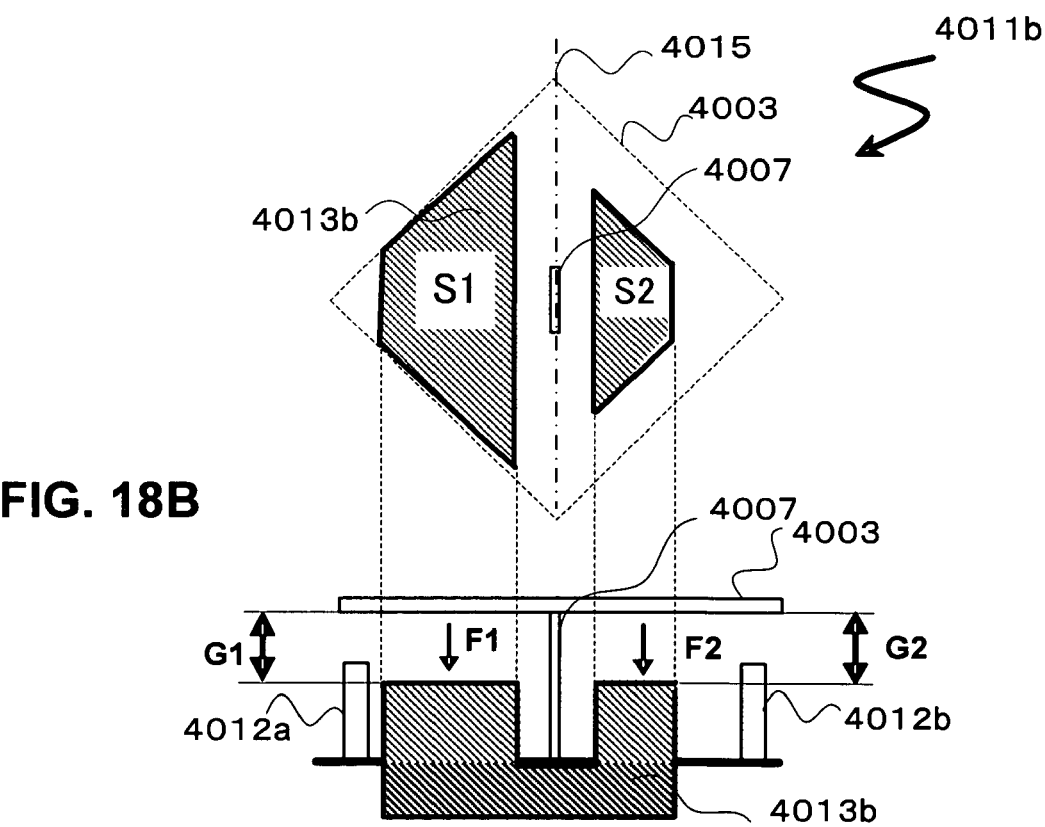
FIG. 18B shows a top view diagram, and a cross-sectional diagram, both of a mirror element structured such that the area size S1 of a first electrode part of one address electrode is greater than the area size S2 of a second electrode part such that S1>S2, and such that the connection part between the first and second electrode parts is placed in a structural layer different from that in which the first and second electrode parts are placed.

FIGS. 18A and 18B show the mirror elements 4011a and 4011b respectively configured with the respective area sizes of the first and second electrode parts of the one address electrode 4013 on the left and right sides are different from each other (i.e., asymmetrical about the deflection axis).

FIG. 18A shows a top view diagram, and a cross-sectional diagram, both of a mirror element 4011a structured such that the area size S1 of a first electrode part of one address electrode 4013a is greater than the area size S2 of a second electrode part such that S1>S2, and such that the part connecting the first and second electrode parts is in the same structural layer as the first and second electrode parts.

FIG. 18B also shows a top view diagram, and a cross-sectional diagram, both of a mirror element 4011b structured such that the area size S1 of a first electrode part of one address electrode 4013b is greater than the area size S2 of a second electrode part, such that S1>S2, and such that the part connecting the first and second electrode parts is in a structural layer different from the layer in which the first and second electrode parts are placed.

Figure 19:
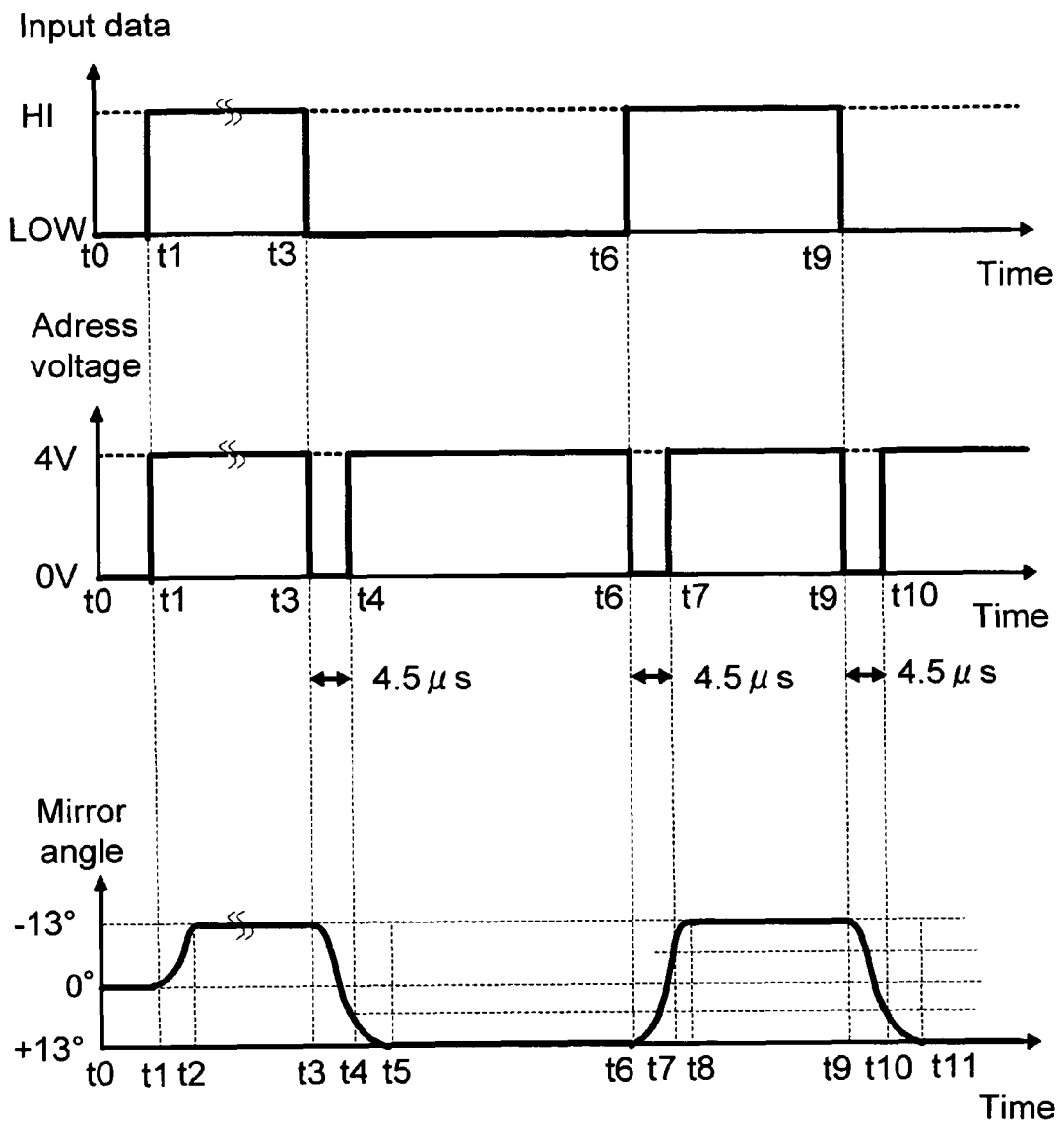
FIG. 19 is a diagram showing the data inputs to a mirror element shown in FIG. 18A, the voltage application to an address electrode, and the deflection angles of the mirror, in a time series.

With reference to FIG. 19, the following is a description of the control for the deflecting operation of a mirror in the mirror element 4011a or 4011b, shown in FIG. 18A or 18B, respectively.

The following description refers only to the control of the mirror element 4011a shown in FIG. 18A and to the control of mirror elements 4011a and 4011b shown in FIG. 18B, unless otherwise noted.

FIG. 19 is a timing diagram showing the sequence and the relationship between data input to the mirror elements 4011a or 4011b, the voltage application to the address electrodes 4013a or 4013b, and the deflection angles of the mirror 4003, in a time series. In FIG. 19, the data is inputted to the mirror element 4011a or 4011b, which is controlled in two states, HI and LOW, with HI representing a data input for projecting an image, and LOW representing no data input for not projecting an image.

The vertical axis of the "address voltage" of FIG. 19 represents the voltage values applied to the address electrode 4013a of the mirror element 4011a, and the voltage values applied to the address electrode 4013a, for example, "4" volts and "0" volts.

The vertical axis of the "mirror angle" of FIG. 19 represents the deflection angle of the mirror 4003, setting "0" degrees as the deflection angle when the mirror 4003 is parallel to the device substrate 4004. Further, with the first electrode part of the address electrode 4013a defined as the ON state side, the maximum deflection angle of the mirror 4003 in the ON state is set at −13 degrees. With the second electrode part of the address electrode 4013a defined as the OFF state side, the maximum deflection angle of the mirror 4003 in the OFF state is set at +13 degrees. Therefore, the mirror 4003 deflects within a range in which the maximum deflection angles of the ON and OFF states are ±13 degrees. The horizontal axis of FIG. 19 represents elapsed time t.

When a deflecting operation of the mirror 4003 is performed in the configurations of FIGS. 18A and 18B, a voltage is applied to the address electrode 4013a with the timing of the voltage based on data input and a data rewrite.

Referring to FIG. 19, no data is inputted between time t0 and t1, Accordingly, the mirror 4003 is in the initial state. Specifically, the deflection angle of the mirror 4003 is at "0" degrees when no voltage is applied to the address electrode 4013a.

At time t1, a voltage of 4 volts is applied to the address electrode 4013a, causing the mirror 4003 is drawn by a Coulomb force generated between the mirror 4003 and address electrode 4013a towards the first electrode part, which has a larger area size, so that the mirror 4003 shifts from the 0-degree deflection angle at the time t1 to a −13-degree deflection angle at time t2. Then, the mirror 4003 is retained on the stopper 4012a on the side of first electrode part.

The phenomenon in which the mirror 4003 is attracted to the first electrode part of the address electrode 4013a with a larger area size than that of the second electrode part, is expressed by the following equation (1), which calculates the Coulomb force F:

$$F = \frac{1}{4\pi r^2} \cdot \frac{1}{\varepsilon} q_1 q_2 \qquad (1)$$

where "r" is the distance between the address electrode 4013a and mirror 4003, "∈" is permittivity, and "q1" and "q2" are the amount of charge retained by the address electrode 4013a and mirror 4003, and the address electrode 4013b and mirror 4003, respectively (the following description mainly describes q1).

The distance G1 between the mirror 4003 and the first electrode part and the distance G2 between the mirror 4003 and the second electrode part are equal when the mirror 4003 is in the initial state. However, since the first electrode part has a larger area than the second electrode part, the first electrode part can retain a larger amount of charge. As a result, a larger Coulomb force is generated for the first electrode part when a voltage is applied.

Between time t2 and t3, the mirror 4003 is retained on the stopper 4012a on the side of first electrode part as a result of continuously applying a voltage of 4 volts to the address electrode 4013a, in response to the data inputted. Then, at time t3, stopping the data input applies a voltage of "0" volts to the address electrode 4013a. As a result, the Coulomb force generated between the address electrode 4013a and mirror 4003 is cancelled. This causes the mirror 4003 retained on the first electrode part side to be shifted to a free oscillation state due to the restoring force of the elastic hinge 4007.

Further at the time t4, when the deflection angle of the mirror 4003 becomes θ<0 degrees and when a voltage of 4 volts is applied to the address electrode 4013a, when the Coulomb force F1 generated between the mirror 4003 and first electrode part is less than the Coulomb force F2 generated between the mirror 4003 and second electrode part, such that F1<F2, the mirror 4003 is attracted to the second electrode part.

Then, at time t5, the mirror 4003 is retained on the stopper 4012b of the second electrode part. The reason for this is that the second power of distance r has a larger effect on the Coulomb force F than the difference in electrical potentials, according to the equation (1) of the electrostatic force discussed above.

Therefore, with an appropriate adjustment of the area sizes of the first and second electrode parts, a Coulomb force F has a stronger effect on the smaller distance G2, the distance between the address electrode 4013a and mirror 4003, despite the fact that the area S2 of the second electrode part is smaller than the area S1 of the first electrode part. As a result, the mirror 4003 can be deflected to the second electrode part.

Note that the transition time of the mirror 4003 between the time t3 and t4 is preferably about 4.5 μsec in order to obtain a high degree of gradation. Further, it is possible to perform a control in such a manner so as to turn off the illumination light in sync with a transition of the mirror 4003 so as to not let the illumination light be reflected and incident to the projection light path during a data rewrite, during the transition of the mirror 4003 between the time t3 and t4.

Between time t5 and t6, the mirror 4003 is continuously retained on the stopper 4012b of the second electrode part by continuously applying a voltage to the address electrode 4013a. In this event, no data is inputted, and therefore no image is projected.

Then, at the time t6, new data is inputted. The voltage of 4 volts, which has been applied to the address electrode 4013a, is changed over to "0" volts at the time t6 in accordance with the data input. This operation cancels the Coulomb force generated between the mirrors 4003, retained onto the second electrode part, and the address electrode 4013a. This operation is similar to that at time t3, in which the mirror 4003 shifts to a free oscillation state due to the restoring force of the elastic hinge 4007.

Then, a voltage of 4 volts is again applied to the address electrode 4013a at time t7. Coulomb force F1, that is generated between the mirror 4003 and first electrode part, becomes greater than Coulomb force F2, that is generated between the mirror 4003 and second electrode part, such that F1>F2 when the deflection angle of the mirror 4003 becomes θ>0 degrees, and thereby the mirror 4003 is attracted to the first electrode part, and then the mirror 4003 is retained onto the second electrode part at time t8.

This principle is understood from the description of the action of a Coulomb force between times t3 and t5. Also in this event, the transition time of the mirror 4003 between the times t3 and t4 is preferably about 4.5 μsec, and the control is performed to turn off the illumination light in sync with a transition of the mirror 4003, to prevent a reflection of the illumination light to the projection light path during the transition of the mirror 4003.

Then, between time t8 and t9, the mirror 4003 is continuously retained on the stopper 4012a of the first electrode part by continuously applying a voltage of 4 volts to the address electrode 4013a. In this event, data is continuously inputted, and images are projected.

Then at time t9, the voltage applied to the address electrode 4013a is changed from 4 volts to "0" volts when the input of data input is terminated thus operating the mirror 4003 in a free oscillation state.

Applying a voltage to the address electrode 4013a at time t10 makes it possible to retain the mirror 4003 on the stopper 4012b of the second electrode part at time t11, on the same principle as that applied between the time t3 to t5 and between the time t6 to t8. A repetition of similar operations enables the control of deflecting the mirror 4003.

The following is a description of the control for returning the mirror 4003, retained on the stopper 4012a of the first electrode part or on the stopper 4012b of the second electrode part, back to the initial state.

In order to return the mirror 4003 back to the initial state from a state of being retained on the stopper 4012a of the first electrode part or on the stopper 4012b of the second electrode part, an appropriate pulse voltage is applied to the address electrode 4013a. For example, changing the voltage applied to the address electrode 4013a to "0" volts shifts the mirror 4003 to a free oscillation state. During free oscillation, when the distance between the address electrode 4013a and the mirror 4003 reaches an appropriate distance, the mirror 4003 can be returned to the initial state by temporarily applying an appropriate voltage to the address electrode 4013a, thereby generating a Coulomb force pulling the mirror 4003 back towards the first electrode part or the second electrode part, on which the mirror 4003 was previously retained, t, generates an acceleration in a direction opposite to the direction in which the mirror 4003 was heading.

Thus, the application of a pulse voltage to the address electrodes 4013a, as described above, makes to possible to return the mirror 4003 to the initial state from a state in which it is retained on the stopper 4012a of the first electrode part or on the stopper 4012b of the second electrode part Based on the principle of the amount of the Coulomb force between the mirror and address electrode 4013a described above, the application of a voltage to the address electrode 4013a at an appropriate distance between the mirror 4003 and address electrode 4013a also makes it possible to retain the mirror 4003 at the deflecting angle of the ON light state by returning the mirror 4003 from the ON light state, or at the deflecting angle of the OFF light state by returning the mirror 4003 from the OFF light state.

The above descriptions also apply to the address electrode 4013b of the mirror element 4011b shown in FIG. 18B.

Note that the control of the mirror 4003 of the mirror elements 4011a and 4011b shown in FIG. 19 is widely applicable to a mirror element configured to have a single address electrode and to be asymmetrical about the deflection axis of the elastic hinge or mirror. As described above, the mirror can be deflected to the deflection angle of the ON or OFF state, or operated in the free oscillation state, with a single address electrode of a mirror element.

Figure 18C:
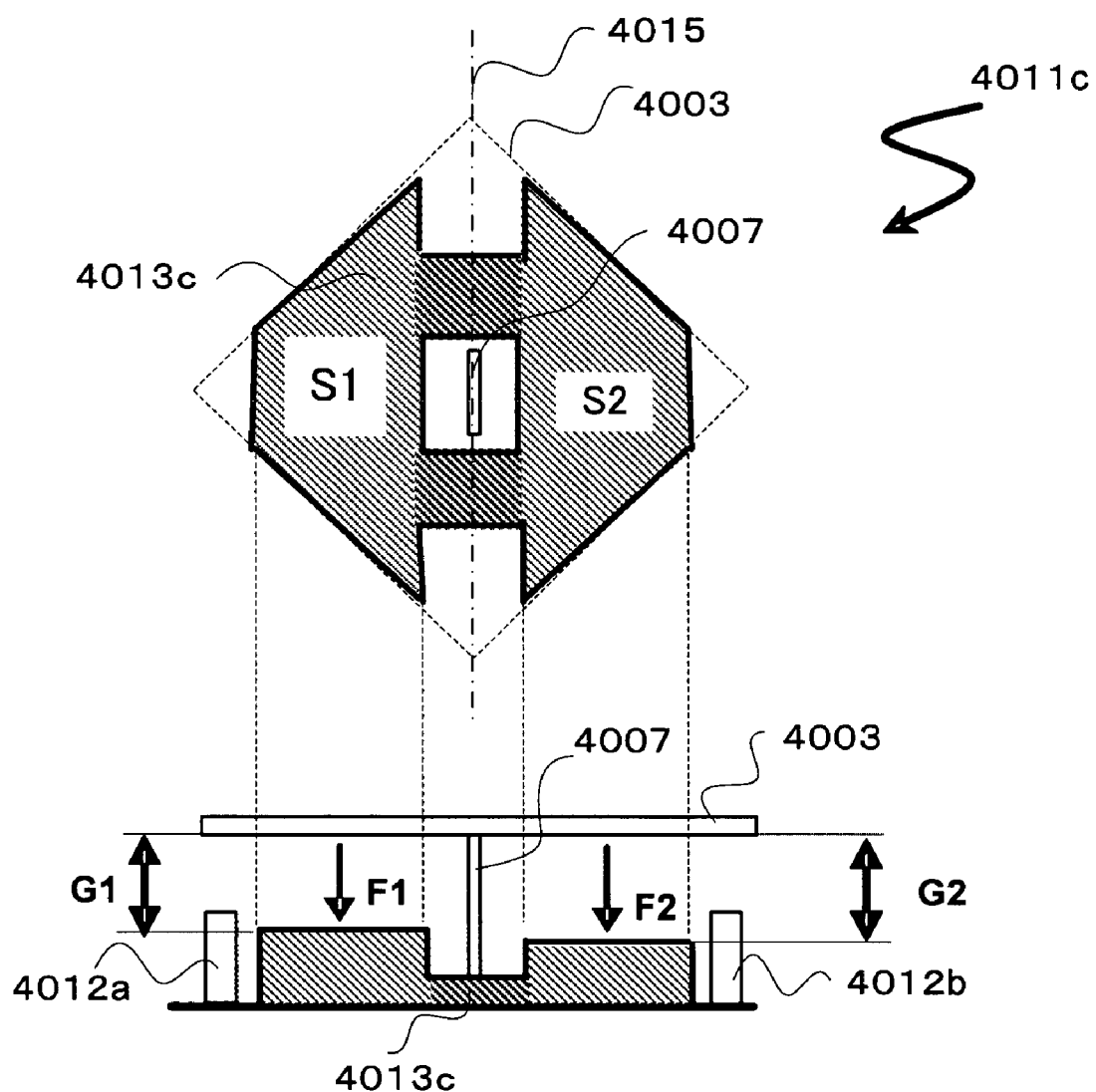
FIG. 18C shows a top view diagram, and a cross-sectional diagram, both of a mirror element structured such that the area size S1 of a first electrode part of one address electrode is equal to the area size S2 of a second electrode part such that S1=S2, and such that the distance G1 between a mirror and the first electrode part is less than the distance G2 between the mirror and the second electrode part such that G1<G2.

FIG. 18C shows a top view diagram, and a cross-sectional diagram, of a mirror element 4011c structured such that the area size S1 of a first electrode part of one address electrode is equal to the area size S2 of a second electrode part such that S1=S2, and such that the distance G1 between a mirror 4003 and the first electrode part is less than the distance G2 between the mirror 4003 and the second electrode part (G1<G2).

Specifically, the configuration of FIG. 18C is such that, for the address electrode 4013, the height of the first electrode part is greater than that of the second electrode part and such that the distance G1 between the first electrode part and mirror 4003 is less than the distance G2 between the second electrode part and mirror 4003 (G1<G2). Further, is the part electrically connecting the first and second electrode parts are on the same layer as the address electrode 4013.

In the case of the mirror element 4011c shown in FIG. 18C, the amount of the Coulomb force generated between the mirror 4003 and address electrode 4013c in the first electrode part differs from that generated between the mirror 4003 and address electrode 4013c in the second electrode part because the distances between the mirror 4003 and the parts of the address electrode 4013 are different. Therefore, the deflection of the mirror 4003 can be controlled by carrying out a control similar to the case described above in FIG. 19.

Note that the deflection angle of the mirror 4003 is retained by using the stoppers 4012a and 4012b in FIGS. 18A, 18B and 18C. The deflection angle of the mirror 4003, however, can also be established by configuring the address electrode 4013c to also serve the function of the stoppers 4012a and 4012b.

Furthermore, while the present embodiment is configured to set the control voltages at 4-volt and 0-volt applied to the address electrode 4013a, 4013b or 4013c, such control voltages are arbitrary and may be adjusted depending on specific applications, and other appropriate voltages may be used to control the mirror 4003.

Furthermore, the mirror can be controlled with multi-step voltages applied to the address electrode 4013a, 4013b or 4013c. As an example, the distance between the mirror 4003 and address electrode 4013a, 4013b or 4013c may be reduced to increase a Coulomb force; the mirror 4003 can be controlled with a lower voltage than when the mirror 4003 is in the initial state.

The following is a description of each constituent part of a mirror element.

The mirror 4003 is formed with a highly reflective metallic material, such as aluminum (Al) or a multilayer film made of a dielectric material. The entirety or a part of the elastic hinge 4007 (e.g., the base part, neck part, or intermediate part) is formed by a metallic material possessing a restoring force. The material for the elastic hinge 4007 may use, for example, silicon (Si), such as amorphous silicon (a-Si) or single crystal silicon, either of which is an elastic body. The address electrodes 4013a, 4013b and 4013c are is configured to have the same electric potential, by using, for example, aluminum (Al), copper (Cu), and tungsten (W) as a conductor. The insulation layer 4006 uses, for example, silicon dioxide ($SiO_2$) and silicon carbide (SiC). The device substrate 4004 uses, for example, a silicon material. The materials and forms of each constituent part of a spatial light modulator can be changed in accordance with function.

The following is a description of the circuit configuration of a spatial light modulator used for processing input signals. The outline of the circuit configuration of a spatial light modulator used for processing input signals is similar to the circuit shown in the above-described FIG. 5.

The spatial light modulator shown in FIG. 5 comprises a timing controller 5141, a selector 5142, a ROW line decoder 5130, a plurality of Column drivers 5120, and a mirror element array (memory array) 5110 arraying a plurality of memory cells in a two-dimensional array comprising M columns by N rows inside of a device substrate, where "M" and "N" are positive integers.

The memory cell comprises, for example, a complementary metal oxide semiconductor (CMOS) circuit in which a wiring process rule exists.

In FIG. 5, the timing controller 5141 controls the selector 5142 and ROW line decoder 5130 in accordance with a signal input from an external drive circuit (not shown in drawing). The selector 5142 transfers, to at least one column driver 5120, an n-bit signal that is transferred from the external drive circuit (not shown) by way of an n-bit data bus line, in accordance with the control of the timing controller 5141. The column driver 5120 outputs the n-bit signal transferred from the selector 5142 to each COLUMN line of the connected memory array, thereby driving the respective COLUMN lines placed on the device substrate of each mirror element. Further, the ROW line decoder 5130 drives an arbitrary ROW line of the memory array in accordance with the control of the timing controller 5141.

With the above described configuration in mind, first, the image data of a signal corresponding to a desired display period of time is transferred from the external drive circuit by way of the n-bit data bus line. Then, these pieces of n-bit image data are sequentially transferred to the desired column drivers 5120 by way of the selector 5142. Upon completion of the transfer of the pieces of new image data to all column drivers 5120, the ROW line decoder 5130 drives a desired ROW line in accordance with the command of the timing controller 5141. Then, a voltage applied to a predetermined memory cell is controlled by the image data from the column driver 5120 and the driving of the ROW line, according to the control mechanism.

Figure 20:
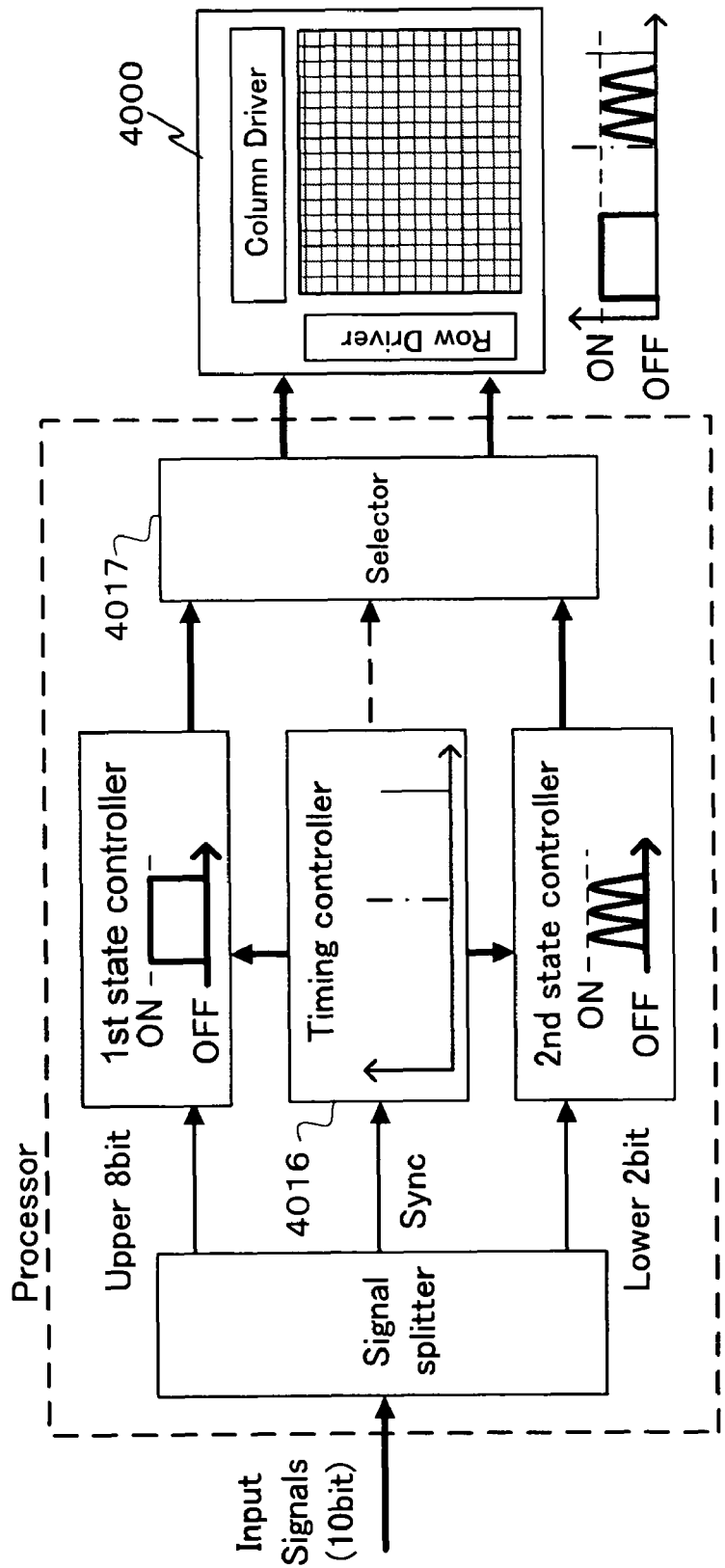
FIG. 20 is a system comprisal diagram for controlling a spatial light modulator according to the present embodiment.

FIG. 20 illustrates an example of the system diagram of the present invention. In this example, a 10-bit signal input is split into two parts. For example, these two parts include the upper 8 bits and lower 2 bits. The upper 8 bits are sent to a 1st state controller, the lower 2 bits are sent to a 2nd state controller, and a "sync" signal is sent to the timing controller 4016. Then, the 2nd state controller converts binary data, the lower 2-bits, into non-binary data. The two state controllers execute a control with the 1st state and 2nd state binary data and non-binary data mixed in one frame. Further, application of the control process to a single-panel projection apparatus, the 2nd state is operated at a frequency that is no less than 180 Hz in sequentially projecting the respective colors. In this event, sub-frames determined by the 2nd state can be assigned to the lights of the respective colors R, G and B. Alternately, an image may be projected in six colors by adding cyan, magenta and yellow.

Note that the sync signal is generated by a signal splitter. The timing controller 4016 controls the selector 4017 in accordance with the sync signal and switches between making the 1st state controller control the spatial light modulator 4000 and making the 2nd state controller control the spatial light modulator 4000.

This configuration enables more flexibility of displaying images of different colors in taking into account the fact that the human eye is most sensitive to green light. Therefore, a 14-bit gray scale may be used only for projecting green light, and a 12-bit gray scale may be used for projecting the other colors. Further, a white illumination light may be obtained by superimposing red, green and blue light. In such a case, the white light may be assigned only to the 1st state.

A single-panel projection apparatus comprising a single spatial light modulator described above includes the apparatus as shown in FIG. 1. The configuration and operation of the apparatus are already provided, and therefore they are not described here.

In a single-panel projection apparatus thus configured, a period (i.e., one frame) for displaying one image is further divided into sub-frames, and the R, G, or B light is irradiated onto the spatial light modulator within each sub-frame period. Then, the images corresponding to the lights reflected to the projection light path are projected onto a screen in sequence by the mirror element of the spatial light modulator reflecting the selectively irradiated light.

A multi-panel projection apparatus comprising a plurality of spatial light modulators includes the type as shown in FIG. 2 described above. The configuration and the principle of projection of the projection apparatus shown in FIG. 2 are similar to the above description, and therefore the description is not provided here. Note that a light source in this configuration is constituted by combining a plurality of light sources of different colors (i.e., wavelengths), each of which possesses a coherent characteristic.

Further, FIG. 2 shows a projection apparatus configured as another multi-panel projection apparatus to provide the reflections of each color light in the light path equal to one another. The system configuration and the projection principle of the projection apparatus shown in FIG. 2 are similar as described above, and therefore the description is not provided here. Incidentally, a light source in this configuration is constituted by combining a plurality of coherent light sources of different colors, i.e., wavelengths.

The use of a coherent light source as the light source in the projection apparatuses as described above enables an image projection using an optical component with a larger F number (allowing small expansion of a light flux) than when using a conventional discharge lamp as the light source. A projection apparatus comprising a laser light source as a coherent light source enables, for example, an optical design with a light flux of f/10, making it possible to set the deflection angle of the mirror of a spatial light modulator at about ±3 degrees CW (clockwise) in relation to the initial state of the mirror.

Embodiment 5

A description of the present embodiment is provided for a light source used in a projection apparatus for controllable to operate in a semi-ON state, in addition to an ON state, to emit an incident light for projecting an image and an OFF state in which the power supply for a light source is completely shut off. Note that the present specification document defines the semi-ON state as the state in which an incident light is emitted from a light source and no image is projected, or a state in which no incident light is emitted while the light source is being driven.

What follows is a description of the configuration of a light source for producing the semi-ON state. The semi-ON state is implemented by implementing the light source as shown in FIG. 4B described above.

The electric current of a bias current $I_b$, output from a bias current circuit 5570c as that shown in FIG. 4B, is set at a value whereby an incident light is emitted from the light source at a level that no image is projected, or an incident light is not emitted while the light source is being driven. Then, when no image is projected, all switching circuits are turned off in response to the control signal from a light source control unit to decrease the light intensity of the light source, driving it only with the bias current $I_b$. Specifically, instead of turning off the light source completely when no image is projected, the bias current $I_b$ is continuously flowing. Such a configuration makes it possible to produce a semi-ON state. Further, keeping the light intensity of the light source at a certain level instead of completely turning off the light source eliminates the time required for a current flowing in the circuit to turn on the light source when switching from the state in which no image is projected to the state in which an image is projected. This makes it possible to shorten the emission preparation time for the light source to emit light. As a result, the transition period of the initial turning on time of the light source can be shortened.

Figure 21:
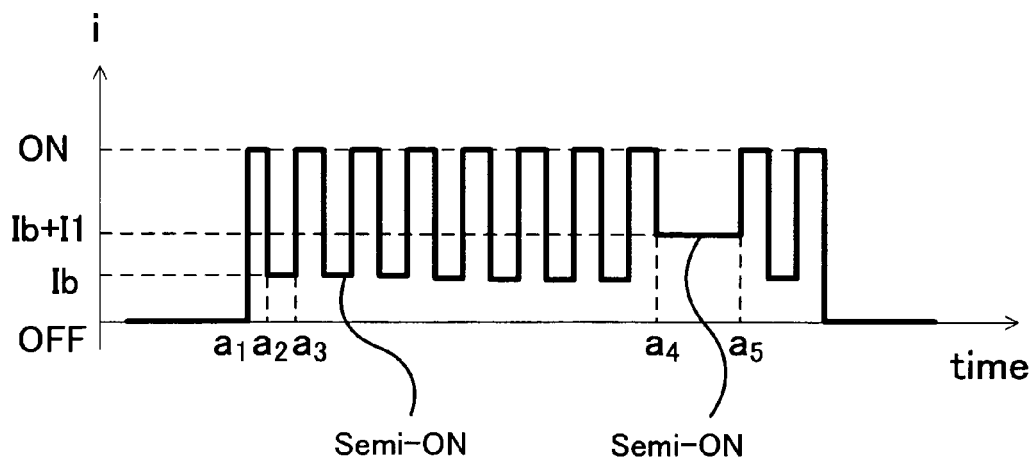
FIG. 21 is a graph illustrating the semi-ON state of a light source performing on an electric current drive.

The following is a description of the process of turning a light source to the ON, OFF, and semi-ON states, with reference to FIG. 21. FIG. 21 is a graph illustrating the semi-ON state of a light source performing on an electric current drive.

In FIG. 21, the vertical axis represents current values "i", with "ON" indicating a current value i which enables the light source to emit an incident light for projecting an image, and "OFF" indicating a current value i which shuts off the power supply for the light source; the horizontal axis shows a time axis, indicating the elapsed time.

The following is an exemplary case of controlling the light source according to the present embodiment:

Prior to time $a_1$: the power supply to the light source is completely shut off, with the current value set at OFF.

At time $a_1$: the power supply to the light source is turned on for projecting an image, with the current value set at ON. As a result, an image can be projected.

Between time $a_1$ to time $a_2$: the current value is maintained at ON so that images are continuously projected.

At time $a_2$: in order to stop projecting an image, the current value of the light source is set at $I_b$. The current $I_b$ is a bias current shown in the above described FIG. 4B. An appropriate setup of the bias current makes it possible to produce the semi-ON state in which an incident light is not emitted and while driving the light source.

Between time $a_2$ to time $a_3$: no image is projected and the current value $I_b$ of the bias current is maintained.

At time $a_3$: the current value of the light source is set at ON for restarting the projection of an image. The current values are changed to ON from the current value $I_b$ of the bias current, and thereby the light source can be activated more rapidly than when changing the current values from OFF to ON.

Between time $a_3$ to time $a_4$: the light source is controlled to perform pulse emission by repeatedly setting the current value at ON followed by setting the bias current at the current value $I_b$.

At time $a_4$: in order to stop projecting an image, the current value for the light source is set at $I_b+I_1$, a current value obtained by adding together the bias current $I_b$ shown in FIG. 4B and a current value $I_1$. The current value $I_1$ can be added to the current value $I_b$ by the light source control unit controlling the switching circuit. An appropriate setup of the current value $I_b+I_1$ to produce the semi-ON state in which the light source emits an incident light while no image is projected.

Between time $a_4$ to time $a_5$: no image is projected, and the current value $I_b+I_1$ is maintained.

At time $a_5$: in order to restart an image projection, the current value of the light source is set at ON. The current values are changed to ON from $I_b+I_1$, and thereby the light source can be activated more rapidly than when changing the current values from OFF to ON or from the current value $I_b$ of the bias current to ON.

The light source control unit controlling the current of the circuit of the light source as described above to produce the ON, OFF, and semi-ON states of the light source. Note that such a control for the light source can be carried out using the configurations noted above in FIGS. 3A and 3C. A light source includes a semiconductor light source such as a laser diode and a light emitting diode (LED) can be controlled to operate with the semi-On state. Furthermore, the light source configured, as shown in FIG. 4B, is accompanied by changing over the switching circuit, and therefore it is also possible to adjust the light intensities of the light source in a stepwise fashion. The quantity of light can be adjusted in more minute steps by enabling the pulse emission of a light source. For example, when the light source is performing pulse emission during image projection, the quantity of light during one frame period can be adjusted by adjusting the frequency of pulses in one frame period.

In addition, such a light source may be implemented to include a plurality of sub-light sources. As an example, one laser light source can be configured by bundling multiple sub-laser light sources with the same wavelength. When controlling such a laser light source, the light intensity can easily be adjusted by switching on and off each of the sub-laser light sources. Further, when some of the individual sub-laser light sources, which were constantly ON, are changed to a semi-ON state, and other sub-laser light sources, which were turned off, are turned on when a light intensity is required for projecting a certain image, the light source can be activated more rapidly than the process of turning on the laser light after the sub-laser light sources are completely turned off. It is, of course, possible to produce a semi-ON state by equipping each sub-laser light source with a bias current circuit, as described above, and by applying a bias current constantly to the individual sub-laser light sources.

Note that the example shown in FIG. 4B described above is configured to control the light source with a current drive and change the current to change the light intensities. An alternative configuration may comprise a circuit capable of controlling the voltage by using a voltage-driven light source.

The following is a description for a projection apparatus comprising a light source controllable to operate in the semi-ON state described above.

The projection apparatus implemented with a light source that is controllable to operate in the semi-ON state comprises a spatial light modulator for modulating the incident light emitted from the light source, a light source control unit for controlling the modulation of the light source, and a spatial light modulator control unit for generating, from an input image signal, and a control signal used for driving the spatial light modulator.

The spatial light modulator may be implemented with a mirror device including a plurality of mirror elements used for controlling the reflecting direction of the incident light. Such a mirror device includes the mirror devices described in FIGS. 14, 15, 16A through 16C, 17A, 17B, 18A through 18C and 19, and also FIGS. 28A through 28D and FIG. 29, which will be described later. Furthermore, the mirror device is controlled by control circuit and processes as described in accordance with FIG. 20.

The light source control unit receives a control signal used for controlling the light intensity under the semi-ON state and controls a switching circuit for the light source, as shown in FIG. 4B. As an example, the light source control unit controls the intensity of light emitted from the light source by a switch changeover method, while synchronizing with the spatial light modulator based on the control signal obtained from a sequencer, as shown in FIG. 4B.

Furthermore, the light source control unit also controls the pulse emission under the ON state or semi-ON state by a switch changeover method implementing the switching circuit of a light source circuit based on the control signal, as shown in FIG. 4B.

Note that the light source control unit is preferably implemented with a circuit that produces the drive current and/or drive voltage in the semi-ON state at a lower current value and/or voltage value than that for the ON state and higher than that for the OFF state. It might also be possible to configure a new circuit to produce a light intensity emitted from the light source to match exactly the intensity of a semi-ON state. The configuration of such a new circuit for the light source, however, will be complicated in that there is a need to apply a current to the new circuit. Therefore, a switching circuit, as shown in FIG. 4B, involving a circuit that branches the current to be used in the ON state, makes it possible to more efficiently control the light source under a semi-ON state without requiring any more current volume than the drive current required for the ON state with a simple circuit, as shown in FIG. 4B.

The spatial light modulator control unit controls a spatial light modulator in accordance with an image signal. When a spatial light modulator control unit is controlled in sync with the light source control unit, it is possible to modulate the light with the spatial light modulator and project a desired image. In such a projection apparatus, the light source control unit receives a control signal for controlling a light source, controls the light source under an ON state or under a semi-ON state.

Note that a projection apparatus may include a plurality of light sources controllable to operate in the semi-ON state and emitting lights of different wavelengths. Furthermore, in addition to being implemented in the single-panel projection apparatus modulated with a single spatial light modulator as that described in FIG. 1, a light source controllable to operate in the semi-ON state can also be implemented in a multi-panel projection apparatus that includes a plurality of spatial light modulators, as described in FIG. 2. Specifically, the overall control for a single-panel projection apparatus can be carried out by the configuration as illustrated in FIG. 3A, and the overall control for a multi-panel projection apparatus can be carried out by the configuration as illustrated in FIG. 3B or 3C.

The following is a description of an exemplary embodiment of carrying out a synchronous control between a spatial light modulator and a light source controllable to operate with the semi-ON state according to the present embodiment.

Figure 22:
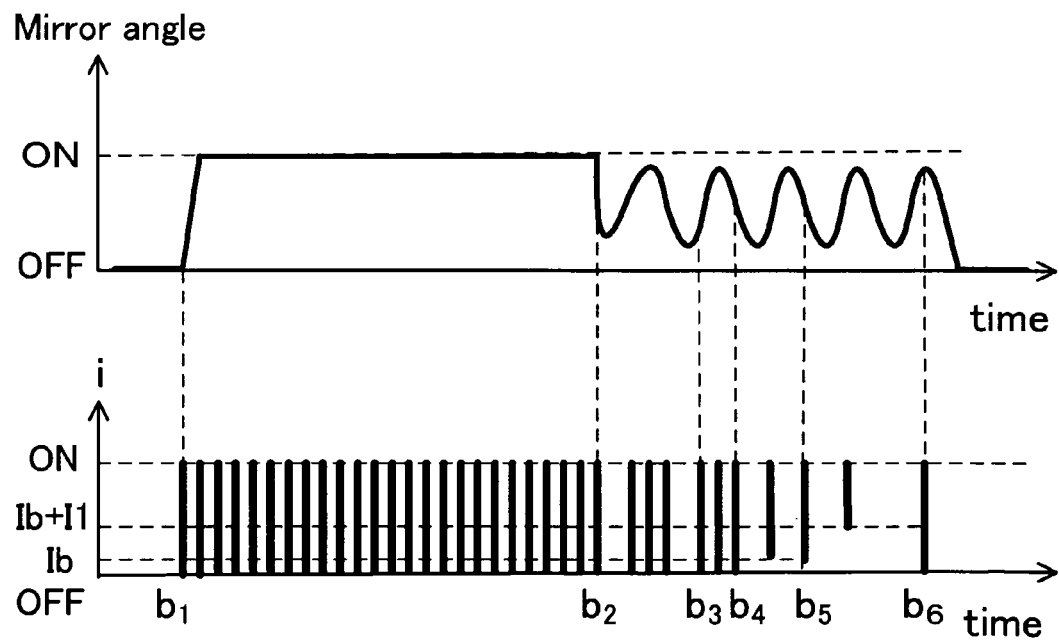
FIG. 22 is a graph illustrating the semi-ON state of a light source performing pulse emission synchronously with the control of a mirror of a spatial light modulator constituted by mirror elements.

FIG. 22 is a timing diagram for illustrating a semi-ON state when a light source is operated under the control of a current drive to project pulse emission in sync with the operation of a mirror of a spatial light modulator that includes arrays of mirror elements.

Referring to FIG. 22, the vertical axis indicates the deflection angle of a mirror and the current i of the light source, defining the deflection angle of a mirror when the incident light is projected in the ON light state as "ON" and that of the mirror when the incident light is in the OFF light state as "OFF". A current value i transmitted to the light source to project a light intensity for projecting an image is defined as "ON", and a current value i, when the power supply to the light source is completely shut off, is defined as "OFF". The horizontal axis indicates a time axis, indicating the elapsed time.

Prior to time $b_1$: the deflection angle of a mirror is controlled to be OFF, and the current value is OFF when the power supply to the light source is completely shut off.

At time $b_1$: the deflection angle of the mirror is controlled to be ON for projecting an image, and the current value is ON as a result of turning on the power supply to the light source. As a result, an image can be projected.

Between time $b_1$: and time $b_2$: the deflection angle of the mirror is controlled to be ON, and the current value to the light source is repeatedly changed between ON and OFF, causing the light source to perform pulse emission, and thereby the images are projected while adjusting the quantity of light.

At time $b_2$: stopping the application of the voltage to the address electrode, which retains the deflection angle of the mirror in the ON position, controls the mirror under a free oscillation state in which the mirror oscillates between the deflection angles of the ON and OFF states. Here, the number of pulse emission, with the current values set at ON and OFF, is adjusted.

Between time $b_2$: and time $b_3$: the mirror is in a free oscillation state in which the deflection angles of the mirror oscillates between the ON and OFF light state, and the number of pulse emissions, with the current values set at ON and OFF, is adjusted to three times per one cycle of free oscillation, and thereby the quantity of light for projecting an image is adjusted.

Between time $b_3$ and time $b_4$: a control similar to the control carried out between the time $b_2$ and $b_3$ is carried out.

Between time $b_4$ and time $b_5$: the number of pulse emission, with the current values set at ON and OFF, is adjusted to two times per one cycle of free oscillation, while maintaining the mirror in a free oscillation. With this control, it is possible to change the intensity of light of the image that has been projected between the time $b_3$ and time $b_4$. Further, between the time $b_4$ and time $b_5$, the current value of the light source when no image is projected is not controlled at OFF (as between the time $b_1$ and time $b_2$), but controlled at $I_b$. The current value $I_b$ is, for example, the bias current shown in FIG. 4B. An appropriate setting of the bias current makes it possible to control the light source under the semi-ON state in which an incident light is not emitted while the light source is being driven. Specifically, between the time $b_4$ and time $b_5$, the pulse emission is carried out with the current value set at ON and $I_b$. During pulse emission, setting the current value of the bias current from $I_b$ to the ON state makes it possible to activate the light source more rapidly than when changing the current value from the OFF to ON state.

Between time $b_5$ and time $b_6$: while maintaining the mirror under a free oscillation, the number of pulse emissions, with the current values set at ON and OFF, is adjusted to two times per one cycle of free oscillation. Meanwhile, between the time $b_5$ and time $b_6$, the current value of the light source is set at $I_b+I_1$ when no image is projected, instead of being set at ON and $I_b$ (as between the time $b_4$ and time $b_5$). The current value $I_b+I_1$ is the current generated by adding a current value $I_1$ to the current value $I_b$ of the bias current shown in FIG. 4B. The light source control unit controls the switching circuit to add the current value $I_1$ to the current $I_b$ of the bias current. An appropriate setting of the current value $I_b+I_1$ makes it possible to control the light source under the semi-ON state, in which it outputs an incident light with which no image is projected. Specifically, between the time $b_5$ and time $b_6$, the pulse emission can be carried out with the current value set at ON and $I_b+I_1$. In this case, when the current values are changed from $I_b+I_1$ to the ON state, it is possible to activate the light source more rapidly than when changing the current values from the OFF to ON state, or from the current value $I_b$, of the bias current, to the ON state.

The light source control unit controls the current of the circuit, as described above, to control the light source under the ON state, semi-ON state, and OFF state, to achieve an appropriate adjustment of the intensity of light emitted from the light source.

As described above, the present embodiment is configured to keep a semiconductor light source turned on at a degree of brightness in which no image is projected or to keep applying the light source with a drive current or drive voltage at a value at which the light source is not turned on and an image is not projected. Such a control enables a more rapid response in changing over between projecting an image and projecting no image, preventing blurriness in a moving image.

Embodiment 6

A projection apparatus according to the present embodiment comprises a spatial light modulator for modulating the incident light emitted from a light source and a wobbling device for changing the positions of reflection or transmission of the incident light by performing a wobbling, wherein the light source and wobbling device are synchronized with each other to turn off the light source during a period when the positions of reflection or transmission of the incident light are being changed.

The wobbling device is, for example, an actuator (i.e., the actuator 4020 exemplified in FIG. 14), which is connected to and wobbles the spatial light modulator. The light source comprised in the present embodiment may be a laser light source or a light emitting diode (LED), either of which is capable of performing pulse emission. The usage of such a light source enables synchronization with the wobbling device. Further, in addition to having an ON state and an OFF state, the device may use a light source having a semi-ON state, in which the light source emits an incident light with which no image is projected or in which the light source does not emit incident light while being driven. The details of the light source with a semi-ON state have been described for FIGS. 21 and 22. Note that the control for producing the ON state, semi-ON state, and OFF state of the light source can be carried out with the configurations put forth in FIGS. 3A and 3C.

The spatial light modulator includes a plurality of light modulation elements, each modulating an incident light emitted from the light source and controlling the reflection light of the incident light to an ON direction, directing the reflection light of the incident light towards a projection light path, or an OFF direction, directing the reflection light of the incident light away from a projection light path. A spatial light modulator comprising such a light modulation element includes a mirror device. The mirror device is configured by arraying a plurality of mirror elements, each comprising both a deflectable mirror, supported by an elastic hinge equipped on a substrate, and an address electrode placed on the substrate and under the mirror, as put forth in FIGS. 14, 15, 16A through 16C, 17A, 17B, 18A through 18C and 19, and later described in FIGS. 28A through 28D and FIG. 29. Such a mirror device is controlled by means of the configuration described in FIG. 20.

The following is a description of the operation of the light modulation element of the spatial light modulator when performing a wobbling operation.

Figure 23:
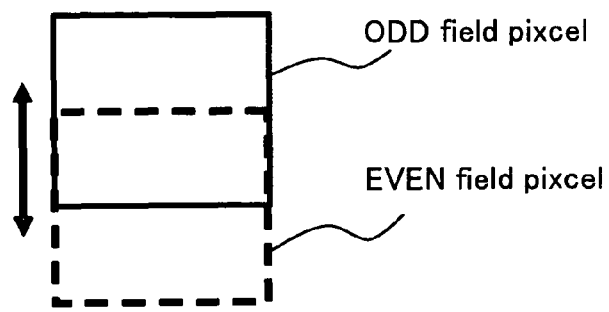
FIG. 23 is a diagram illustrating an oscillation of a light modulation element of a spatial light modulator when operating a wobbling device according to the present embodiment.

FIG. 23 is a diagram for illustrating an oscillation of a light modulation element of a spatial light modulator when operating a wobbling device according to the present embodiment. The present embodiment is configured to operate a wobbling device to fluctuate (or wobble) the light modulation element in the vertical up and down direction instead of in a diagonal direction. Fluctuating the light modulation element vertically makes it possible to project an image of an interlaced signal directly, without requiring an extra process.

The interlaced method represents an image projection method for dividing one image into two fields, an odd field and even field, and displaying the fields alternately to change the image. Specifically, the odd field represents the pixels corresponding to the odd numbered rows of one image, while the even field represents the pixels corresponding to the even numbered rows of one image.

Displaying an image by alternating fields increases the number of changes to one image, enabling a display of smooth motion. This method enables a display without increasing the bandwidth or the amount of bit-rate information processing, and therefore a common broadcast signal may adopt the interlaced method. For example, on a liquid crystal display (LCD), a flicker is generated when a stationary image is displayed, and the interlaced signal is converted into a non-interlaced signal before displaying an image. Such a method is called a progressive method, in which the amount of information is increased to two times and an image is degraded in the process of synthesizing the odd and even fields.

Therefore, when the odd field of an interlaced signal is first displayed, fluctuating the light modulation element vertically, upward and downward, as the present embodiment is configured, makes it possible to display an even field superimposed on the odd field, thus obtaining an effect similar to that of the progressive method without requiring a conversion of the interlaced signal into a progressive signal.

Figure 24:
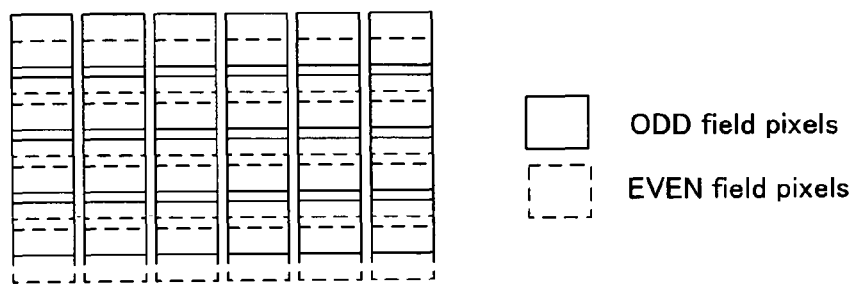
FIG. 24 is a diagram illustrating the wobbling of the even field of an interlaced signal in the vertical direction after displaying the odd field thereof according to the present embodiment.

FIG. 24 is a diagram illustrating of the case of wobbling the even field of an interlaced signal in the vertical direction after displaying the odd field of the interlaced signal.

The method shown in FIG. 24 performs a wobbling with a wobbling device, the actuator 4020, controls the spatial light modulator 5100 (i.e., the spatial light modulator 4000) after displaying the odd field of an interlaced signal. Such an operation makes it possible to change the modulation of light to a position where the even field is superimposed on the odd field by shifting the even field by approximately one half of the field from the original position.

Therefore, by projecting the interlaced image directly instead of carrying out extra image processing for an interlaced signal, it is possible to reduce image processing and improve the image quality of a projection image.

Furthermore, the present embodiment is configured to switch off the light source in sync with the wobbling, in order to turn off the light source during the wobbling.

Figure 25:
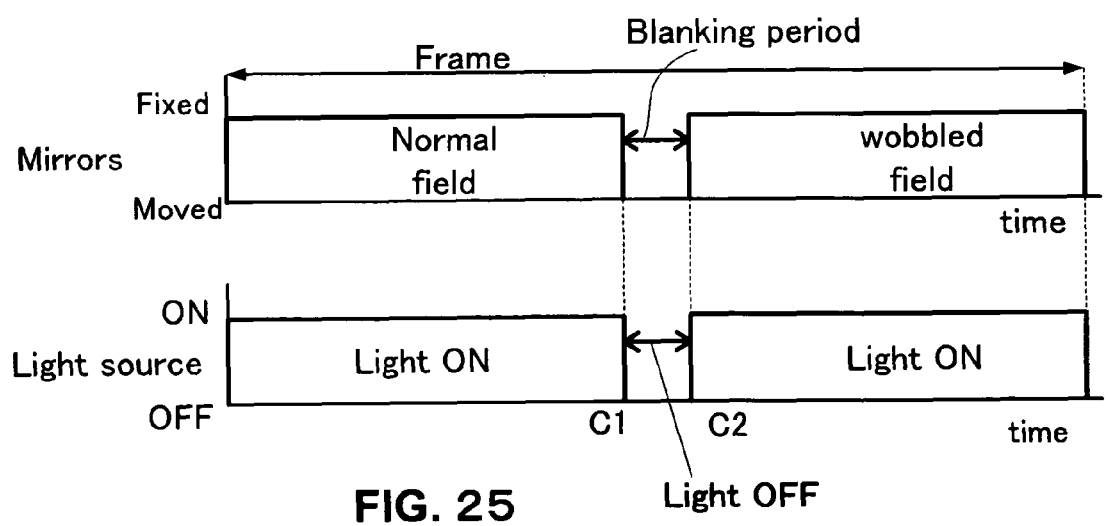
FIG. 25 is a graph illustrating the synchronization between a light source and the change in mirror positions of a mirror device by means. of a wobbling within one frame, according to the present embodiment.

FIG. 25 is a graph illustrating the synchronization between a light source and the change in mirror positions of a mirror device (for example, a spatial light modulator) by means of a wobbling within one frame.

The vertical axis of the figure indicates the changes of the mirror positions in a mirror device and changes of the output of a light source. A term "Fixed" is defined as when the mirror is at a prescribed position and another term "Moved" defined as when the mirror is moved in the wobbling process. "Normal field" indicates the mirror position prior to being wobbled, and "wobbled field" indicates the mirror position after being wobbled. The output of the light source is defined as "ON" when the light source emits an incident light for projecting an image, and "OFF" when the power supply to the light source is completely shut off. The horizontal axes are time axes, indicating the elapsed time.

Prior to time $c_1$: the mirror position of the mirror device is fixed at a Normal field, with the output of the light source set at ON. Therefore, if the Normal field is, for example, the odd field, the image of the odd field is projected.

Between time $c_1$ and time $c_2$: the mirror positions are shifted by the wobbling device. While the mirror positions are being shifted by the wobbling, the power supply to the light source is turned OFF in sync with time in turning on the wobbling device. As a result, no image is projected while the mirror positions are moved during the mirror wobbling process thus projecting a black image.

At time $c_2$: the mirror wobbling process is completed and the wobbling device has moved the mirror to a prescribed fixed position. Then the power supply to the light source is turned ON in sync with turning off the wobbling device. This operation causes the image of the even field to be projected with the even field designated for display as the wobbled field.

Pixels are distinctively separated before and after the wobbling by the synchronization of the light source and wobbling device, turning off the power supply to the light source during the wobbling, as described above. Therefore, the resolution of the projection image can be improved. The process of switching off of the light source also has the advantage of reducing the power consumption and the heat generated by projecting light onto the spatial light modulator.

A projection apparatus comprising a synchronously controlled wobbling device and a spatial light modulator to improve the resolution of image display is therefore described above. Such projection apparatuses include, for example, a single-panel projection apparatus, which is described in FIG. 1 and comprises one spatial light modulator connected to a wobbling device, and a multi-panel projection apparatus, which is described in FIG. 2 and comprises a plurality of spatial light modulators, each connected to a wobbling device.

Embodiment 7

A projection apparatus according to the present embodiment comprises a mirror device that includes a plurality of mirror elements for modulating the incident light emitted from the light source by controlling the reflection light of the incident light in an ON direction towards a projection light path or in an OFF direction away from a projection light path. Further, a pulse width modulation (PWM) controller controls the timing sequences of operating the light source and mirror device in each frame or sub-frame. During the ON state, the mirror elements do not finish the ON operation simultaneously. Each mirror element performs an ON operation, but the operation is extended in the mirror producing the maximum brightness, even while the other mirrors are finished with the ON operation within the one frame or one sub-frame, the light source is turned off. Specifically, the brightness represents the intensity of reflection light in the projection light path.

The light source may be implemented with a laser light source or a light emitting diode (LED) controllable to project pulsed emissions. More convenient control processes for controlling the light source implemented with laser light sources to operate with synchronization with the mirror device is achievable. Furthermore, in addition to having an ON and an OFF state, the light source may have a semi-ON state, in which the light source emits no incident light while it is being driven, as described for FIGS. 21 and 22. Note that the control for producing the ON state, semi-ON state, and OFF state of the light source can be carried out with the configurations illustrated in FIGS. 3A and 3C.

The mirror device includes a plurality of mirror elements, configured as mirror array. Each mirror elements includes a deflectable mirror supported by an elastic hinge formed on a substrate with an address electrode formed on the substrate and under the mirror, as described in FIGS. 14, 15, 16A through 16C, 17A, 17B, 18A through 18C and 19, and later described in FIGS. 28A through 28D and FIG. 29. Such a mirror device is controlled by means of the configuration as shown in the above-described FIG. 20. The mirror of the mirror device is preferably controlled using non-binary data obtained by converting binary data, as described in FIG. 12.

The following is a description of the operation for extending the length of time of a ON period for controlling and operating the mirror in an ON state. The ON state operation is extended to increase the brightness of image display for a mirror during the time when the other mirrors have completed the ON operation. After the elapse of the extended time for extending the ON operation for the mirror to generate the maximum brightness, the light source is turned off. The mirrors are controlled by applying a non-binary data to carry out a PWM control process.

Figure 26:
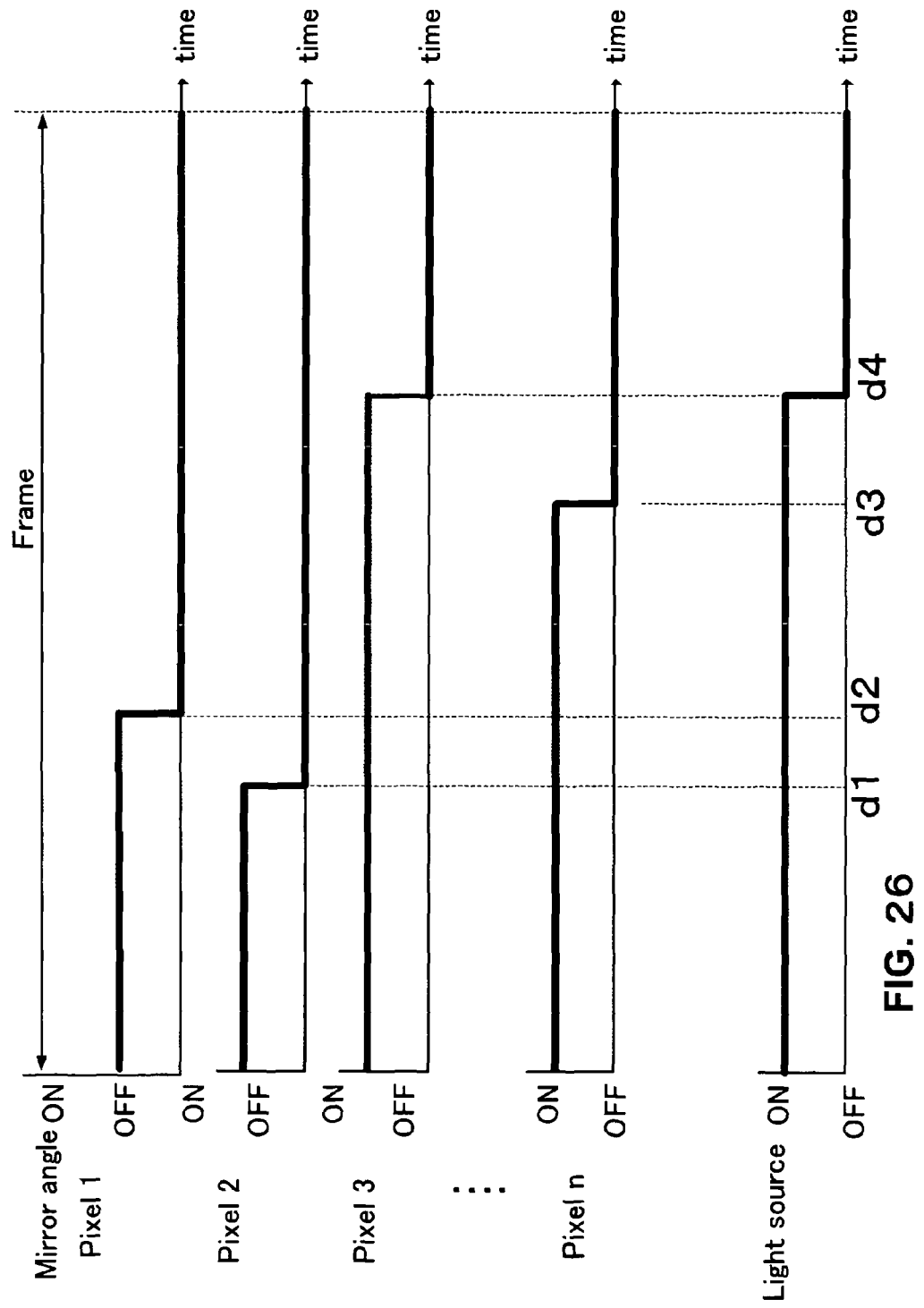
FIG. 26 is a graph illustrating the synchronization between a light source and the deflection angle of each mirror element of the present embodiment.

FIG. 26 is a graph showing the synchronization of a light source and the deflection angle of each mirror element.

In FIG. 26, the vertical axis represents the deflection angle of a mirror and the output of a light source. The deflection angle of a mirror is defined as "ON" when the incident light constitutes an ON light, and defined as "OFF" when the incident light constitutes an OFF light. The output of the light source is defined as "ON" when the light source emits the incident light with which an image is projected and "OFF" when the power supply to the light source is completely shut off. The respective horizontal axes represent time axes, indicating the elapsed time. The assumption is that there are n-pieces of individual mirror elements, with the individual mirror elements represented by Pixel 1 through Pixel n. Further, Pixel 3 is assumed to be the brightest mirror element (i.e., the brightest pixel), directing the maximum intensity of reflection light towards the projection light path.

Referring to FIG. 26, the brightest pixel 3 continues the ON operation until time $d_4$. All the other mirror elements finish the ON operation before time $d_4$. The ON operation of the pixel 2 is finished at time $d_1$; the ON operation of the pixel 1 is finished at time $d_2$; and the ON operation of the pixel n is finished at time $d_3$.

At time $d_4$, the output of the light source is turned OFF in sync with turning OFF the deflection angle of the mirror or pixel 3. This series of operation concludes one frame. Such a control process can also be carried out for a sub-frame.

As described above, the light source is synchronized with the mirror element with the maximum brightness, and stays on, even while other mirror elements finish the ON operation. When the brightest mirror element is finished with the ON operation, the light source is turned off. As a result, within the period of one frame or one sub-frame, unstable reflection of the incident light can be eliminated during the transition operation of mirror elements, except for the brightest mirror element. This produces a clearer image.

Specifically, it is preferable to turn on the light source when each mirror stops and is ready to continue the ON operation, and it is preferable to turn off the light source immediately before the completion of projecting the pixel from a last mirror element and getting ready to, starts the OFF operation.

The following description discuss an exemplary embodiment of the present invention that is configured to control each mirror element by applying a pulse width modulation (PWM) control process to operate in an ON state for one frame or one sub-frame and to operate at least one OFF state by reflecting the incident light to the OFF direction, in the midst of the ON operation of each mirror element.

The following is a description of the operation, in which the mirror element with the maximum brightness reflects incident light in the ON direction, while the other mirror elements finish reflecting the incident light in the ON direction, and the brightest mirror element performs at least one OFF operation, in between the ON operations of the mirror element in one frame or one sub-frame. Specifically, the assumption is that each mirror element is under a PWM control using non-binary data.

Figure 27:
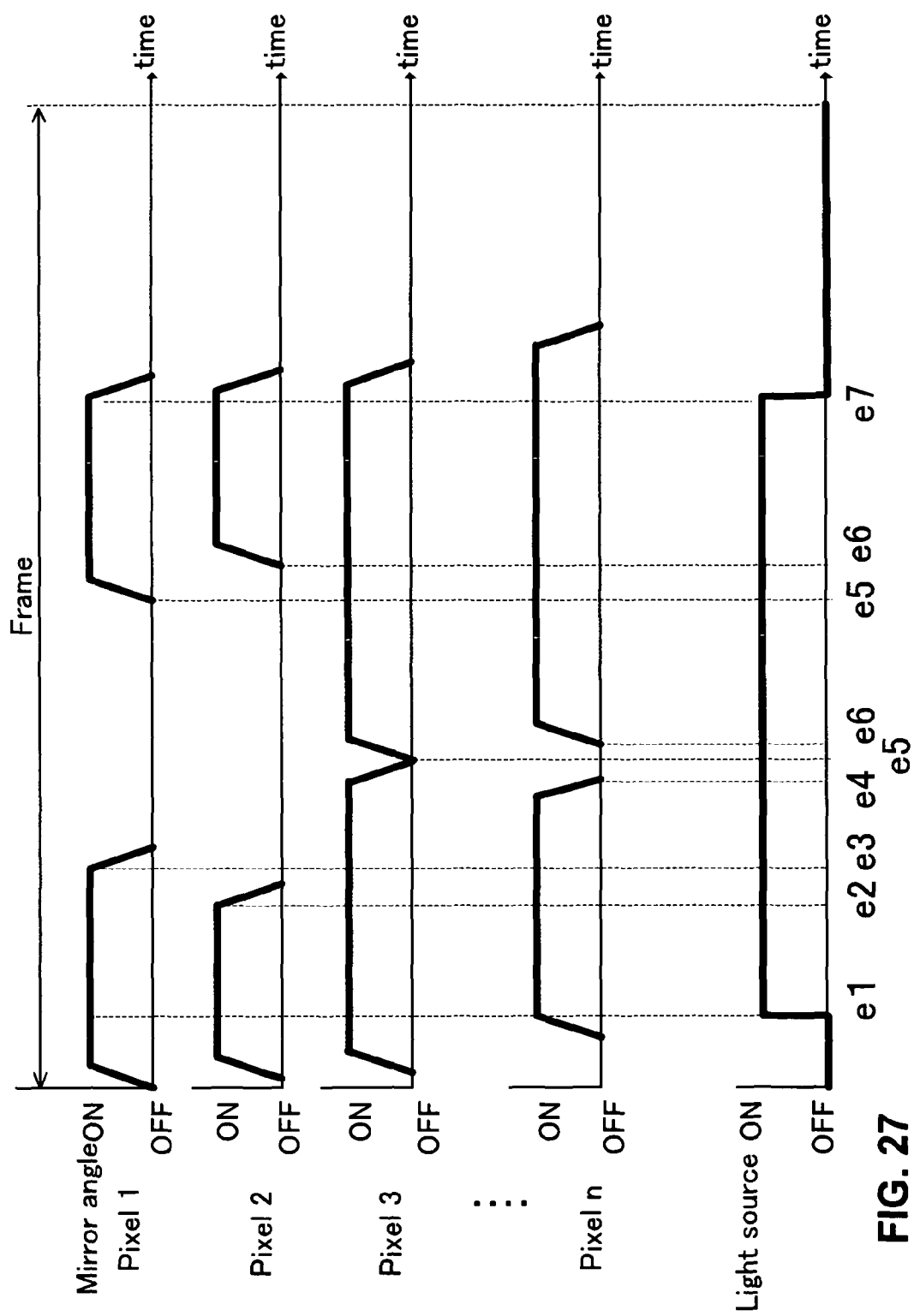
FIG. 27 is a graph illustrating one OFF operation of each mirror element within one frame while synchronizing a light source with each mirror element, according to the present embodiment.

FIG. 27 is a timing diagram for showing one OFF operation of each mirror element within one frame while synchronizing a light source with each mirror element, according to the present embodiment. Referring to FIG. 27, the vertical axis indicates the deflection angle of a mirror and the output of a light source, with the deflection angle of a mirror defined as "ON" when the incident light constitutes an ON light, and defined as "OFF" when the incident light constitutes an OFF light. The output of the light source is defined as "ON" when the light source emits incident light with which an image is projected and "OFF" when the power supply to the light source is completely shut off. The respective horizontal axes represent the time axes, indicating the elapsed time. An assumption is that there are n-pieces of individual mirror elements, with the individual mirror elements represented by Pixel 1 through Pixel n. The figure depicts the control for each mirror element within one frame. It is also assumed that the light source is turned ON between the time $e_1$ and $e_9$ and that Pixel 3 is the mirror element with the maximum brightness (i.e., the brightest pixel), directing the maximum intensity of reflection light towards a projection light path.

At time $e_5$: the brightest Pixel 3 performs an OFF operation. The other pixels are controlled not to be ON at time $e_5$ while the brightest Pixel 3 is performing an OFF operation. As a result, the other mirror elements are in the OFF position, and therefore a dark image is inserted.

Between time $e_1$ and time $e_5$ during the period when the brightest Pixel 3 performs an ON operation, Pixel 2 performs the OFF operation at the time $e_2$, Pixel 1 performs the OFF operation at time $e_3$, Pixel n performs the OFF operation at time $e_4$.

At time $e_5$: the brightest Pixel 3 performs an ON operation immediately after the OFF operation. After the brightest Pixel 3 performs the ON operation, the other mirror elements are each controlled to perform their respective ON operations. Pixel n performs an ON operation at time $e_6$; Pixel 1 performs an ON operation at time $e_7$; and Pixel n performs an ON operation at time $e_8$. At time $e_9$: the output of the light source is turned OFF, and one frame is finished. Note that such a control can also be carried out within sub-frames.

In FIG. 27, the output of the light source is turned OFF in the midst of the OFF operation of the brightest mirror element. It is, however, also possible to turn ON/OFF the output of the light source in sync with the OFF or ON operation of the brightest mirror element. Further, it may also be possible to synchronize the start and finish of the ON and OFF operations of other mirror elements in sync with the start and finish of the ON and OFF operations of the brightest mirror element.

With the above described operations, all the mirror elements each performs at least one time OFF operation in the midst of the ON operations within one frame or one sub-frame. As a result, the light and shade portions of the image are enhanced by inserting a black image between individual frames or sub-frames, and thereby, the image quality is improved.

Turning off the light source makes it possible to reduce the power consumption and the heating of the spatial light modulator. Further, the mirror device comprising mirror elements controlled in this manner can also be used in a projection apparatus.

Such projection apparatuses include, for example, a single-panel projection apparatus, described in FIG. 1, comprising one mirror device, and a multi-panel projection apparatus, described in FIG. 2, comprising a plurality of mirror devices.

Embodiment 8

A mirror device according to the present embodiment is configured to array a plurality of mirror elements, each comprising both a deflectable mirror, which is supported by an elastic hinge equipped on a substrate, and which reflects the incident light emitted from a light source, and a single address electrode placed on the substrate under the mirror, which Specifically asymmetrical about the deflection axis of the mirror. The configuration is described further in FIGS. 14, 17A, 17B, 18A through 18C and FIG. 19. The mirror device is controlled by means of the configurations described in FIG. 20.

Furthermore, the light source is turned off during a series of mirror operations, starting from the initial state of the mirror to the completion of a mirror deflection to one side of the single address electrode after the mirror is deflected to the other side of the single address electrode.

The light source may be, for example, a semiconductor light source such as a laser light source. Furthermore, in addition to an ON and OFF state, the light source may be controlled to operate in a semi-ON state, by controlling the light source to project an incident light that does not display an image is projected or controlled to project no incident light while the light source is being driven, as described in FIGS. 21 and 22. Note that the control for producing the ON state, semi-ON state, and OFF state of the light source, as noted in FIGS. 21 and 22, can be carried out with the configuration as shown in FIGS. 3A and 3C described above.

Figure 28A:
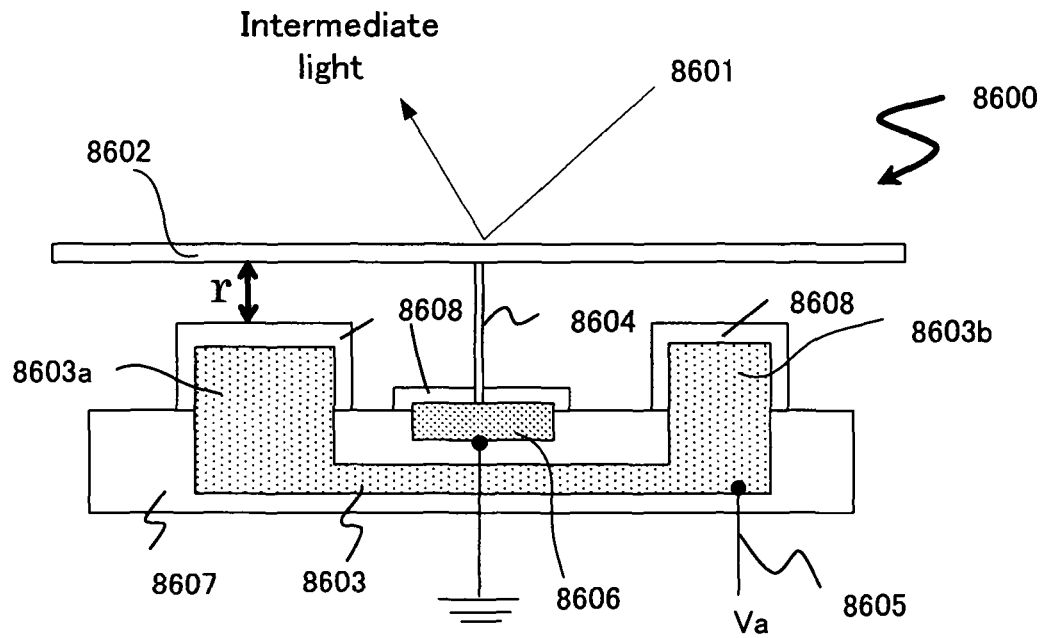
FIG. 28A shows the configuration of one mirror element, in the initial state, according to the present embodiment.

As an example, FIG. 28A shows the configuration of one mirror element of the mirror device according to the present embodiment. The mirror element 8600 comprises one drive circuit formed on a substrate 8607 for deflecting a mirror 8602. Furthermore, an insulation layer 8608 is formed on the substrate 8607, and an elastic hinge 8604 is equipped on the insulation layer 8608. The elastic hinge 8604 supports the mirror 8602, and a single address electrode 8603 connected to a drive circuit is formed under the mirror 8602. The mirror 8602 is electrically controlled by the single address electrode 8603, and by the drive circuit Specifically connected to the single address electrode 8603. A hinge electrode 8606, connected to the elastic hinge 8604, is grounded through the insulation layer 8608. Furthermore, the mirror device can be manufactured by forming a plurality of mirror elements 8600 described above on the substrate 8607, as shown in FIG. 14.

The present patent application defines the left part (as shown in the figure) of the single address electrode 8603 exposed above the substrate 8607 as the "first electrode part 8603a", and the right part thereof as the "second electrode part 8603b". The elastic hinge 8604 or the deflection axis of the mirror 8602 is defined as the border. The design is such that a Coulomb force is generated between the first 8603a or second electrode part 8603b and the mirror 8602, by applying a voltage to the single address electrode 8603. The term, "applying a voltage," in the patent application can be reworded as "changing an electric potential to a predetermined waveform." Differentiating the magnitudes of Coulomb force between the left and right sides of the mirror 8602 makes it possible to deflect the mirror 8602 to the left and side of the deflection axis. When the mirror 8602 is deflected to the left or right side, it is preferable that the angles formed between the deflection angle of the mirror and the vertical axis of the substrate 8607 are symmetrical, in the manner shown in FIG. 28A.

The mirror 8602 is formed by, for example, a highly reflective metallic material or a dielectric multilayer film. A part (e.g., the base part, neck part, and in between) of the elastic hinge 8604 supporting the mirror 8602 is made of a metallic material, or the like, with a restoring force. Note that the present patent application depicts the elastic hinge 8604 as a cantilever, possessing elasticity to a degree, which allows for a free oscillation of the mirror 8602. The elastic hinge 8604 can also be formed in a torsion hinge. The single address electrode 8603 is made of an electrical conductive material such as aluminum (Al), copper (Cu), or tungsten (W), and is configured to be the same potential throughout the entirety of the electrode. The insulation layer may be composed of $SiO_2$ or SiC, and the substrate 8607 may use, for example, Si.

Note that the materials and forms of each constituent component of the mirror element 8600 specified in the present patent application may be appropriately changed in accordance with its purpose.

In the following FIGS. 28B through 28D, the single address electrode 8603 is configured to be asymmetrical about the elastic hinge 8604 or the deflection axis of the mirror 8602. The direction of the first electrode part 8603a of the single address electrode 8603 is defined as the OFF light side, and the direction of the second electrode part 8603b is defined as the ON light side for generating an ON light.

The initial state of the mirror device according to the present embodiment is a state when the mirror is maintained in a horizontal position relative to the substrate, as indicated in FIG. 28A. In the following description for FIG. 28A, the initial state of the mirror reflects the incident light 8601 is reflected to project and display the image with an amount of light as an intermediate light.

Figure 28B:
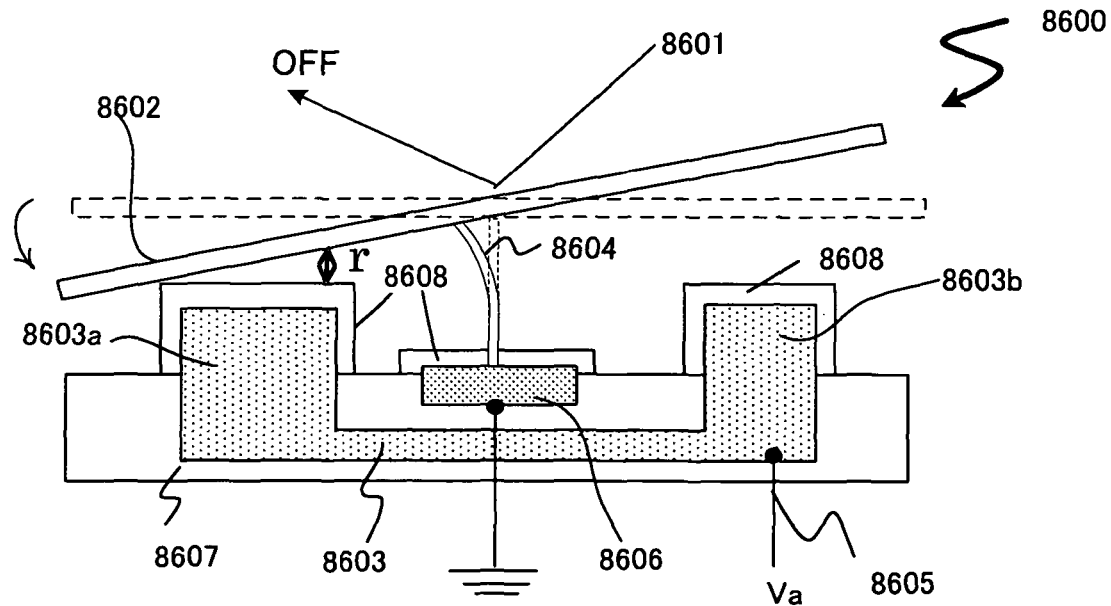
FIG. 28B shows the configuration of one mirror element, in an OFF state, according to the present embodiment.

FIG. 28B shows a cross-sectional diagram of a mirror element 8600, in an OFF light state of the mirror device, according to the present embodiment.

Referring to FIG. 28B, a Coulomb force F is generated between the first and second electrode parts and the mirror 8602 facing the respective electrode parts by applying a voltage to the single address electrode 8603 in the initial state shown in FIG. 28A. If the area of the second electrode part is larger than that of the first electrode part, the Coulomb force generated between the second electrode part and the mirror 8602 is larger than the Coulomb force generated between the first electrode part and the mirror 8602. The mirror, accordingly, will tilt to the second electrode part. The application of a voltage to the single address electrode 8603 as such deflects the mirror 8602, thereby making it possible to reflect the incident light 8601 as an OFF light.

Figure 28C:
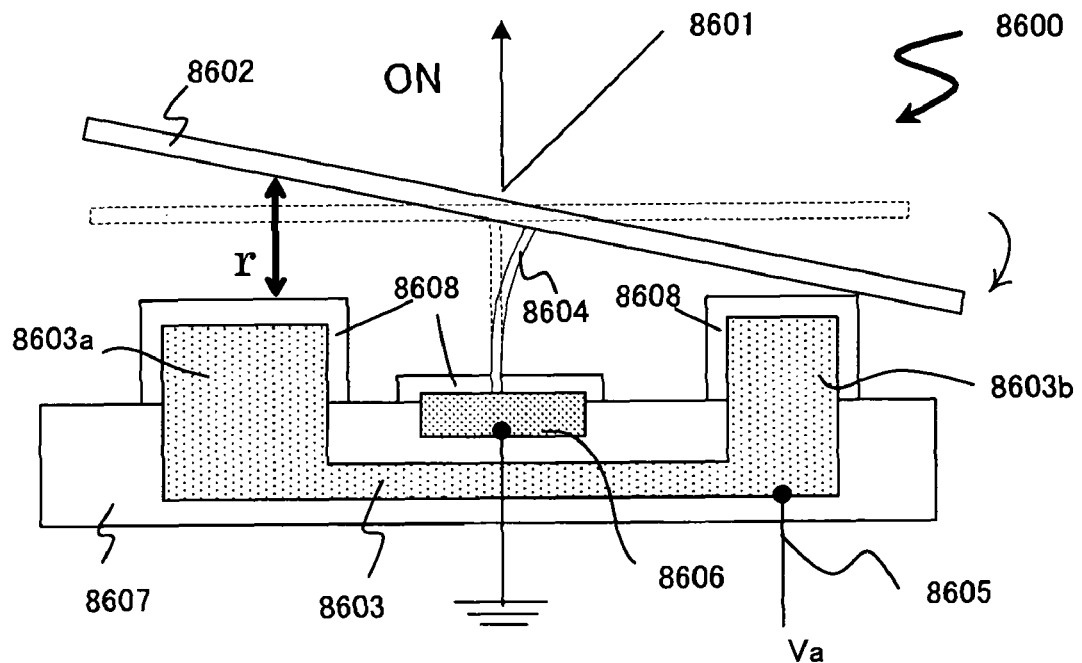
FIG. 28C shows the configuration of one mirror element, in an ON state, according to the present embodiment.

FIG. 28C shows a cross-sectional diagram of a mirror element 8600 of the mirror device, in a state of generating an ON light, according to the present embodiment.

In FIG. 28B, a voltage is applied to the single address electrode 8603 to produce an OFF light, and then the voltage applied to the single address electrode 8603 is shut off. As a result, the mirror 8602 performs a free oscillation due to the elastic force of the elastic hinge 8604. With this free oscillation, the mirror 8602 oscillates between the deflection angles producing the ON light and that producing the OFF light.

When the free-oscillating mirror 8602 and the first electrode part 8603a of the single address electrode 8603 producing the OFF light, are close to each other, a voltage is re-applied to the single address electrode 8603 at an appropriate time. This operation regenerates a Coulomb force F between the first 8603a and second 8603b electrode parts and the mirror facing each part. Now, if the distance between the first electrode part 8603a and the side of the mirror it faces is larger and that between the second electrode part 8603b and the side of the mirror it faces, the Coulomb force will be greater with the second electrode part than with the first electrode part because a Coulomb force is inversely proportionate to the second power of the distance. Therefore, the mirror 8602 will be attracted to the second electrode part and will be retained on side of the second electrode part to produce the ON light.

When the mirror 8602 is in a free oscillation state and reaches a horizontal position relative to the substrate, such as in the initial state, the application of an appropriate pulse voltage to the single address electrode 8603 at an appropriate position of the free-oscillating mirror 8602 cause the mirror 8602 to return to the initial horizontal state. The operation is different from the conventional technique with the mirror controlled to return to the initial state by the application of an appropriate voltage(s) to two address electrodes in order to generate an equal Coulomb force to cause a mirror to stop oscillating.

In contrast, the present invention is configured to apply a pulse voltage to the single address electrode 8603, thereby making it possible to return the mirror 8602 to the initial state.

As described above, it is possible to control the ON light and OFF light of the incident light by controlling the operation which inputs a voltage to the single address electrode

8603. Therefore, each mirror can be independently controlled with fewer address electrodes than in the conventional method. Further, a configuration with only one address electrode makes it possible to reduce the number of drive circuits connected to the address electrode to one. This configuration makes it possible to further shrink the mirror device, as compared with the conventional technique.

Figure 28D:
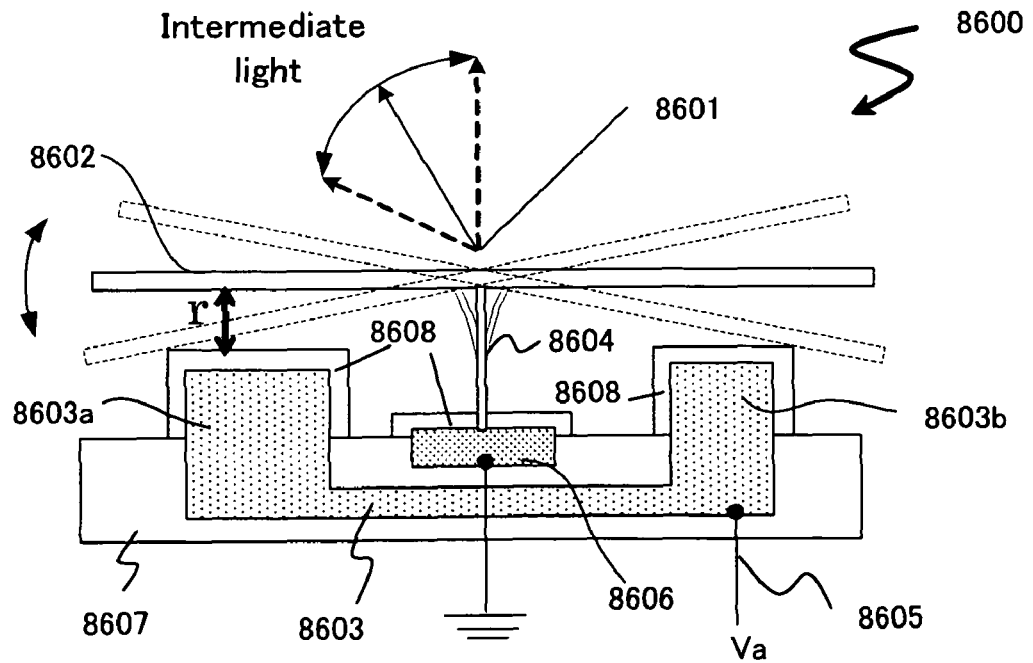
FIG. 28D shows the configuration of one mirror element, in an oscillation state, according to the present embodiment.

FIG. 28D shows a method for controlling the intensity of reflection to a projection path by causing a mirror to perform a free oscillation between the deflection angles of the ON light and the OFF light states and determining the intensity of an intermediate light.

FIG. 28D shows a continuous repetition of the ON light state, intermediate light state, and OFF light state of the mirror 8602 by causing it to perform a free oscillation. Controlling the number of repetitions enables control of the intensity of the incident light reflected to a projection light path. By calculating the number of repetitions and the intensity of incident light reflecting towards the projection light path per repetition, is possible to flexibly control the intensity of intermediate light between the complete ON light state and the complete OFF light state.

With the above described control, it is possible to control the intensity of light reflected by one mirror under at least three states, i.e., the ON light, intermediate light, and OFF light, with the single address electrode, and therefore, the intensity of light reflecting towards the projection light path can be adjusted as needed.

Further, it is possible to change the respective heights of the first electrode part 8603a and second electrode part 8603b of the single address electrode shown in FIGS. 28A through 28D. It is also possible to add a stopper to the configuration. Note that the initial state of a mirror, the state in which the mirror is retained on the first electrode part 8603a or the second electrode part 8603b, which are indicated in FIGS. 28A through 27D, may be assigned to any of the ON light state, intermediate state, and OFF light state. The free oscillation can be controlled using an elastic hinge possessing a restoring force satisfying its purpose on an as needed basis.

Figure 29:
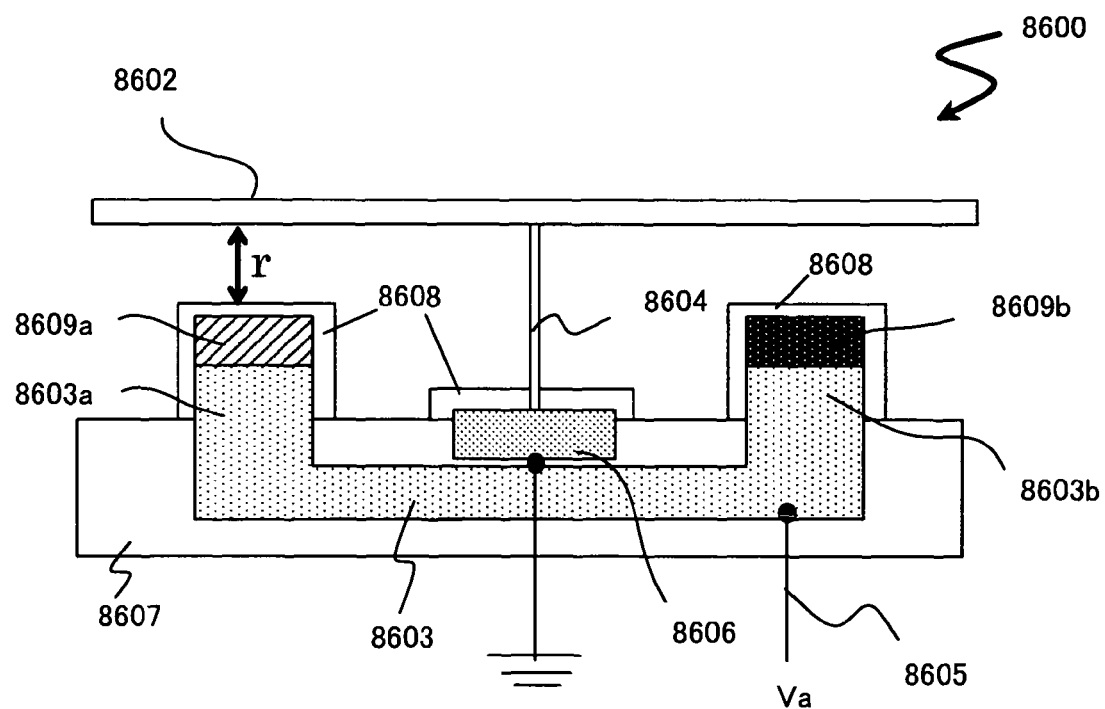
FIG. 29 shows the configuration of one mirror element when materials with different permittivity values are used, between the first electrode part and second electrode part of the upper parts of a single address electrode of one mirror element of the present embodiment.

The single address electrode 8603 may possess physical properties, which are asymmetrical about the deflection axis of the mirror, and the form of the single address electrode 8603 may be altered as needed As an example, FIG. 29 shows how the mirror 8602 can be controlled under the ON and OFF light states when electrode materials 8609a and 8609b, with mutually different permittivity values, are used for the upper parts of the first electrode part 8603a and second electrode part 8603b, respectively, of the single address electrode 8603 of one mirror element 8600 of a mirror device according to the present embodiment. According to the configuration in FIG. 29, other than using materials with different permittivity values on the upper parts of the first and second electrode parts of the single address electrode, the mirror element is formed to be symmetrical about the elastic hinge 8604.

If the mirror is made of a material based on Si or $SiO_2$, a material with a different and high permittivity value is preferably $Si_3N_4$, or $HfO_2$, Specifically, the materials may include the a high-k material, which is common recognized recently as materials compatible to a miniaturization devices manufactured on a semiconductor substrate.

Next is a description of a method for configuring a mirror element using materials with different permittivity values for the first 8603a and second 8603b electrode parts of the upper parts of the single address electrode 8603, thereby controlling the mirror 8602 under the ON and OFF light states. The control method for the mirror 8602 according to the present embodiment will be understood by referring to the control method put forth in the FIG. 19. Here, a brief description of the control method for the mirror element shown in FIG. 29 is provided.

When deflecting the mirror 8602 from the initial state, the application of a voltage to the single address electrode 8603 makes it possible to tilt the mirror 8602 to the side where a material with lower permittivity is used on the basis of the above-described expression (1). A stronger Coulomb force is generated with the side with lower permittivity. The mirror 8602 tilted from the initial state starts performing a free oscillation when the voltage applied to the single address electrode 8603 is temporarily cut to "0" volts. When the free-oscillating mirror 8602 comes close to the single address electrode 8603 on either the ON light side or OFF light side, an appropriate voltage is applied to the single address electrode 8603. As a result, the mirror 8602 can be retained onto the ON light side or OFF light side, that is, the first electrode part 8603a or second electrode part 8603b, and thereby the ON light state or OFF light state can be produced. Because the Coulomb force F represented by the expression (1) has a stronger function with the second power of the distance r between the mirror 8602 and single address electrode 8603 than with the permittivity $\in$ thereof, the fact that the distance r between the single address electrode 8603 and mirror 8602 is shorter has a stronger effect on the Coulomb force F than the magnitude of the permittivity $\in$. Therefore, it is possible to tilt the mirror 8602 to the ON light side, or OFF light side, when either of the distances r between the single address electrode 8603 and mirror 8602 is shorter.

The above-described operation enables a control for the mirror 8602 from the initial state to the OFF light state or ON light state.

Meanwhile, the control method for returning the mirror 8602 from the ON light state or OFF light state to the initial state may also be understood from the control method put forth in FIG. 19. It is possible to return the mirror 8602 to the initial state by applying an appropriate pulse voltage while the mirror is retained on the ON light state or the OFF light state. For example, the mirror 8602 performs a free oscillation by temporarily reducing the voltage applied to the single address electrode 8603 to "0". Then, during the free oscillation, while the mirror is tilting in one direction, a voltage is temporarily applied to the single address electrode 8603 just when the distance r between the single address electrode 8603 and mirror 8602 reaches an appropriate value. As a result, a Coulomb force F pulls the mirror 8602 in the direction opposite the one in which it was heading during free oscillation. Generating acceleration towards a different direction from the one in which it was heading enables the return of the mirror 8602 from either the ON or OFF light state to the initial state.

This control of the mirror 8602 of the mirror device is preferably carried out using non-binary data obtained from converting binary data, with the conversion methods put forth in FIG. 12. Note that the present embodiment is configured to control the mirror 8602 by means of a PWM control using non-binary data.

As seen in the above description, when a single address electrode 8603 controls the mirror 8602, and the mirror 8602 is tilted first from the initial state to a side with a smaller Coulomb force between the mirror 8602 and single address electrode 8603, a "dummy operation" is required, in which the mirror 8602 is first tilted towards the side with a larger Coulomb force between the mirror 8602 and single address electrode 8603. The present embodiment is configured to turn off the light source in synchronous with the mirror device during a period in which the mirror is performing the dummy operation.

Figure 30:
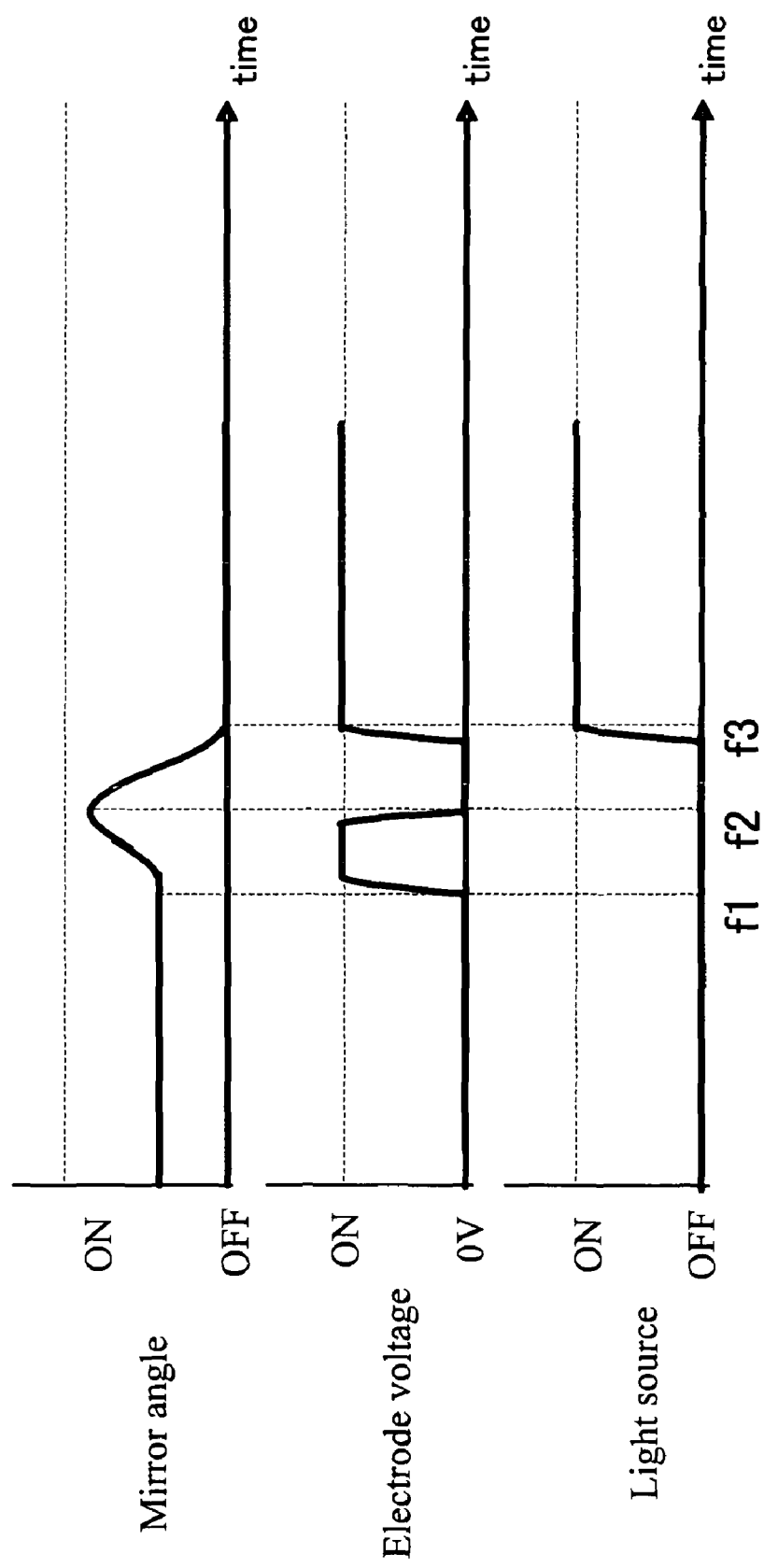
FIG. 30 is a graph illustrating switching off the light source synchronously with a dummy operation of each mirror element.

The following is a description of the operation to switch off the light source in sync with the mirror device, during a period in which the mirror is performing a dummy operation. FIG. 30 is a timing diagram for illustrating the time sequence of turning off a light source synchronously with a dummy operation of each mirror element.

Referring to FIG. 30, the vertical axes represent the deflection angle of a mirror and the output of a light source, with the deflection angle of the mirror defined as "ON" when the incident light constitutes an ON light and defined as "OFF" when the incident light constitutes an OFF light. Voltages are defined as "ON" when a voltage is applied to the single address electrode, and "0" volts when no voltage is applied. Further, the output of the light source is defined as "ON" when the light source emits an incident light to project an image and "OFF" when the power supply to the light source is completely shut off. The respective horizontal axes represent time axes, indicating the elapsed time. Note that, in the graphs, the deflection angle of a mirror on a side where the Coulomb force is greater between the mirror and single address electrode is defined as "ON", while the deflection angle of the mirror on the side where the Coulomb force is smaller between the mirror and single address electrode is defined as "OFF", in the initial state.

Prior to time $f_1$: the power supply to the light source is completely shut OFF, and a voltage is not applied to the single address electrode, i.e., "0" volts.

At time $f_1$: with the power supply to the light source maintained at OFF, a voltage is applied to the single address electrode, turning it ON. As a result, the mirror is deflected to ON position in which the Coulomb force between the mirror and single address electrode is greater.

Between time $f_1$: and time $f_2$: with the power supply to the light source maintained at OFF, a voltage is continuously applied to the single address electrode. The mirror, accordingly, continues to deflect in the ON position and abuts the single address electrode on the ON side.

At time $f_2$: with the power supply to the light source maintained at OFF, the voltage applied to the single address electrode is turned off, i.e., to "0" volts. This causes the mirror to perform a free oscillation.

Between time $f_2$: and time $f_3$: with the power supply to the light source maintained at OFF, the voltage applied to the single address electrode is maintained at "0" volts. As a result, the mirror continues to perform the free oscillation and starts to tilt in the OFF direction from the ON direction.

At time $f_3$: when the mirror approaches the deflection angle OFF, a voltage is applied to the single address electrode, turning it ON. As a result, the mirror abuts on the single address electrode, and the deflection angle of the mirror is retained at OFF.

As noted previously, the present patent application refers to the operation between the time $f_1$, i.e., the initial state, and the time $f_3$ as a "dummy operation". Then, when the deflection angle of the mirror is securely retained on the OFF side after completion of the dummy operation, the light source is synchronously turned ON.

As described above, controlling the light source to switch it off synchronously with the mirror device while the mirror is performing a dummy operation m eliminates an unstable reflection of light in the midst of the deflecting operation of the mirror. A projection apparatus implemented with such a mirror device eliminates an unstable reflection of light in the midst of the deflecting operation of a mirror, and the quality of a projected image is improved.

Projection apparatuses each includes such a mirror device(s) may be implemented with a single-panel projection apparatus, which is described in FIG. 1 and comprises one mirror device, and a multi-panel projection apparatus, which is described in FIG. 2 and comprises a plurality of mirror devices.

Embodiment 9

A mirror device according to the present embodiment is configured to array a plurality of mirror elements, each comprising both a deflectable mirror supported by an elastic hinge equipped on a substrate, which reflects the incident light emitted from a light source, and an address electrode placed on a substrate under the mirror. Further, the present embodiment is configured to retain the mirror, during a period the light source is turned off, in a deflecting direction, opposite the direction in which the mirror was deflected just before the light source is turned off, noted as the "end-of-source-on direction". The length of time the mirror is retained in the a direction opposite the end-of-source-on direction is preferably determined in proportion to the length of time the mirror has been deflected in the end-of-source-on direction The mirror device according to the present embodiment may be any of is the configurations described in FIGS. 14, 15, 16A through 16C, 17A, and 17B, 18A through 18C and 19, and FIGS. 28A through 28D and FIG. 29. Further, the mirror device is controlled by means of the configuration put forth in FIG. 20.

The light source may use, for example, a semiconductor light source, such as a laser light source. Further, in addition to having an ON state and an OFF state, the light source may also have a semi-ON state, in which the light source emits an incident light and no image is projected or emits no incident light while it is being driven, as described for FIGS. 21 and 22. Note that the ON state, semi-ON state and OFF state of the light source can be controlled with the configurations described in FIGS. 3A and 3C.

Furthermore, a mirror of the mirror device is preferably controlled by using non-binary data obtained by converting binary data, using the conversion method as put forth in FIG. 12.

The following is a description of the operation of the present embodiment. The assumption here is that each mirror is controlled with a PWM control using non-binary data.

Figure 31:
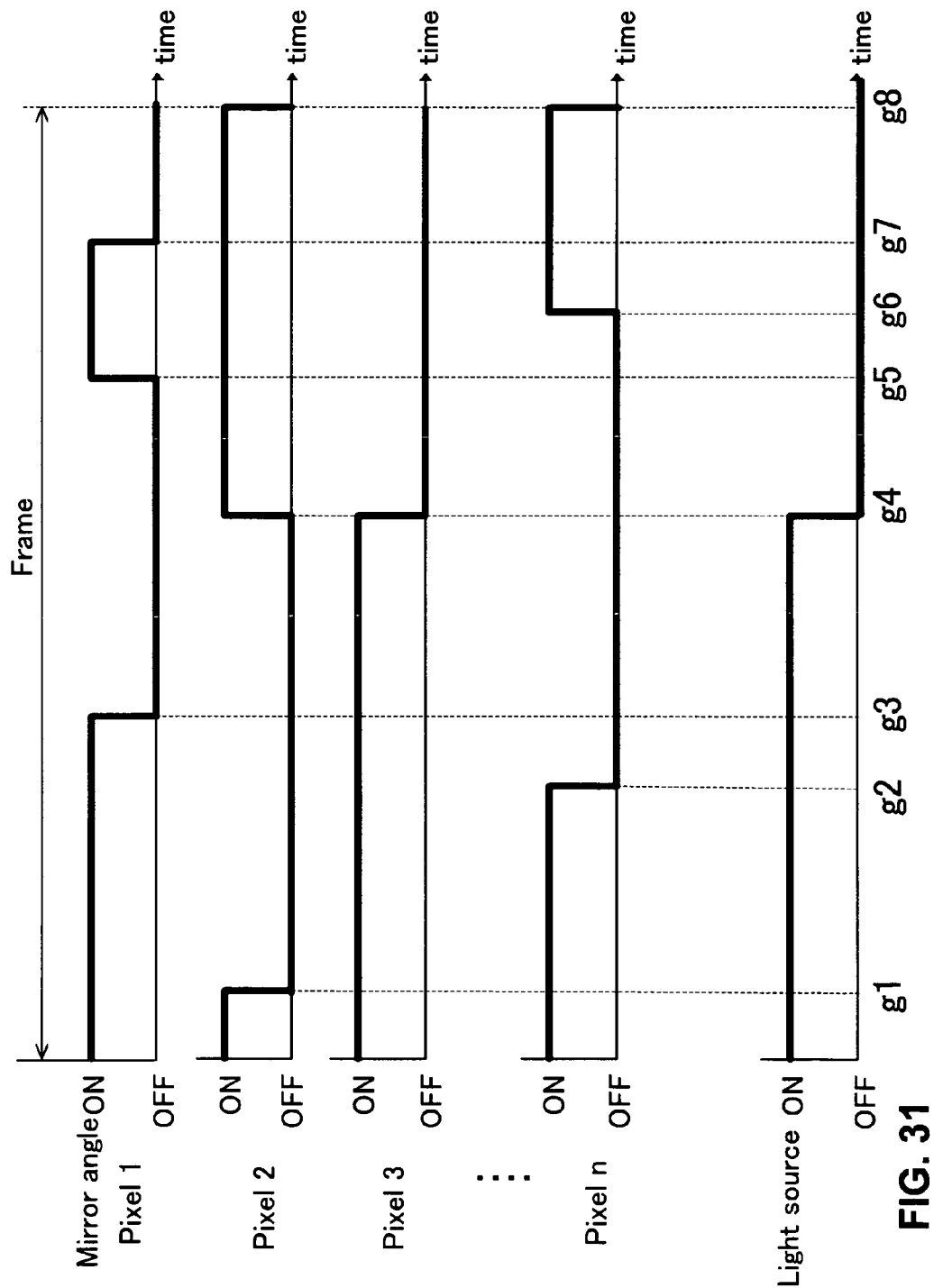
FIG. 31 is a graph illustrating the synchronization between a light source and the deflection angle of each mirror element of the present embodiment.

FIG. 31 is a timing diagram for illustrating the synchronization between a light source and the deflection angle of each mirror element. Referring to FIG. 31, the vertical axes represent the deflection angle of a mirror and the output of a light source, with the deflection angle of the mirror defined as "ON" when the incident light constitutes an ON light and defined as "OFF" when the incident light constitutes an OFF light. Further, the output of the light source is defined as "ON" when the light source emits an incident light to project an image and "OFF" when the power supply to the light source is completely shut off. Further, the respective horizontal axes represent time axes, indicating the elapsed time. It is assumed that there are n-pieces of individual mirror elements, with the individual mirror elements represented by Pixel 1 through Pixel n. The figure depicts the control for each mirror element within one frame. Further, the Pixel 3 is assumed to be the brightest mirror element (i.e., the brightest pixel), Specifically, the mirror element which produces the maximum intensity of reflection light towards a projection light path and which is retained in the ON state for the longest period of time.

The period in which Pixel 3 producing the maximum brightness is ON is synchronized with the period in which the light source is ON. At time $g_4$ when the brightest Pixel 3 is switched from ON to OFF, the light source is also switched from ON to OFF.

Prior to time $g_1$: all mirrors are maintained at ON; the light source is also maintained at ON, in sync with the ON period of Pixel 3.

Between time $g_1$ and time $g_4$: that is during the period the brightest Pixel 3 is maintained at ON, Pixel 2 switches OFF at time $g_1$, Pixel n switches OFF at time $g2$, and Pixel 1 switches OFF at time $g_3$. The light source is maintained at ON.

At time $g_4$: the brightest Pixel 3 switches OFF. The light source, synchronized with Pixel 3, is also turned off. Then, each mirror is retained in the direction opposite the end-of-source-on direction, for a length of time in proportion to the time the mirror was deflected in the end-of-source-on direction. The length of time the mirror has been deflected in the end-of-source-on direction is the longest for Pixel 3, followed by the Pixels 2, n, and 1.

Between time $g_4$ and $g_8$: Pixel 3, deflected longest in the end-of-source-on direction, continues to be deflected in the opposite, OFF, direction between time $g_4$ and time $g_8$. Pixel 2, which was deflected the second longest in the end-of-source-on direction, is deflected in the opposite, ON, direction and maintains the ON mirror deflection angle between time $g_4$ and time $g_8$. Then, Pixel n, deflected the next longest in the end-of-source-on direction after Pixel 2, switches to the opposite, ON, direction and maintains the ON mirror deflection angle between time $g_6$ and time $g_8$. Then, Pixel 1, deflected the shortest amount of time in the end-for-source-on direction, switches to the opposite, ON, direction and maintains the ON mirror deflection angle between time $g_5$ and time $g_7$. The length of time the mirror is retained in a direction opposite the end-of-source-on direction is the longest for the Pixel 3, followed by the Pixels 2, n and 1. The control described in FIG. 31 can also be carried out for a sub-field.

Deflecting the mirror in a direction opposite the end-of-source-on direction, while the light source is turned off, prevents the elastic hinge of a mirror from being deformed. As a result, the usage life of the mirror device is extended. A mirror device configured in this manner can also be used in a projection apparatus such as a single-panel projection apparatus, described in FIG. 1 comprising one mirror device, and a multi-panel projection apparatus, described in FIG. 2 comprising a plurality of mirror devices.

Embodiment 10

A mirror device according to the present embodiment is configured to array a plurality of mirror elements, each comprising both a deflectable mirror supported by an elastic hinge equipped on a substrate, which reflects the incident light emitted from a light source, and an address electrode placed on a substrate under the mirror. Further, the present embodiment is configured to apply no voltage to the address electrode during the period in which the light source is turned off.

The mirror device according to the present embodiment may be any of the configurations described in FIGS. 14, 15, 16A through 16C, 17A and 17B, 18A through 18C, 19, 28A through 28D, and 29. Further, the mirror device is controlled by means of the configuration put described in FIG. 20.

The light source may use, for example, a semiconductor light source such as a laser light source. Further, in addition to having an ON and an OFF state, the light source may also have a semi-ON state, in which the light source emits an incident light and no image is projected or emits no incident light while it is being driven, as described for FIG. 21. Note that the control for producing the ON state, semi-ON state, and OFF state of the light source can be carried out with the configurations put forth in FIGS. 3A and 3C.

A mirror of the mirror device is preferably controlled using non-binary data obtained by converting binary data with the conversion method described in FIG. 12.

The following is a description of the control for applying no voltage to the address electrode during the period in which the light source is turned off. It is assumed that each mirror element is controlled under a PWM control using non-binary data.

Figure 32:
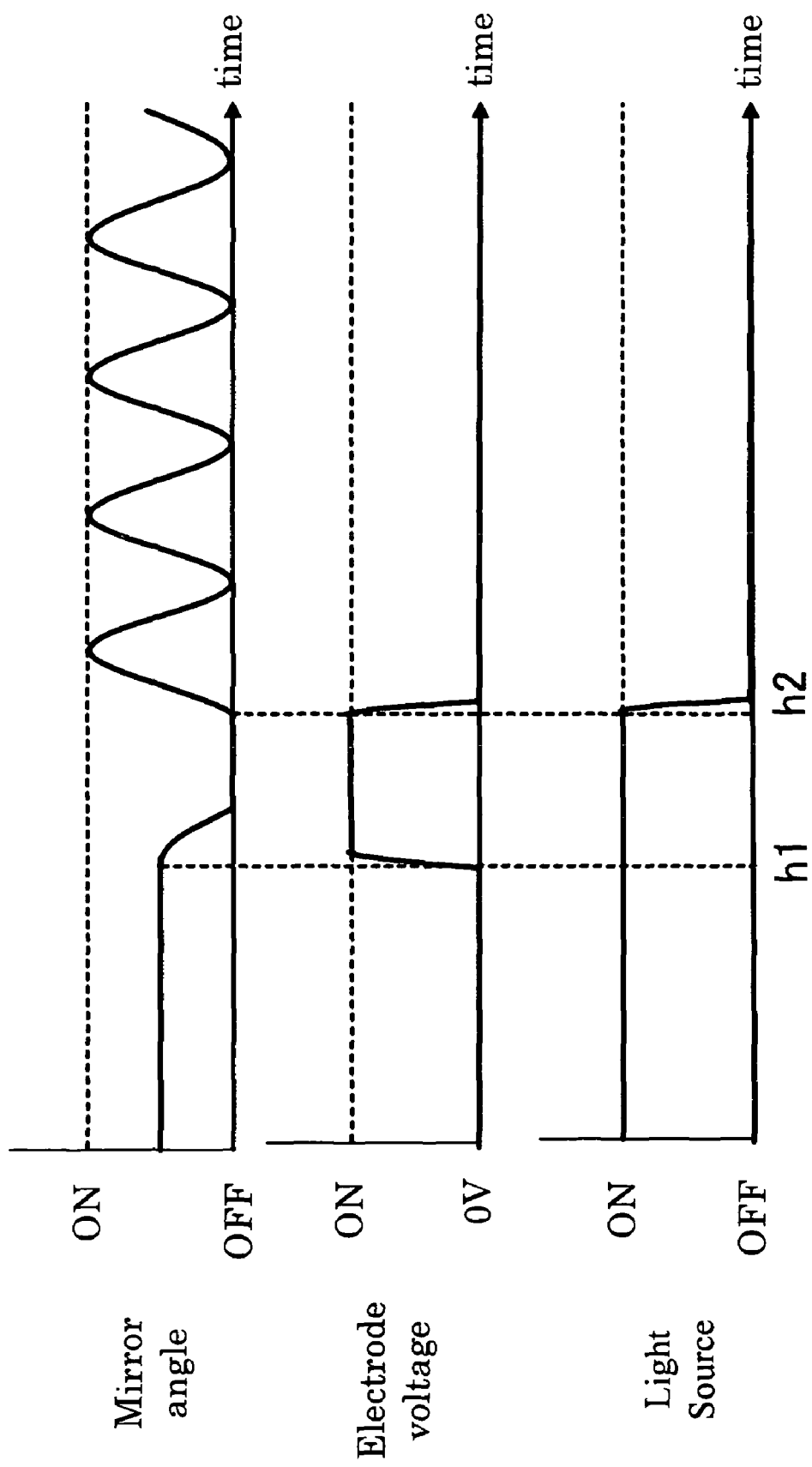
FIG. 32 is a graph illustrating the synchronization of a light source, an address electrode, and the deflection angle of each mirror element of the present embodiment.

FIG. 32 is a timing diagram for illustrating the synchronization among a light source, an address electrode, and the deflection angle of each mirror element. Referring to FIG. 32, the vertical axes represent the deflection angle of a mirror and the output of a light source, with the deflection angle of the mirror defined as "ON" when the incident light constitutes an ON light and defined as "OFF" when the incident light constitutes an OFF light. Further, the output of the light source is defined as "ON" when a voltage is applied to the address electrode, and as "0" volts when no voltage is applied. Further, the output of the light source is defined as "ON" when the light source emits an incident light to project an image and "OFF" when the power supply to the light source is completely shut off. The respective horizontal axes represent time axes, indicating the elapsed time. Prior to time $h_1$: the deflection angle of a mirror is maintained between the deflection angles of ON and OFF, specifically, in the initial state, and no voltage is applied to the address electrode, i.e., "0" volts. The assumption here is that the light source is maintained at ON. At time $h_1$: a voltage is applied to the address electrode (the voltage is ON), and the deflection angle of the mirror is changed from the initial state to the ON state while the light source is maintained at ON. Between time $h_1$ and time $h_2$: the voltage is continuously applied to the address electrode, (the voltage is ON), and the deflection angle of the mirror is retained at OFF while the light source is maintained at ON. At time $h_2$: the voltage applied to the address electrode is shut off (the voltage is at 0 volts) to release the deflection angle of the mirror from being retained at OFF. As a result, the mirror starts to perform a free oscillation. At this point in time, the light source is turned OFF. After time $h_2$: while the light source is maintained at OFF, the mirror is left to perform the free oscillation without applying a voltage to the address electrode.

As described above, applying no voltage to the address electrode of the mirror device during the period the light source is turned off reduces the consumption of power used in driving the mirror device and alleviates the heat generated in the device. Further, such a mirror device can also be used for a projection apparatus, such as a single-panel projection apparatus, described in FIG. 1 comprising one mirror device, and a multi-panel projection apparatus, described in FIG. 2 comprising a plurality of the mirror devices.

Embodiment 11

A projection apparatus according to the present embodiment is a projection apparatus projecting an image by synchronously controlling a light source and a spatial. light modulator. The projection apparatus comprises a semiconductor light source constituted by a plurality of sub-light sources, an illumination optical system for directing illumination light emitted from the semiconductor light source, a spatial light modulator for modulating the illumination light in accordance with an image signal, and a control circuit for controlling the spatial light modulator. The control circuit controls or adjusts at least two of the following in a semiconductor light source: the emission light intensity, the number of emissions, the emission period, the emission timing, the number of sub-light sources and the emitting position(s) of the sub-light sources. The spatial light modulator may be a transmissive spatial light modulator, such as a liquid crystal, or a reflective spatial light modulator, such as a liquid crystal on silicon (LCOS).

Furthermore, the reflective spatial light modulator may be a mirror device. The mirror device is implemented with a plurality of mirror elements configured as mirror array and, each mirror elements includes a deflectable mirror supported by an elastic hinge formed on a substrate and an address electrode formed on the substrate under the mirror. The use of the mirror device makes it possible to control the reflecting direction of the illumination light. It is possible to reflect the illumination light in an ON direction, directing the reflection light of the illumination light towards a projection light path, an OFF direction, directing the reflection light of the illumination light away from the projection light path, or an intermediate direction, directing a portion of the reflection light of the illumination light towards the projection light path.

The mirror device may be, for example, any of the configurations put forth in FIGS. 14, 15, 16A through 16C, 17A and 17B, 18A through 18C and FIG. 19, 28A through 28D and 29. Further, the mirror device is controlled by means of the configuration described in FIG. 20. The mirror of the mirror device is preferably controlled using non-binary data obtained by converting the binary data with the conversion method described in FIG. 12.

Such a mirror device can also be used in a projection apparatus such as a single-panel projection apparatus, which is described FIG. 1 comprising one mirror device, and a multi-panel projection apparatus, which is described in FIG. 2 comprising a plurality of the mirror devices.

The light source can use, for example, a semiconductor light source such as a laser light source. Furthermore, in addition to having an ON and an OFF state, the light source may also have a semi-ON state, in which the light source emits an incident light and no image is projected or emits no incident light while it is being driven, as described in FIGS. 21 and 22. Note that the ON state, semi-ON state and OFF state of the light source can controlled by means of the configurations described in FIGS. 3A and 3C.

The light source may be constituted by sub-light sources, and several sub-light sources may possess a different wavelength(s). Preferably, the light source is capable of performing pulse emission.

The following is a description of changing projection images through the synchronization of a semiconductor light source and a spatial light modulator in a projection apparatus, according to the present embodiment.

In general, a light source is controlled to change either the brightness of the illumination light or the illumination time lengths. Hence, a projection image modulated with a spatial light modulator is only darkened or lightened.

Operating the light source to emit pulses, however, makes it possible to increase the number of changeovers among sub-frames corresponding to the respective colors red (R), green (G) and blue (B), which are three primary colors of light, by increasing the frequency of emission and also, for example, shortening the irradiation periods for the lights of each of the colors R, G and B. Such a control makes it possible to cause a color break to be inconspicuous. Furthermore, it is possible to change the uniformity of an illumination light flux by changing the emission positions of the sub-light sources. Specifically, it is possible to generate a locally bright emission position and a locally dark emission position.

Such a configuration makes it possible to adjust the intensity of the illumination light passing through the illumination optical system and/or adjust the uniformity of the illumination light. Further, such a control can be carried out for individual light sources, emitting the lights of specific wavelengths in accordance with an image signal, transmitted from the control circuit used for controlling the spatial light modulator. As a result, it is possible to adjust the intensity of light modulated by the spatial light modulator to match the usage purpose.

If the semiconductor light source is a laser light source, a projection light intensity may be adjusted by the diffraction angle of diffracted light by generating the diffracted light with the spatial light modulator.

The control circuit for controlling the spatial light modulator controls the spatial light modulator in sync with the emission light intensity of the semiconductor light source, the number of emissions, the emission period, the emission timing, the number of emitting sub-light sources and the emitting position(s) thereof.

Furthermore, the operation for controlling the deflection angle of each mirror simultaneously from the ON light to OFF light and for controlling the deflection angle of each mirror simultaneously from the OFF light to ON light are repeated synchronously with emission/turn-off timing of the light source by implementing the spatial light modulator as a mirror device. As a result, the quantity of the minimum amount of controllable reflection light can be further reduced from the original amount of reflection light when the deflection angle of the mirror is controlled at the ON light. Therefore, a smaller amount of light can be controlled by controlling the number of repetitions between the operation for controlling the deflection angle of each mirror simultaneously from the ON light to OFF light and that for controlling the deflection angle of each mirror simultaneously from the OFF light to ON light synchronously with emission/turn-off timing of the light source. This operation increases the gray scales of light. Can't understand this paragraph A multi-panel projection apparatus, with illumination lights of multiple wavelengths, may alternatively be configured so that at least one spatial light modulator modulates the lights of a few wavelengths, while the remaining spatial light modulators modulate the lights of remaining wavelengths of the illumination lights.

As an example, a two-panel projection apparatus is configured with one spatial light modulator modulates the illumination light with the green wavelength, while the other spatial light modulator modulates the illumination lights with red and blue wavelengths. The multi-panel projection apparatus that includes a plurality of spatial light modulators thus apply the spatial light modulators to modulate the illumination lights of the respective colors.

A multi-panel projection apparatus, with illumination lights of multiple wavelengths, may alternatively be configured such that a first spatial light modulator modulates the illumination lights of a few wavelengths, while the other spatial light modulator(s) modulates the lights of multiple wavelengths, including those modulated by the first spatial light modulator.

As an example, a two-panel projection apparatus includes one spatial light modulator to modulate the illumination lights of the green and blue wavelengths, while the other spatial light modulator modulates that of the red wavelength. A three-panel projection apparatus may alternatively implement one spatial light modulator to modulate the illumination light of the green wavelength, while another spatial light modulator modulates a light of red wavelength, and the remaining spatial light modulator to modulate the projection of the green and blue wavelengths. In this way, several spatial light modulators may modulate the illumination light of the same color in a multi-panel projection apparatus, comprising a plurality of spatial light modulators.

Preferably, in a multi-panel projection apparatus, the control circuit for a spatial light modulator controls a semiconductor light source and/or a spatial light modulator so that the length of time an illumination light is modulated by at least two spatial light modulators are about the same within one frame.

As an example, when the illumination lights of the colors R, G and B are modulated in a three-panel projection apparatus, the control circuit extends the period for modulating the illumination light of one color to match the period required for modulating the color with the maximum modulation period. Specifically, the lengths of time for modulating the illumination lights of R, G and B are lined up as much as possible. In this case, the control circuit performs a control to lower the intensity of the illumination light of a color by controlling the number of emitting sub-light sources, thereby extending the length of time for modulating the illumination light. Such control is also applicable to a two-panel projection apparatus in a similar manner.

The control circuit for a spatial light modulator preferably controls the semiconductor light source on the basis of the total length of time of an individual sub-frame of the illumination light of each wavelength so that the ratio of brightness of the illumination lights of each wavelength is close to the distribution of the spectral luminous efficiency.

The intensity of the illumination light of each wavelength can be adjusted by adjusting, for example, the number of individual sub-light sources. Furthermore, the ratio of the brightness of the illumination light of each wavelength can be approximated to the distribution of the spectral luminous efficiency on the basis of the total lengths of time of an individual sub-frame corresponding to the illumination light of each wavelength. In this event, if the totals of the individual sub-frame of the illumination light of each wavelength are the same, the ratio of brightness of an image to be projected can be approximated to the distribution of the spectral luminous efficiency by matching the ratio of intensity of the illumination light of each wavelength with the distribution of the spectral luminous efficiency.

In contrast, even if the respective sub-frames of the illumination lights of individual wavelengths are different, the ratio of the intensity of the illumination light of each wavelength can be approximated to the distribution of spectral luminous efficiency by controlling the length of time for modulating each respective sub-frame of the illumination light of each wavelength by adjusting the quantity of the illumination light of each wavelength. Specifically, the control circuit for the spatial light modulator for adjusting the quantity of the illumination light of each wavelength can control and adjust the length of time for modulating the sub-frame of the illumination light of each wavelength in line with the spectral luminous efficiency.

Note that such a control may be carried out for each frame of the illumination light of each wavelength instead of for each sub-frame of the illumination light of each wavelength. Furthermore, the control circuit of the spatial light modulator may also controls a semiconductor light source to project the illumination light of each wavelength to change the gray scales of an image.

Preferably, the control circuit for the spatial light modulator controls a semiconductor light source to minimize the difference in the intensity and projection times of the illumination lights of each individual wavelength. For example, in a multi-panel projection apparatus, the modulation period for the darkest color illumination light, in which the modulation period is the shortest, can be matched with the modulation period of the illumination light of another wavelength by reducing the light intensity by decreasing the number of light sources emitting the illumination light and extending the modulation period for the illumination light of the darkest color. This configuration eliminates the difference in the modulation time lengths of the illumination light of individual wavelengths and alleviates a color break in the multi-panel projection apparatus.

Furthermore, if the modulation period of only one wavelength of illumination light is short in a single panel projection apparatus, the intensity can be reduced by decreasing the number of light sources emitting the illumination light of that wavelength and the modulation period for that wavelength is extended, as in the above description to match the modulation period of another wavelength of illumination light. As a result, it is possible to even out the changeover time lengths of the illumination lights of individual wavelengths. Extending the modulation period makes it possible to gain the processing time for an image signal transmitted to a spatial light modulator from the control circuit that controls the spatial light modulator.

Preferably, the control circuit can control the spatial light modulator so that the cycle of one frame of modulation of illumination light is between 90 Hz and 360 Hz. Conventionally, in a spatial light modulator, the cycle of one frame of modulation of illumination light is around 60 Hz. If the spatial light modulator is a liquid crystal, such as LC and LCOS, a low-speed operation is sometimes selected to eliminate blurriness in a moving image. In that case, an interpolation image is generated to interpolate the image between frames. Further, the gray scales and dynamic ranges of the interpolation image can be changed. An image of high-level gray scale can be obtained by the control circuit appropriately controlling the number of emitting light sources and the emission light intensity for the image of each frame.

The control circuit for the spatial light modulator may control a semiconductor light source so as to emit an illumination light at a shorter cycle than the cycle of a sub-frame corresponding to the illumination light of the spatial light modulator.

When a frame speed approaches a high speed, for example, 360 Hz, the sub-frame of the illumination light of each wavelength is further shortened. In this case, the control circuit for the spatial light modulator controls the light source to emit pulses in a shorter time than the control of a sub-frame and to alternately change over the emission regions of sub-light sources.

Furthermore, multiple sub-light sources are preferably laser light sources, and the polarizing direction of each sub-light source may be set at a prescribed direction for each wavelength.

Furthermore, a projection apparatus according to the present embodiment may be configured such that the control circuit for a spatial light modulator controls a light source on the basis of the gray scale of an input image signal, thereby controlling the gray scale of the illumination light of at least one wavelength. The control circuit may also control the gray scale of the illumination light by controlling the light source on the basis of the modulation period of the illumination light. The gray scale of a sub-frame corresponding to the illumination light of, for example, a specific wavelength with a short modulation period may be reduced so that the modulation control is finished after a predetermined period of time.

A projection apparatus according to the present embodiment is desired to comprise a wobbling actuator for wobbling (i.e., fluctuating) the illumination light, with the wobbling actuator synchronized with a semiconductor light source. Particularly, the control circuit for a spatial light modulator may control the intensity of the semiconductor light source, before and after wobbling the illumination light or in the midst of fluctuating it. Further, the wobbling is preferably carried out by means of the method shown in FIGS. 23 and 24. In terms of performing the wobbling, the illumination light has odd and even sub-frames. When changing between the odd and even sub-frames during wobbling, the light source is turned OFF or the emission intensity of light source is decreased, as shown in FIG. 25. As a result, a shift or blurriness in image is eliminated and a black image is interleaved between images, and thereby, the transition of images is clearer and the contrast of the video image is improved. Incidentally, the sequence of the odd and even sub-frames is interchangeable, and their display time lengths may also be changed.

Furthermore, the control circuit for a spatial light modulator is desired to control an illumination light so that a shift in images, the shift generated by the lines displaying the odd and even sub-frames, is complimented. Such a control is adaptable to a case in which the odd and even sub-frames are alternately displayed in double speed.

Furthermore, the amount of shift of a pixel changes the projection light path in the same pitch as the pixel pitch when the interlaced display of an odd field and even field are changed over. In the case of a progressive display, one frame can be controlled with a 120 Hz drive to perform a wobbling in order to increase the resolution of each frame. Further, the amount of a pixel shift can be set at ½ a pixel pitch, or the direction of shifting a pixel can be set at a diagonal direction, depending on the number of pixels and/or pixel array. Further, the direction of shifting a pixel may be changed for each color of the illumination light, or a wobbling may be performed with the illumination light turned OFF at the changeover of colors.

The process for wobbling an image display may also be implemented by using a reflecting mirror placed in the projection light path for changing over the projecting directions of a projection light. If the projection light is a polarized light, a birefringent plate and a polarization element are placed in the projection light path to change over the polarizing direction of the projection light, and thereby the projection light paths can be changed. Further, a control circuit for changing the projection light paths is synchronized with a light source control circuit controlling a light source, and thereby an accurate control is enabled. In this case, the light source is preferably a light source allowing high speed switching, such as a laser and an LED. Synchronizing a video image signal with a spatial light modulator more rapidly than the data loading time enables the display of video images maintaining a contrast without allowing a shift in the image. Furthermore, if light source is not completely turned OFF, the spatial light modulator is controlled under an OFF or the mirror element is controlled under an OFF direction, and thereby the light reflected by the spatial light modulator or transmitting through it can be minimized.

A projection apparatus according to the present embodiment is preferred to comprise a mirror device as a spatial light modulator, with the ratio of the brightness level to the darkness level, of the contrast of an image by means of the mirror device, designated at between 5000:1 and 10000:1. The contrast of a video image can be enhanced by providing a period for displaying black by turning OFF the illumination light completely within one frame period.

A projection apparatus according to the present embodiment generates an image by controlling or adjusting at least one of the following: the emission light intensity of a semiconductor light source, the number of emissions, the emission period, the number of emitting sub-light sources and the position thereof; and controlling or adjusting the total time length of the sub-frames of an illumination time and/or the gray scale of the illumination light.

At least one color of an image may be generated by controlling or adjusting at least two of the following: the emission light intensity of a semiconductor light source, the number of emissions, the emission period, the number of emitting sub-light sources and the position thereof.

Furthermore, a projection apparatus may be configured such that the semiconductor light source is a laser light source, and such that a control circuit controlling a spatial light modulator controls at least two of the following: the emission light intensity of a laser light source, the number of emissions, the emission period, the number of emitting sub-light sources and the position thereof. The control circuit may be one circuit or multiple circuits.

A multi-panel projection apparatus comprising a plurality of spatial light modulators, of which at least one spatial light modulator modulates illumination lights of multiple wavelengths on the basis of an image signal, may also be configured.

A projection apparatus according to the present embodiment is preferred to comprise a wobbling actuator for fluctuating an illumination light, wherein the control circuit for a spatial light modulator is preferred to control at least one of the following in the projection period of an image either before or after fluctuating the illumination light: the emission light intensity of a semiconductor light source, the number of emissions, the emission period, the number of emitting sub-light sources and the position thereof.

Furthermore, the control circuit for a spatial light modulator may control the semiconductor light source at a frame cycle that is no more than, for example, 120 Hz, and also at least one of the following: the emission light intensity of a semiconductor light source, the number of emissions, the emission period, the number of emitting sub-light sources and the position thereof, for each 120 Hz frame. The spatial light modulator is, for example, the above described mirror device.

A projection apparatus according to the present embodiment comprises a laser light source constituted by a plurality of sub-light sources, a spatial light modulator that includes no less than one million pixels for modulating, in accordance with an image signal, the illumination light emitted from the laser light source, and a control circuit for controlling the spatial light modulator. Further, the control circuit for a spatial light modulator controls at least two of the following: the emission light intensity of a laser light source, the number of emissions, the emission period, the number of emitting sub-light sources and the position thereof, so that the illumination light of at least one wavelength modulated by the spatial light modulator possesses no less than 1000 levels of gray scale. The spatial light modulator is, for example, a mirror device as described above. Further, a configuration may be such that the control circuit for a spatial light modulator controls at least two of the following: the emission light intensity of a laser light source, the number of emissions, the emission period, the number of emitting sub-light sources and the position thereof, so that the light of at least one wavelength of the illumination light modulated by the spatial light modulator possesses no less than 40 sub-frames within one frame.

Furthermore, in the projection apparatus according to the present embodiment described thus far, the illumination light modulated by the spatial light modulator may be a white light, and the illumination light may be a white light before and after the control circuit for a spatial light modulator controls the laser light source or sub-light source.

Furthermore, a wobbling may be performed at the changeover of individual colors of the illumination lights of a plurality of colors. Furthermore, the gray scale of the illumination light of at least one color of a modulated plurality of illumination lights may be different from the gray scale of another illumination light.

Furthermore, the sub-light source is desired to be a laser light source specifically preferably arranged in array.

A configuration may also be such that the sub-light source is a laser light source and such that the polarizing directions of individual sub-light sources with approximately the same wavelength are approximately the same.

A configuration may also be such that the sub-light source is a laser light source and a plurality of sub-light sources with approximately the same wavelength may include one sub-light source possessing a different polarizing direction.

The sub-light source may further be constituted by a plurality of light sources.

As described above, a projection apparatus according to the present embodiment is configured to control or adjust the light source in combination with two of the following: the emission light intensity of a light source, the number of emissions, the emission period, the number of emitting sub-light sources and the position thereof, in sync with the spatial light modulator, thereby the levels of gray scales for displaying the projected image may be increased to improve the quality of image display. Further, an appropriate execution of the control makes it possible to cause a color break to be inconspicuous.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A display apparatus, comprising:
a light source for emitting an illumination light;
a display device includes a plurality of pixels for modulating and projecting the illumination light along a projection light path for displaying an image comprising said plurality of pixels;
a light wobbling device for slightly changing the locations of the pixels of the image projected through the projection light path; and
a control circuit for controlling the light source corresponding to changes made by the light wobbling device.

2. The display apparatus according to claim 1, wherein:
the control circuit controls the light source during a period synchronized with the changes made by the light wobbling device.

3. The display apparatus according to claim 1, wherein:
the control circuit decreases the quantity of the illumination light projected from the light source or turns it off the light source in synchronous with the changes made by light wobbling device.

4. The display apparatus according to claim 1, wherein:
the control circuit changes colors of the illumination light projected from the light source in synchronous with the changes made by light wobbling device.

5. The display apparatus according to claim 1, wherein:
the control circuit changes emission periods of the illumination light projected from the light source in synchronous with the changes made by light wobbling device.

6. The display apparatus according to claim 1, wherein:
the light source comprises a plurality of sub-light sources, wherein the control circuit changes the numbers of the sub-light sources for changing an intensity of the illumination light in synchronous with the changes made by light wobbling device.

7. The display apparatus according to claim 1, wherein:
the light wobbling device slightly changes the locations of the pixels of a predetermined set of pixel(s) of the image projected through the projection light path.

8. The display apparatus according to claim 1, wherein:
the light path change actuator changes the projection positions of the pixel corresponding to a predetermined color.

9. The display apparatus according to claim 1, wherein:
the light wobbling device slightly changes the locations of the pixels of a predetermined column of pixels of the image projected through the projection light path.

10. The display apparatus according to claim 1, wherein:
the light wobbling device slightly changes the locations of the pixels by a distance no more than an approximate pitch of the pixels.

11. The display apparatus according to claim 1, wherein:
the light wobbling device slightly changes the locations of the pixels periodically at a frequency higher than or equal to 120 Hz.

12. The display apparatus according to claim 1, wherein:
the display device comprising a mirror device having a plurality of mirror elements each is controllable for modulation and reflecting the illumination light in a controlled direction.

13. The display apparatus according to claim 1, wherein:
the light wobbling device further comprising a wobbling actuator for wobbling the display device.

14. The display apparatus according to claim 1, wherein:
the light wobbling device further comprises an actuator to shift a mirror surface of the display device for slightly changing the locations of the pixels of the image projected through the projection light path.

15. The display apparatus according to claim 1, wherein:
the light wobbling device further comprising an actuator to change a polarization of a polarization element of the display device for slightly changing the locations of the pixels of the image projected through the projection light path.

16. The display apparatus according to claim 1, wherein:
the light source is further controllable to emit the illumination light as a plurality of pulsed emissions within a display frame period.

17. A display apparatus, comprising:
a light source for emitting an illumination light;
a display device comprising a plurality of pixels, for modulating the illumination light in accordance with a video image signal for projecting a projection light reflected from the display device along a projection light path;
a light wobbling device for slightly changing an optical axis of the projection light; and
a light source control circuit controls and adjusts the light source during a period corresponding to changes made by the light wobbling device.

18. The display apparatus according to claim 17, wherein:
the display device receives and applies a wobbling control signal different from the video image signal during a period when the light wobbling device changes the optical axis of the projection light.

19. The display apparatus according to claim 17, wherein:
the display device receives and applies a wobbling control signal to operate in an OFF state during a period when the light wobbling device changes the optical axis of the projection light.

20. The display apparatus according to claim 17, wherein:
the light source control circuit controls and adjusts the light source in synchronization with the changes made by the light wobbling device.

21. The display apparatus according to claim 17, wherein:
the display device comprising a mirror device having a number of pixels equal to a half of a video image pixels according to the video image signal for projecting and displaying an image.

22. The display apparatus according to claim 17, wherein:
the display device comprising a mirror device for modulating and reflecting the illumination light to an ON direction, an OFF direction and an intermediate direction between said ON and OFF directions.

23. A projection apparatus, comprising:
a laser or light emitting diode (LED) light source emitting an illumination light;
a light source control circuit for controlling an intensity of the illumination light of the light source or the emission timing of the light source;
a video image signal generated at a frequency of 120 Hz or higher per frame;
a mirror device comprising a plurality of mirror elements wherein each of said mirror elements controlled in accordance with the video image signal to deflect and modulate the illumination light to an ON direction and an OFF direction; and
a screen for projecting the reflected light when the mirror element is in an ON state, wherein the light source is controlled to emit a reduced amount of illumination light during a period when the plurality of mirror elements is deflected in the same direction between two consecutive display frames.

24. The projection apparatus according to claim 23, wherein:
the light source control circuit control the light source to change colors of the illumination light in a sub-frame having a frequency of 360 Hz or higher within the display frame.

25. The projection apparatus according to claim 23, wherein:
the mirror elements are controlled by the video image signal having a display frame period with a frequency of 240 Hz or higher.

* * * * *